United States Patent
Noureldin et al.

(10) Patent No.: US 10,844,751 B2
(45) Date of Patent: *Nov. 24, 2020

(54) ORGANIC RANKINE CYCLE BASED CONVERSION OF GAS PROCESSING PLANT WASTE HEAT INTO POWER

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 127 days.

This patent is subject to a terminal disclaimer.

(21) Appl. No.: 16/165,663

(22) Filed: Oct. 19, 2018

(65) Prior Publication Data

US 2019/0055857 A1 Feb. 21, 2019

Related U.S. Application Data

(63) Continuation of application No. 14/978,210, filed on Dec. 22, 2015, now Pat. No. 10,113,448.

(51) Int. Cl.
*F01K 25/08* (2006.01)
*F01K 21/00* (2006.01)
(Continued)

(52) U.S. Cl.
CPC ............ *F01K 21/005* (2013.01); *F01K 7/025* (2013.01); *F01K 7/16* (2013.01); *F01K 13/00* (2013.01);
(Continued)

(58) Field of Classification Search
CPC .......... F01K 21/005; F01K 7/16; F01K 13/00; F01K 13/006; F01K 23/04; F01K 7/025;
(Continued)

(56) References Cited

U.S. PATENT DOCUMENTS

| 2,131,105 A | 9/1938 | Hill |
| 3,686,867 A | 8/1972 | Hull |

(Continued)

FOREIGN PATENT DOCUMENTS

| CN | 1844325 | 10/2006 |
| CN | 101424453 | 5/2009 |

(Continued)

OTHER PUBLICATIONS

Gulf Cooperation Council issued in GCC Application No. GC 2016-31448 dated Sep. 19, 2018, 3 pages.

(Continued)

*Primary Examiner* — Jason D Shanske
(74) *Attorney, Agent, or Firm* — Fish & Richardson P.C.

(57) ABSTRACT

A system includes a waste heat recovery heat exchanger configured to heat a heating fluid stream by exchange with a heat source in a crude oil associated gas processing plant. The system includes an Organic Rankine cycle energy conversion system including a pump, an energy conversion heat exchanger configured to heat the working fluid by exchange with the heated heating fluid stream, a turbine and a generator configured to generate power by expansion of the heated working fluid, a cooling element configured to cool the expanded working fluid after power generation, and an accumulation tank. The heating fluid flows from the accumulation tank, through the waste heat recovery heat exchanger, through the Organic Rankine cycle energy conversion system, and back to the accumulation tank.

30 Claims, 16 Drawing Sheets

Related U.S. Application Data

(60) Provisional application No. 62/209,147, filed on Aug. 24, 2015.

(51) Int. Cl.

| | | |
|---|---|---|
| *F25B 11/02* | (2006.01) | |
| *F25B 43/00* | (2006.01) | |
| *F28D 21/00* | (2006.01) | |
| *F28D 15/00* | (2006.01) | |
| *F25B 9/00* | (2006.01) | |
| *F25J 3/06* | (2006.01) | |
| *F01K 7/16* | (2006.01) | |
| *F01K 13/00* | (2006.01) | |
| *F01K 25/06* | (2006.01) | |
| *F01K 23/08* | (2006.01) | |
| *F25J 3/02* | (2006.01) | |
| *F01K 7/02* | (2006.01) | |
| *F01K 25/10* | (2006.01) | |
| *F01K 23/04* | (2006.01) | |
| *F25B 1/06* | (2006.01) | |
| *F25B 5/02* | (2006.01) | |
| *F25B 39/00* | (2006.01) | |

(52) U.S. Cl.
CPC ............ *F01K 13/006* (2013.01); *F01K 23/04* (2013.01); *F01K 23/08* (2013.01); *F01K 25/065* (2013.01); *F01K 25/08* (2013.01); *F01K 25/10* (2013.01); *F25B 1/06* (2013.01); *F25B 5/02* (2013.01); *F25B 9/002* (2013.01); *F25B 11/02* (2013.01); *F25B 39/00* (2013.01); *F25B 43/00* (2013.01); *F25J 3/0209* (2013.01); *F25J 3/0233* (2013.01); *F25J 3/0238* (2013.01); *F25J 3/061* (2013.01); *F28D 15/00* (2013.01); *F28D 21/0001* (2013.01); *F28D 21/0014* (2013.01); *F25B 2339/047* (2013.01); *F25B 2400/23* (2013.01); *F25J 2200/02* (2013.01); *F25J 2200/70* (2013.01); *F25J 2205/04* (2013.01); *F25J 2205/60* (2013.01); *F25J 2210/06* (2013.01); *F25J 2220/02* (2013.01); *F25J 2220/68* (2013.01); *F25J 2240/70* (2013.01); *F25J 2260/02* (2013.01); *F25J 2270/12* (2013.01); *F25J 2270/60* (2013.01); *F25J 2270/902* (2013.01); *F28D 2021/0059* (2013.01)

(58) Field of Classification Search
CPC ....... F28D 21/0001; F28D 15/00; F25J 3/061; F25J 3/0209
USPC .......................................................... 60/651
See application file for complete search history.

(56) References Cited

U.S. PATENT DOCUMENTS

| | | | |
|---|---|---|---|
| 3,858,395 A | 1/1975 | Davoud | |
| 3,995,428 A | 12/1976 | Roberts | |
| 4,109,469 A | 8/1978 | Carson | |
| 4,291,232 A | 9/1981 | Cardone | |
| 4,391,102 A | 7/1983 | Studhalter | |
| 4,434,746 A | 3/1984 | Stewart | |
| 4,439,988 A | 4/1984 | Minardi et al. | |
| 4,471,619 A | 9/1984 | Nolley, Jr. | |
| 4,512,155 A | 4/1985 | Sheinbaum | |
| 4,595,344 A | 6/1986 | Briley | |
| 4,733,557 A | 3/1988 | Baillie | |
| 4,792,390 A | 12/1988 | Staggs | |
| 4,962,238 A | 10/1990 | Wolfe | |
| 5,007,240 A | 4/1991 | Ishida | |
| 5,164,070 A | 11/1992 | Munro | |
| 5,240,476 A | 8/1993 | Hegarty | |
| 5,497,624 A | 3/1996 | Amir | |
| 6,347,520 B1 | 2/2002 | Ranasinghe | |
| 6,434,942 B1 | 8/2002 | Charlton | |
| 6,668,553 B1 | 12/2003 | Ghizawi | |
| 6,733,636 B1 | 5/2004 | Heins | |
| 7,536,864 B2 | 5/2009 | Wolfe | |
| 8,046,999 B2 | 11/2011 | Doty | |
| 8,272,217 B2 | 9/2012 | Lengert | |
| 8,959,885 B2 | 2/2015 | Kidambi | |
| 9,062,898 B2 | 6/2015 | Held | |
| 9,074,492 B2 | 7/2015 | Uskan et al. | |
| 9,328,634 B2 | 5/2016 | Ikegami | |
| 9,562,201 B2 | 2/2017 | Noureldin | |
| 9,745,871 B2 | 8/2017 | Noureldin et al. | |
| 9,816,401 B2 | 11/2017 | Noureldin et al. | |
| 9,869,209 B2 | 1/2018 | Noureldin et al. | |
| 10,113,448 B2 * | 10/2018 | Noureldin | F25J 3/0209 |
| 2003/0213246 A1 | 11/2003 | Coll | |
| 2006/0010872 A1 | 1/2006 | Singh | |
| 2006/0251935 A1 | 11/2006 | Barrett | |
| 2008/0041046 A1 | 2/2008 | Bering | |
| 2008/0128134 A1 | 6/2008 | Mudunuri | |
| 2008/0174115 A1 | 7/2008 | Lambirth | |
| 2008/0257413 A1 | 10/2008 | Noureldin et al. | |
| 2008/0289588 A1 | 11/2008 | Wees et al. | |
| 2008/0314726 A1 | 12/2008 | Choros | |
| 2009/0000299 A1 | 1/2009 | Ast | |
| 2009/0000906 A1 | 1/2009 | Petri | |
| 2009/0071652 A1 | 3/2009 | Vinegar | |
| 2009/0225929 A1 | 9/2009 | Genta et al. | |
| 2009/0287029 A1 | 11/2009 | Anumakonda et al. | |
| 2009/0301087 A1 | 12/2009 | Borissov et al. | |
| 2010/0146974 A1 | 6/2010 | Ast | |
| 2010/0242476 A1 | 9/2010 | Ast | |
| 2010/0263380 A1 | 10/2010 | Biederman | |
| 2010/0319346 A1 | 12/2010 | Ast | |
| 2010/0326076 A1 | 12/2010 | Ast | |
| 2011/0016863 A1 | 1/2011 | Ernst | |
| 2011/0072819 A1 | 3/2011 | Silva | |
| 2011/0072820 A1 | 3/2011 | Finkenrath | |
| 2011/0083437 A1 | 4/2011 | Ast | |
| 2011/0158858 A1 | 6/2011 | Alves Ramalho Gomes | |
| 2011/0240753 A1 | 10/2011 | Stevenson | |
| 2012/0031096 A1 | 2/2012 | Ulas Acikgoz et al. | |
| 2012/0047889 A1 | 3/2012 | Ulas Acikgoz et al. | |
| 2012/0047943 A1 | 3/2012 | Barclay | |
| 2012/0085096 A1 | 4/2012 | Penton et al. | |
| 2012/0085097 A1 | 4/2012 | Penton et al. | |
| 2012/0131921 A1 | 5/2012 | Held | |
| 2012/0255304 A1 | 10/2012 | Li | |
| 2012/0279728 A1 | 11/2012 | Northrop | |
| 2012/0279900 A1 | 11/2012 | Noureldin et al. | |
| 2012/0285169 A1 | 11/2012 | Freund | |
| 2012/0298552 A1 | 11/2012 | Koseoglu | |
| 2013/0104546 A1 | 5/2013 | Goswami | |
| 2013/0145763 A1 | 6/2013 | Mirmobin et al. | |
| 2013/0165534 A1 | 6/2013 | McComish | |
| 2013/0213040 A1 | 8/2013 | Goswami | |
| 2013/0216352 A1 | 8/2013 | Short | |
| 2013/0231909 A1 | 9/2013 | Noureldin | |
| 2013/0238154 A1 | 9/2013 | Noureldin | |
| 2013/0334060 A1 | 12/2013 | Koseoglu et al. | |
| 2013/0340434 A1 | 12/2013 | Palmer | |
| 2013/0341929 A1 | 12/2013 | Ho et al. | |
| 2014/0039708 A1 | 2/2014 | Curtis et al. | |
| 2014/0090405 A1 | 4/2014 | Held et al. | |
| 2014/0165626 A1 | 6/2014 | Van Horn | |
| 2014/0223911 A1 | 8/2014 | Ikegami | |
| 2014/0260311 A1 | 9/2014 | Berlowitz | |
| 2014/0373544 A1 | 12/2014 | Mohan | |
| 2015/0377079 A1 | 12/2015 | Noureldin | |
| 2016/0025391 A1 | 1/2016 | Weng | |
| 2016/0045841 A1 | 2/2016 | Kaplan | |
| 2016/0166983 A1 | 6/2016 | Guillo | |

(56) References Cited

U.S. PATENT DOCUMENTS

2016/0231052 A1    8/2016   Mak
2016/0289143 A1    10/2016   Duggal

FOREIGN PATENT DOCUMENTS

| | | |
|---|---|---|
| CN | 104560082 | 4/2015 |
| DE | 3731978 | 3/1988 |
| EP | 292391 | 11/1988 |
| EP | 949318 | 10/1999 |
| EP | 2516326 | 10/2012 |
| FR | 2990990 | 11/2013 |
| JP | S54140042 | 10/1979 |
| JP | S6056184 | 4/1985 |
| JP | S6056184 A | 4/1985 |
| JP | 2012521874 | 9/2012 |
| JP | 2012521874 A | 9/2012 |
| SU | 295317 | 10/1977 |
| WO | 97/21786 | 6/1997 |
| WO | 2004102082 | 11/2004 |
| WO | 2011090553 | 7/2011 |
| WO | 2012048132 | 4/2012 |
| WO | 2013055864 | 4/2013 |
| WO | 2014205163 | 12/2014 |
| WO | 2015015068 | 2/2015 |
| WO | 2015178897 | 11/2015 |
| WO | WO 2017034622 | 3/2017 |

OTHER PUBLICATIONS

Gulf Cooperation Council issued in GCC Application No. GC 2016-31449 dated Sep. 19, 2018, 3 pages.
GCC Examination Report in GCC Appln. No. GC 2016-36796, dated Jan. 16, 2020, 3 pages.
Gulf Cooperation Council Examination Report issued in GCC Application No. 2016-31889 dated Mar. 5, 2019, 3 pages.
Gulf Cooperation Council Examination Report issued in GCC Application No. GC 2016/36795 dated Jul. 8, 2019, 3 pages.
Gulf Cooperation Council Examination Report issued in GCC Application No. GC 2016-37593 dated Dec. 29, 2019, 3 pages.
Gulf Cooperation Council Examination Report issued in GCC Application No. GC 2016-36795 dated Oct. 31, 2019, 3 pages.
Chinese Office Action issued in Chinese Application No. 201680061618.6 dated Sep. 3, 2019, 17 pages.
Chinese Office Action issued in Chinese Application No. 201680061793.5 dated Oct. 8, 2019, 9 pages.
Chinese Office Action issued in Chinese Application No. 2016800617954 dated Sep. 27, 2019, 8 pages.
Chinese Office Action issued in Chinese Application No. 201680061730 dated Oct. 8, 2019, 9 pages.
Communication under Rule 71(3) EPC issued in European Application No. 16720007.0 dated Dec. 14, 2018, 94 pages.
Communication under Rule 71(3) EPC issued in European Application No. 16722730.5 dated Dec. 14, 2018, 93 pages.
Communication under Rule 71(3) EPC issued in European Application No. 16724179.3 dated Dec. 14, 2018, 94 pages.
Communication under Rule 71(3) EPC issued in European Application No. 16726994.3 dated Dec. 14, 2018, 94 pages.
D. Ayou, J. C. Bruno, R. Saravanan and A. Coronas, "An Overview of Combined Absorption Power and Cooling Cycles," Renewable sustainable energy reviews, 21 (2013), 728-748.
D. Zheng, B. Chen, Y. Qi and H. Jin, "Thermodynamic analysis of a novel absorption power/cooling combined cycle," Applied Energy, 83 (2006), 311-323.
Feng Xu, D. Yogi Goswami and Sunil S. Bhagwat, "A combined power/cooling cycle," Energy, 25 (2000), 233-246.
Hasan et al., "First and Second Law Analysis of a New Power and Refrigeration Thermodynamic Cycle using a Solar Heat Source," Pergamon, Solar Energy, vol. 73, No. 5, Nov. 1, 2002, pp. 385-393.
J. Hua, Y. Chen, Y. Wang and A.P. Roskilly, "Thermodynamic analysis of ammonia-water power/chilling cogeneration cycle with low grade waste heat," Applied thermal engineering, 64 (2014), 483-490.
J.Wang, Y. Dai and L. Gao, "Parametric analysis and optimization for a combined power and refrigeration cycle," Applied Energy, 85 (2008), 1071-1085.
Meng Liu, and Na Zhang, "Proposal and analysis of a novel ammonia-water cycle for power and refrigeration cogeneration," Energy, 32 (2007), 961-970.
R.V. Padilla, G Demirkaya, D. Yogi Goswami, E. Stefanakos, and M. A. Rahman, "Analysis of power and cooling cogeneration using ammonia-water mixture," Energy, 35 (2010), 4649-4657.
Sadrameli et al., "Optimum Operating Conditions for a Combined Power and Cooling Thermodynamic Cycle," Science Direct, Applied Energy, vol. 84, No. 3, Nov. 10, 2006, pp. 254-265.
Stecco, "Kalina Cycles: Some Possible Applications and Comments," Proceedings of the American Power Conference, XP000609703, Jan. 1, 1993, vol. 1, pp. 196-201.
Tamm et al., "Theoretical and Experimental Investigation of an Ammonia-Water Power and Refrigeration Thermodynamic Cycle," Science Direct, Solar Energy, vol. 76, No. 1-3, Jan. 1, 2004, pp. 217-228.
Vidal, "Analysis of a Combined Power and Refrigeration Cycle by the Exergy Method," Science Direct, Energy 31, Dec. 1, 2006, pp. 3401-3414.
Da-Wen Sun, "Variable geometry ejectors and their applications in ejector refrigeration systems," Pergamon, Oct. 1995, 11 pages.
Tan et al., "Entrainment ratio analysis of compress/ejector refrigeration system," International Conference on Advances in Mechanical Engineering and Industrial Informatics (AMEII 2015), Apr. 11-12, 2015, 6 pages.
PCT International Search Report and Written Opinion of the International Searching Authority, PCT/US2016/027417, dated Jul. 6, 2016, 11 pages.
PCT International Search Report and Written Opinion of the International Searching Authority, PCT/US2016/027797, dated Oct. 19, 2016, 12 pages.
PCT International Search Report and Written Opinion of the International Searching Authority, PCT/US2016/027794, dated Oct. 19, 2016, 13 pages.
PCT International Search Report and Written Opinion of the International Searching Authority, PCT/US2016/030063, dated Oct. 19, 2016, 13 pages.
PCT International Search Report and Written Opinion of the International Searching Authority, PCT/US2016/030156, dated Oct. 19, 2016, 12 pages.
PCT International Search Report and Written Opinion of the International Searching Authority, PCT/US2016/048074, dated Nov. 9, 2016, 12 pages.
PCT International Search Report and Written Opinion of the International Searching Authority, PCT/US2016/048042, dated Nov. 9, 2016, 12 pages.
PCT International Search Report and Written Opinion of the International Searching Authority, PCT/US2016/048067, dated Nov. 15, 2016, 11 pages.
PCT International Search Report and Written Opinion of the International Searching Authority, PCT/US2016/048066, dated Nov. 15, 2016, 11 pages.
PCT International Search Report and Written Opinion of the International Searching Authority, PCT/US2016/048078, dated Nov. 15, 2016, 12 pages.
PCT International Search Report and Written Opinion of the International Searching Authority, PCT/US2016/048076, dated Nov. 15, 2016, 12 pages.
PCT International Search Report and Written Opinion of the International Searching Authority, PCT/US2016/048207, dated Nov. 21, 2016, 12 pages.
PCT International Search Report and Written Opinion of the International Searching Authority, PCT/US2016/048219, dated Nov. 21, 2016, 13 pages.
PCT International Search Report and Written Opinion of the International Searching Authority, PCT/US2016/048229, dated Nov. 21, 2016, 13 pages.
PCT International Search Report and Written Opinion of the International Searching Authority, PCT/US2016/048236, dated Nov. 21, 2016, 13 pages.

(56) References Cited

OTHER PUBLICATIONS

PCT International Search Report and Written Opinion of the International Searching Authority, PCT/US2016/027413, dated Nov. 22, 2016, 11 pages.
PCT International Search Report and Written Opinion of the International Searching Authority, PCT/US2016/048063, dated Nov. 23, 2016, 11 pages.
PCT International Search Report and Written Opinion of the International Searching Authority, PCT/US2016/048071, dated Nov. 23, 2016, 11 pages.
PCT International Search Report and Written Opinion of the International Searching Authority, PCT/US2016/048210, dated Dec. 22, 2016, 11 pages.
PCT International Search Report and Written Opinion of the International Searching Authority, PCT/US2016/048224, dated Dec. 22, 2016, 11 pages.
PCT International Search Report and Written Opinion of the International Searching Authority, PCT/US2016/048209, dated Dec. 22, 2016, 11 pages.
PCT International Search Report and Written Opinion of the International Searching Authority, PCT/US2016/048237, dated Dec. 22, 2016, 11 pages.
PCT International Search Report and Written Opinion of the International Searching Authority, PCT/US2016/048223, dated Dec. 22, 2016, 11 pages.
PCT International Search Report and Written Opinion of the International Searching Authority, PCT/US2016/048212, dated Dec. 22, 2016, 11 pages.
International Preliminary Report on Patentability in International Application No. PCT/US2016/027413, dated Mar. 8, 2018, 8 pages.
International Preliminary Report on Patentability in International Application No. PCT/US2016/048074, dated Mar. 8, 2018, 8 pages.
International Preliminary Report on Patentability in International Application No. PCT/US2016/030063, dated Mar. 8, 2018, 9 pages.
International Preliminary Report on Patentability in International Application No. PCT/US2016/027797, dated Mar. 8, 2018, 8 pages.
International Preliminary Report on Patentability in International Application No. PCT/US2016/027794, dated Mar. 8, 2018, 9 pages.
International Preliminary Report on Patentability in International Application No. PCT/US2016/030156, dated Mar. 8, 2018, 9 pages.
Gulf Cooperation Council issued in GCC Application No. GC 2016-31384 dated Jan. 3, 2019, 3 pages.
Communication under Rule 71(3) EPC issued in European Application No. 16718158.5 dated Mar. 11, 2019, 91 pages.
Gulf Cooperation Council issued in GCC Application No. GC 2016-31889 dated Nov. 12, 2018, 3 pages.
Japanese Office Action issued in Japanese Application No. 2018-510719 dated May 17, 2019, 9 pages.
Japanese Office Action issued in Japanese Application No. 2018-510711 dated May 17, 2019, 7 pages.
Japanese Office Action issued in Japanese Application No. 2018-510715 dated Jun. 18, 2019, 11 pages.
Japanese Office Action issued in Japanese Application No. 2018-510723 dated Jun. 18, 2019, 12 pages.
Gulf Cooperation Council Examination Report issued in GCC Application No. 2016-31384 dated May 29, 2019, 3 pages.
Japanese Office Action issued in Japanese Application No. 2018-510711 dated Oct. 1, 2019, 8 pages (with English translation).
Indian Examination Report in Indian Appln. No. 201817009198, dated Jun. 30, 2020, 6 pages.
Chinese Office Action in Chinese Appln. No. 201680061730, dated Jul. 3, 2020, 6 pages.

\* cited by examiner

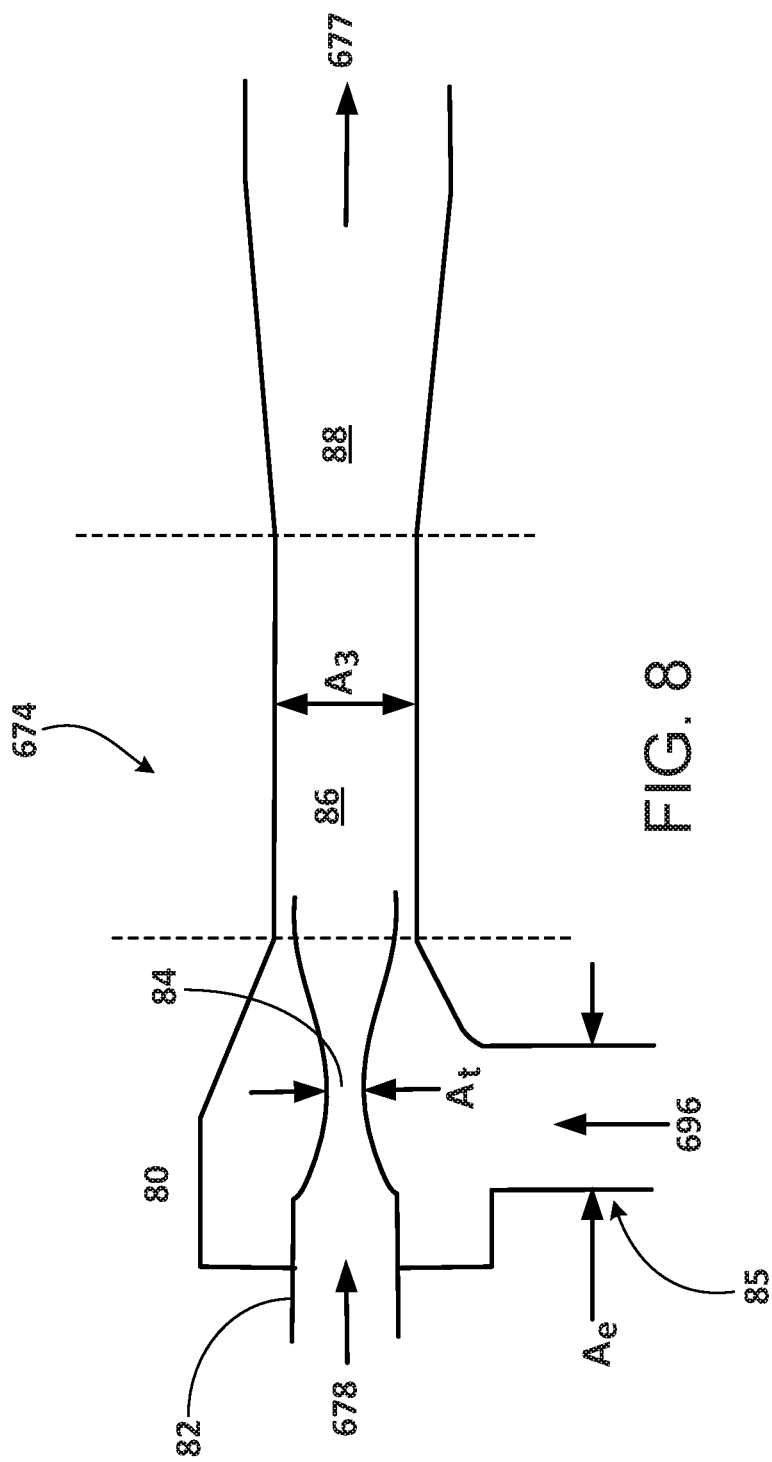

ORGANIC RANKINE CYCLE BASED CONVERSION OF GAS PROCESSING PLANT WASTE HEAT INTO POWER

CLAIM OF PRIORITY

This application is a Continuation of and claims priority to U.S. patent application Ser. No. 14/978,210, filed on Dec. 22, 2015, which claims priority to U.S. patent application Ser. No. 62/209,147, filed on Aug. 24, 2015, the entire contents of both of which are incorporated here by reference.

BACKGROUND

Natural gas and crude oil can be found in a common reservoir. In some cases, gas processing plants can purify raw natural gas by removing common contaminants such as water, carbon dioxide and hydrogen sulfide. Some of the substances which contaminate natural gas have economic value and can be further processed or sold or both. Crude oil associated gas processing plants often release large amounts of waste heat into the environment.

SUMMARY

In an aspect, a system includes a waste heat recovery heat exchanger configured to heat a heating fluid stream by exchange with a heat source in a crude oil associated gas processing plant. The system includes an Organic Rankine cycle energy conversion system including a pump configured to pump a working fluid to a pressure of between 11 Bar and 12 Bar, the working fluid including iso-butane. The Organic Rankine cycle energy conversion system includes an energy conversion heat exchanger configured to heat the working fluid by exchange with the heated heating fluid stream. The Organic Rankine cycle energy conversion system includes a turbine and a generator. The turbine and generator are configured to generate power by expansion of the heated working fluid. The Organic Rankine cycle energy conversion system includes a cooling element configured to cool the expanded working fluid after power generation. The Organic Rankine cycle energy conversion system includes an accumulation tank. The heating fluid flows from the accumulation tank, through the waste heat recovery heat exchanger, through the Organic Rankine cycle energy conversion system, and back to the accumulation tank.

Embodiments can include one or more of the following features.

The energy conversion heat exchanger has a thermal duty of between 3000 MM Btu/h (million British thermal units (Btu) per hour) and 3500 MM Btu/h.

The energy conversion heat exchanger includes an evaporator.

The energy conversion heat exchanger is configured to heat the working fluid to a temperature of between 150° F. and 160° F.

The energy conversion heat exchanger is configured to reduce the pressure of the working fluid to a pressure of between 10 Bar and 11 Bar.

The working fluid enters the turbine in a vapor phase.

The turbine and generator are configured to generate at least 60 MW (megawatts) of power.

The cooling element has a thermal duty of between 2500 MM Btu/h and 3000 MM Btu/h.

The cooling element is configured to cool the expanded working fluid by exchange with cooling fluid.

The amount of power generated by the turbine and generator varies based on the temperature of the cooling fluid. When the temperature of the cooling fluid is less than about 65° F., the turbine and generator generate between 70 MW and 90 MW of power. When the temperature of the cooling fluid is at least 70° F., the turbine and generator generate between 60 MW and 80 MW of power.

The waste heat recovery heat exchanger is configured to heat the heating fluid stream by exchange with a vapor stream from a slug catcher in an inlet area of the gas processing plant.

The waste heat recovery heat exchanger is configured to heat the heating fluid stream by exchange with an output stream from a DGA (di-glycolamine) stripper in the gas processing plant.

The waste heat recovery heat exchanger is configured to heat the heating fluid stream by exchange with one or more of a sweet gas stream and a sales gas stream in the gas processing plant.

The waste heat recovery heat exchanger is configured to heat the heating fluid stream by exchange with a propane header in a propane refrigeration unit of the gas processing plant in the gas processing plant.

In an aspect, a method includes heating a heating fluid stream by exchange with a heat source in a crude oil associated gas processing plant. The method includes generating power in an Organic Rankine cycle energy conversion system, including pumping a working fluid to a pressure of between 11 Bar and 12 Bar; heating the working fluid by exchange with the heated heating fluid stream; generating power, by a turbine and generator, by expansion of the heated working fluid; and cooling the expanded working fluid after power generation. The heating fluid stream flows from an accumulation tank, through the waste heat recovery exchanger, through the Organic Rankine cycle energy conversion system, and back to the accumulation tank.

Embodiments can include one or more of the following features.

The method includes heating the working fluid to a temperature of between 150° F. and 160° F.

Heating the working fluid includes reducing the pressure of the working fluid to a pressure of between 10 Bar and 11 Bar.

Generating power includes generating at least about 60 MW of power.

Cooling the expanded working fluid includes cooling the working fluid by exchange with cooling fluid.

The amount of power generated by the turbine and generator varies based on the temperature of the cooling fluid. When the temperature of the cooling fluid is less than 65° F., the turbine and generator generate between 70 MW and 90 MW of power. When the temperature of the cooling fluid is at least 70° F., the turbine and generator generate between 60 MW and 80 MW of power.

The method includes heating the heating fluid stream by exchange with a vapor stream from a slug catcher in an inlet area of the gas processing plant.

The method includes heating the heating fluid stream by exchange with an output stream from a DGA stripper in the gas processing plant.

The method includes heating the heating fluid stream by exchange with one or more of a sweet gas stream and a sales gas stream in the gas processing plant.

The method includes heating the heating fluid stream by exchange with a propane header in a propane refrigeration unit of the gas processing plant in the gas processing plant.

In an aspect, a system includes a waste heat recovery heat exchanger configured to heat a heating fluid stream by exchange with a heat source in a crude oil associated gas processing plant; an energy conversion system heat exchanger configured to heat a working fluid by exchange with the heated heating fluid stream; and an energy conversion system including a turbine and a generator, wherein the turbine and generator are configured to generate power by expansion of the heated a working fluid.

Embodiments can include one or more of the following features.

The energy conversion system includes an Organic Rankine cycle. The turbine and generator are configured to generate at least about 65 MW (megawatts) of power, such as at least about 80 MW of power. The energy conversion system includes a pump configured to pump the energy conversion fluid to a pressure of less than about 12 Bar. The working fluid includes iso-butane.

The energy conversion system includes a Kalina cycle. The working fluid includes ammonia and water. The turbine and generator are configured to generate at least about 65 MW of power, such as at least about 84 MW of power. The energy conversion system includes a pump configured to pump the working fluid to a pressure of less than about 25 Bar, such as less than about 22 Bar.

The energy conversion system includes a modified Goswami cycle. The modified Goswami cycle includes a chiller for cooling a chilling fluid stream. A first portion of the working fluid enters the turbine and a second portion of the working fluid flows through the chiller. The chiller is configured to cool a chilling fluid stream by exchange with second portion of the working fluid. The cooled chilling fluid stream is used for cooling in the gas processing plant. The chiller is configured to produce at least about 210 MM Btu/h (million British thermal units (Btu) per hour) of in-plant cooling capacity. The cooled chilling fluid stream is used for ambient air cooling. The cooled chilling fluid stream is used for ambient air cooling in the gas processing plant. The chiller is configured to produce at least about 80 MM Btu/h of ambient air cooling capacity. The cooled chilling fluid stream is used for ambient air cooling for a community outside of the gas processing plant. The chiller is configured to produce at least about 1300 MM Btu/h of ambient air cooling capacity. A ratio between an amount of the working fluid that flows through the turbine and an amount of the working fluid that flows through the chiller is adjustable during operation of the energy conversion system. The ratio can be zero. The turbine and generator are configured to generate at least about 53 MW of power. The energy conversion system includes a pump configured to pump the working fluid to a pressure of less than about 14 Bar. The working fluid includes ammonia and water. The working fluid enters the turbine in a vapor phase. The working fluid that enters the turbine is rich in ammonia compared to a working fluid elsewhere in the energy conversion cycle. The system includes a high pressure recovery turbine configured to generate power from liquid working fluid. The high pressure recovery turbine is configured to generate at least about 1 MW of power. The liquid working fluid that enters the high pressure recovery turbine is lean in ammonia compared to a working fluid elsewhere in the energy conversion cycle.

The heating fluid stream includes oil. The system includes an accumulation tank. The heating fluid stream flows from the accumulation tank, through the waste heat recovery heat exchanger, through the energy conversion system heat exchanger, and back to the accumulation tank.

The waste heat recovery heat exchanger is configured to heat the heating fluid stream by exchange with a vapor stream from a slug catcher in an inlet area of the gas processing plant. The waste heat recovery heat exchanger is configured to heat the heating fluid stream by exchange with a lean di-glycolamine (DGA) stream from a DGA stripper in the gas processing plant. The waste heat recovery heat exchanger is configured to heat the heating fluid stream by exchange with an overhead stream from a DGA stripper in the gas processing plant. The waste heat recovery heat exchanger is configured to heat the heating fluid stream by exchange with a sweet gas stream in the gas processing plant. The waste heat recovery heat exchanger is configured to heat the heating fluid stream by exchange with a sales gas stream in the gas processing plant. The waste heat recovery heat exchanger is configured to heat the heating fluid stream by exchange with a propane header in a propane refrigeration unit of the gas processing plant in the gas processing plant.

In a general aspect, a method includes heating a heating fluid stream by exchange with a heat source in a gas processing plant; heating a working fluid by exchange with the heated heating fluid stream; and generating power by a turbine and generator in an energy conversion system by expansion of the heated a working fluid.

Embodiments can include one or more of the following features.

The energy conversion system includes an Organic Rankine cycle. Generating power includes generating at least about 65 MW of power, such as at least about 80 MW of power. The method includes pumping the working fluid to a pressure of less than about 12 Bar.

The energy conversion system includes a Kalina cycle. Generating power includes generating at least about 65 MW of power, such as at least about 84 MW of power. The method includes pumping the working fluid to a pressure of less than about 25 Bar, such as less than about 22 Bar.

The energy conversion cycle includes a modified Goswami cycle. The method includes cooling a chilling fluid stream by exchange with the working fluid in a chiller. A first portion of the working fluid enters the turbine and a second portion of the working fluid flows through the chiller. The method includes providing the cooled chilling fluid stream to the gas processing plant for cooling. The method includes producing at least about 210 MM Btu/h of in-plant cooling using the cooled chilling fluid stream. The method includes using the cooled chilling fluid stream for ambient air cooling. The method includes using the cooled chilling fluid stream for ambient air cooling in the gas processing plant. The method includes producing at least about 80 MM Btu/h of ambient air cooling capacity. The method includes using the cooled chilling fluid stream for ambient air cooling for a community outside of the gas processing plant. The method includes producing at least about 1300 MM Btu/h of ambient air cooling capacity. The method includes adjusting a ratio between an amount of the working fluid that enters the turbine and an amount of the working fluid that flows through the chiller. The ratio can be zero. Generating power includes generating at least about 53 MW of power. The method includes pumping the working fluid to a pressure of less than about 14 Bar. The method includes causing the working fluid to enter the turbine in a vapor phase. The working fluid that enters the turbine is rich in ammonia compared to working fluid elsewhere in the energy conversion cycle. The method includes generating power by a high pressure recovery turbine that receives the liquid working fluid. The method includes generating at least about 1 MW of power. The liquid working fluid received by the high pressure recovery turbine is lean in ammonia compared to working fluid elsewhere in the energy conversion cycle.

The method includes flowing the heating fluid stream from an accumulation tank to a waste heat recovery exchanger in the gas processing plant for exchange with the heat source in the gas processing plant, to an energy conversion heat exchanger for exchange with the energy conversion fluid, and back to the accumulation tank.

The method includes heating the heating fluid stream by exchange with a vapor stream from a slug catcher in an inlet area of the gas processing plant. The method includes heating the heating fluid stream by exchange with a lean DGA stream from a DGA stripper in the gas processing plant. The method includes heating the heating fluid stream by exchange with an overhead stream from a DGA stripper in the gas processing plant. The method includes heating the heating fluid stream by exchange with a sweet gas stream in the gas processing plant. The method includes heating the heating fluid stream by exchange with a sales gas stream in the gas processing plant. The method includes heating the heating fluid stream by exchange with a propane header in a propane refrigeration unit of the gas processing plant in the gas processing plant.

The systems described here can have one or more of the following advantages. The systems can be integrated with a crude oil associated gas processing plant to make the gas processing plant more energy efficient or less polluting or both. Low grade waste heat from the gas processing plant can be used for carbon-free power generation. Low grade waste heat from the gas processing plant can be used to provide in-plant sub-ambient cooling, thus reducing the fuel consumption of the gas processing plant. Low grade waste heat from the gas processing plant can be used to provide ambient air conditioning or cooling in the industrial community of the gas processing plant or in a nearby non-industrial community, thus helping the community to consume less energy.

The energy conversion systems described can be integrated into an existing crude oil associated gas processing plant as a retrofit or can be integrated into a newly constructed gas processing plant. A retrofit to an existing gas processing plant allows the efficiency, power generation, and fuel savings advantages offered by the energy conversion systems described here to be accessible with a low-capital investment. The energy conversion systems can make use of existing structure in a gas processing plant while still enabling efficient waste heat recovery and conversion of waste heat to power and to cooling utilities. The integration of an energy conversion system into an existing gas processing plant can be generalizable to plant-specific operating modes.

Other features and advantages are apparent from the following description and from the claims.

BRIEF DESCRIPTION OF DRAWINGS

FIG. 8 is a diagram of an ejector.

DETAILED DESCRIPTION

Figure 1:
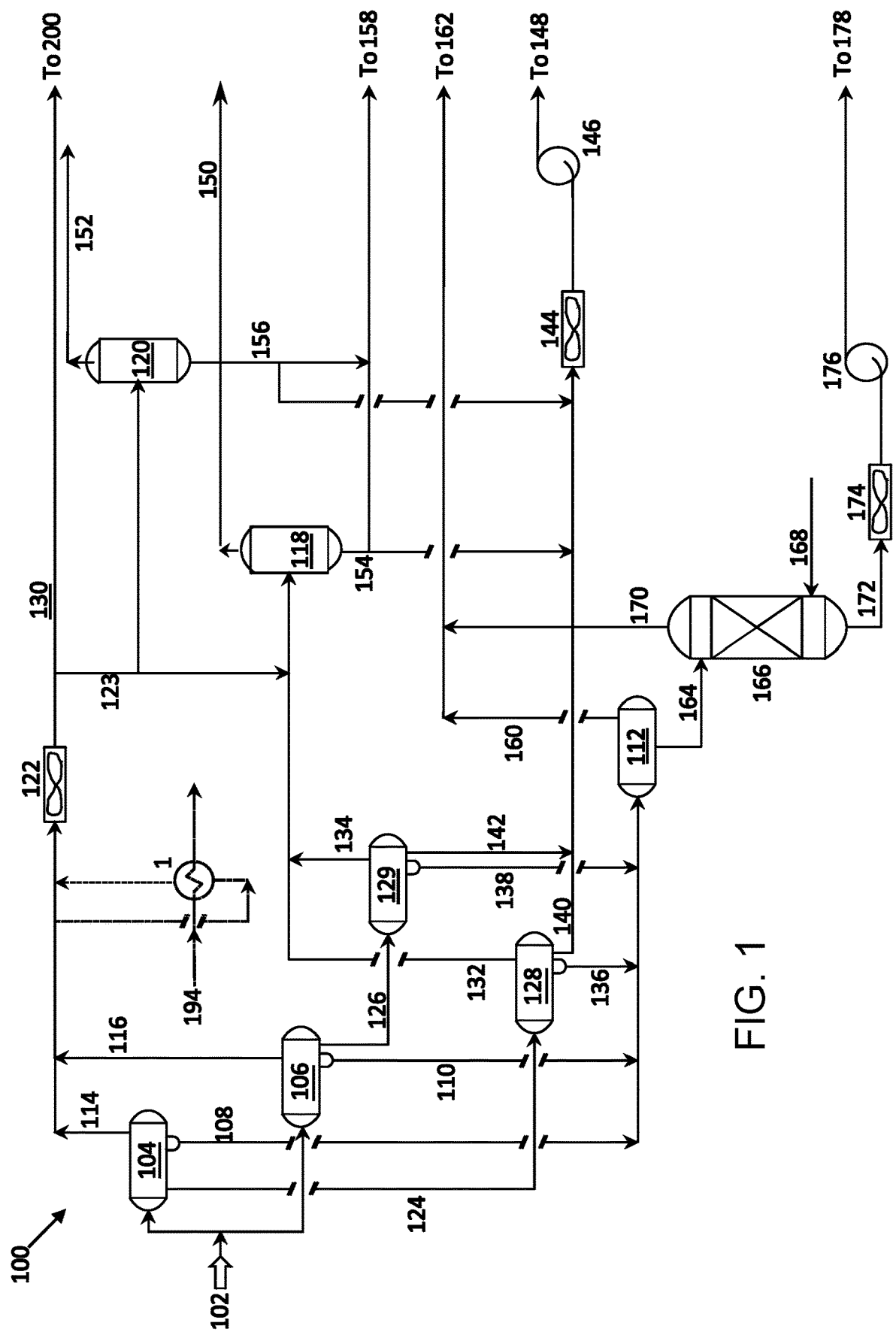
FIG. 1 is a diagram of an inlet area of a crude oil associated gas processing plant.

A low grade waste heat recovery network is integrated into a crude oil associated gas processing plant. Low grade waste heat recovery networks can include a network of heat exchangers in the gas processing plant recovers waste heat from various low grade sources in the gas processing plant. Recovered waste heat can be routed to an energy conversion system, such as an energy conversion system based on an Organic Rankine cycle, a Kalina cycle, or a modified Goswami cycle.

In energy conversion systems, the recovered waste heat can be converted into carbon-free power. In some types of energy conversion systems, the recovered waste heat can also be used to cool chilled water that is then returned to the gas processing plant for in-plant sub-ambient chilling, or can be used to cool directly gas streams in the gas processing plant, thus reducing the reliance of the gas processing plant on mechanical or propane refrigeration and enhancing the energy efficiency of the gas processing plant. In some types of energy conversion systems, recovered waste heat can also be used to provide ambient air conditioning or cooling to the industrial community of the gas processing plant or to a nearby non-industrial community. The amount of waste heat that is used for power generation versus that used for cooling can be flexibly adjusted in real time to allow the operation of the energy conversion system to be optimized based on current conditions, for example, environmental conditions or demand from a power grid. For instance, during hot summer days, the energy conversion system may be configured to provide primarily ambient air conditioning at the expense of power generation, while in winter the energy conversion system may be configured for more power generation.

FIGS. 1-5 show portions of a large scale crude oil associated gas processing plant with a feed capacity of, for example, about 2000 to 2500 million standard cubic feet per day. In some cases, the gas processing plant is a plant to process "associated gas," which is gas that is associated with crude oil coming from crude oil wells, or a plant to process "natural gas," which is gas coming directly from natural gas wells.

A low grade waste heat recovery network and sub-ambient cooling system is integrated into the crude oil associated gas processing plant of FIGS. 1-5 as a retrofit to the crude oil gas processing plant. A network of heat exchangers integrated into the crude oil associated gas processing plant recovers waste heat from various low grade sources in the gas processing plant. The recovered waste heat can be routed to an energy conversion system, where the recovered waste heat is converted into carbon-free power. In the energy conversion system, the recovered waste heat can also be used to cool chilled water that is returned to the gas processing plant for in-plant sub-ambient chilling, thus enabling the gas processing plant to consume less energy in cooling. In some cases, recovered waste heat can also be used to provide ambient air conditioning or cooling to the industrial community of the gas processing plant or to a nearby non-industrial community.

Figure 2:
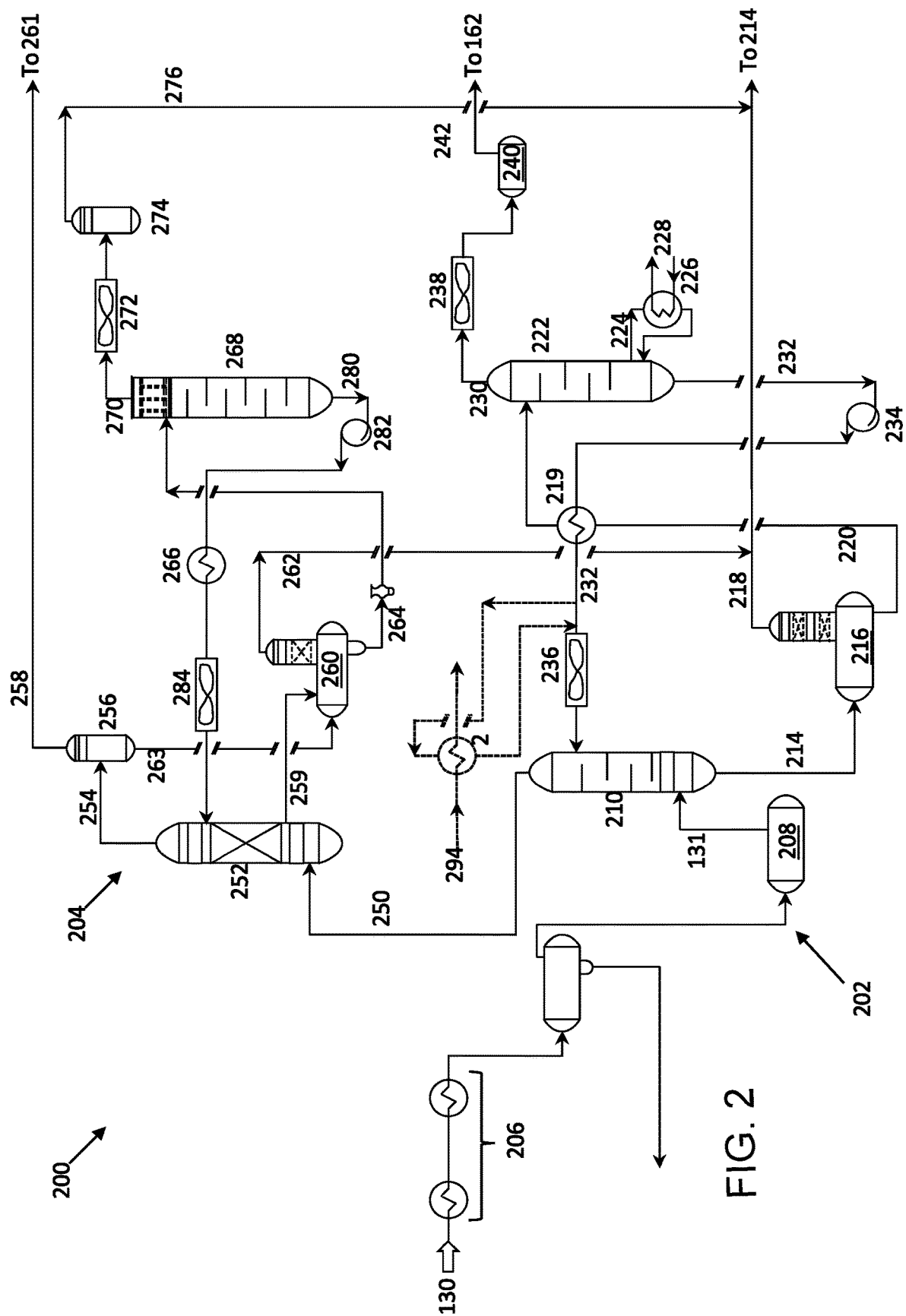
FIG. 2 is a diagram of a high pressure gas treating area of a crude oil associated gas processing plant.
Figure 3:
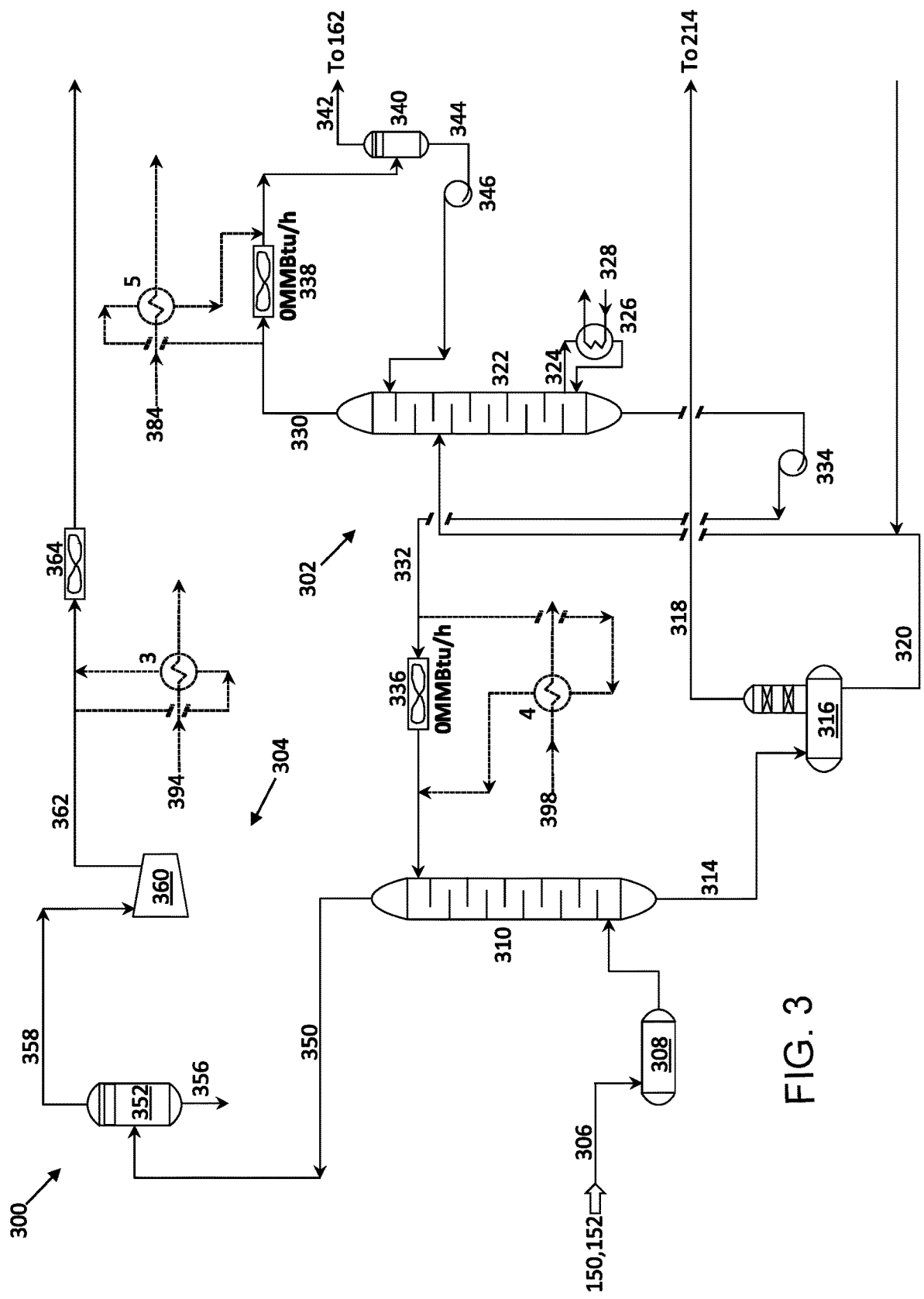
FIG. 3 is a diagram of a low pressure gas treating and feed gas compression section of a crude oil associated gas processing plant.
Figure 4:
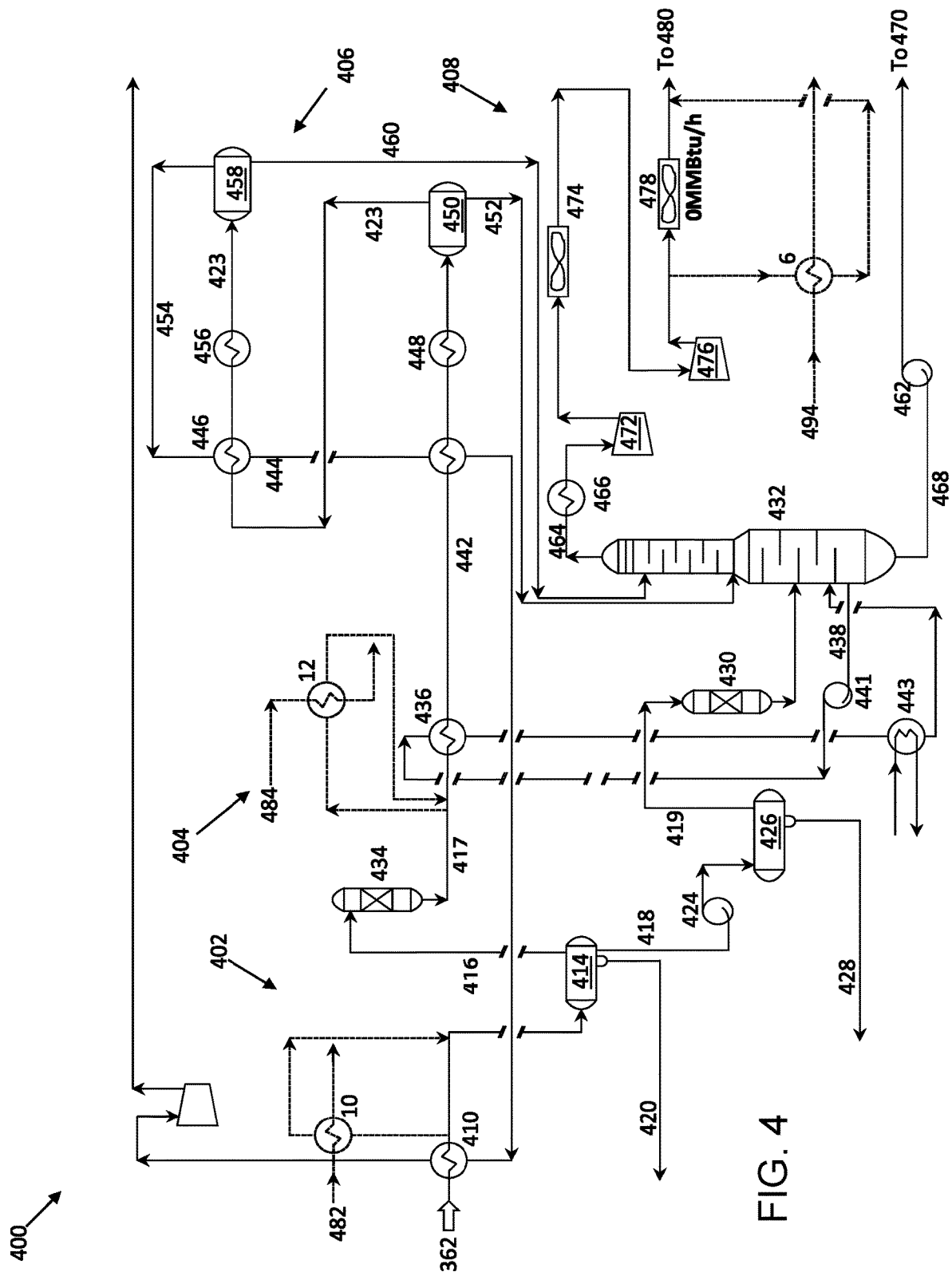
FIG. 4 is a diagram of a liquid recovery and sales gas compression unit of a crude oil associated gas processing plant.

A crude oil associated gas processing plant such as that shown in FIGS. 1-5, prior to a retrofit to introduce the low grade waste heat recovery network and sub-ambient cooling system described here, can waste low grade waste heat (for example, waste heat less than about 232° F.) to the environment, for instance, through air coolers. In an example, such a plant can waste about 3250 MM Btu/h of low grade waste heat to the environment. In addition, such a plant, prior to a retrofit, can consume about 500 MM Btu/h of sub-ambient cooling for the operation of a liquid recovery area 400 (FIG. 4). The introduction of the low grade waste heat recovery network and sub-ambient cooling system described here can contribute to a reduction in the amount of low grade waste heat released to the environment and can reduce the sub-ambient cooling load involved in operation of the liquid recovery area.

In operation, heating fluid is flowed through heat exchangers 1-7 (described in the following paragraphs). An inlet temperature of the heating fluid that is flowed into the inlets of each of heat exchangers 1-7 is substantially the same, for example, between about 130° F. and about 150° F., such as about 140° F., about 150° F., about 160° F., or another temperature. Each heat exchanger 1-7 heats the heating fluid to a respective temperature that is greater than the inlet temperature. The heated heating fluids from heat exchangers 1-7 are combined and flowed through a power generation system, where heat from the heated heating fluid heats the working fluid of the power generation system thereby increasing the working fluid pressure and temperature.

Referring to FIG. 1, in an inlet area 100 of a crude oil associated gas processing plant, an inlet gas stream 102, such as a three-phase well fluid feed stream, flows to receiving slug catchers 104, 106. Slug catchers 104, 106 are first stage, three-phase separators of well stream hydrocarbon (HC) condensate, gas, and sour water.

Well stream HC condensate 124, 126 from slug catchers 104, 106, respectively, flows to three-phase separators 128, 129, respectively, for flashing and additional separation. In three-phase separators 128, 129, gas is separated from liquid and HC liquids are separated from condensed water. Overhead gas 132, 134 flows to a low pressure (LP) gas separator 118. Sour water 136, 138 flows to sour water stripper pre-flash drum 112. HC condensate 140, 142 flows through a three-phase separator condensate cooler 144 and is pumped by one or more condensate pumps 146 to a crude injection header 148.

Hot vapors 114, 116 from slug catchers 104, 106, respectively. A heat exchanger 1 recovers waste heat from vapors 114, 116 by exchange with a heating fluid 194, such as oil, water, an organic fluid, or another fluid. For instance, heat exchanger 1 can recover between about 50 MM Btu/h and about 150 MM Btu/h of waste heat, such as about 50 MM Btu/h, about 100 MM Btu/h, about 150 MM Btu/h, or another amount of waste heat. Heat exchanger 1 cools down overhead vapors 114, 116 from slug catchers 104, 106 while raising the temperature of heating fluid 194, for example, from the inlet temperature to a temperature of, for instance, between about 180° F. and about 200° F., such as about 180° F., about 190° F., about 200° F., or another temperature. Heating fluid 194 leaving heat exchanger 1 is routed to a heating fluid system header that takes the heated heating fluid, for example, to a power generation unit or to a combined cooling and power generation plant.

Following recovery of waste heat at heat exchanger 1, vapors 114, 116 are cooled in a slug catcher vapor cooler 122. The operation of vapor cooler 122 can vary depending on the season. For instance, in summer, the temperature of incoming vapors 114, 116 can be higher than in winter and vapor cooler 112 can operate with a lower thermal duty in summer than in winter to cool vapors 114, 116 to a higher temperature in summer than in winter. The presence of heat exchanger 1 allows the thermal duty of cooler 122 to be lower than it would be without heat exchanger 1. For example, the thermal duty of cooler 122 can be reduced to, for example, between about 20 MM Btu/h and about 40 MM Btu/h, such as about 20 MM Btu/h, about 30 MM Btu/h, about 40 MM Btu/h, or another thermal duty, whereas the thermal duty of cooler 122 without heat exchanger 1 would have been between about 120 MM Btu/h and about 140 MM Btu/h in the summer and between about 190 MM Btu/h and about 210 MM Btu/h in the winter.

An output stream 180 of cooled sour gas from slug catcher vapor cooler 122 is split into two portions. A first portion 130 of cooled sour gas flows to a high pressure gas treating section 200 (FIG. 2). A second portion 123 of cooled sour gas flows to LP gas separators 118, 120, where any entrained moisture is removed from vapors 114, 116. Sour gas 150, 152 from the top of LP gas separators 118, 120 flows through a demister pad (not shown) which provides further protection against liquid entrainment, and is sent to a low pressure gas treating section 300 (FIG. 3). HC liquid 154, 156 from LP gas separators 118, 120 is sent to an HC condensate surge drum injection header 158 or to crude injection header 148.

Each slug catcher 104, 106 has a water boot to settle briny sour water-collecting entrained sediment prior to sour water 108, 110, respectively, being sent to a sour water stripper pre-flash drum 112. In pre-flash drum 112, sour water is processed in order to strip dissolved hydrogen sulfide (H2S) and hydrocarbons from the sour water in order to remove any entrained oil from the sour water prior to sour water disposal. Overhead acid gas 160 from pre-flash drum 112 is sent to a sulfur recovery unit 162. Sour water 164 from pre-flash drum 112 is fed into the top section of a sour water stripper column 166. The sour water flows down through the packed section of stripper column 166, where the sour water contacts low-pressure steam 168 injected below the packed section of stripper column 166. Steam 168 strips H2S from the sour water. H2S 170 flows from the top of stripper column 166 to sulfur recovery unit 162. Water 172 free of H2S flows from the bottom of stripper column 166 through a sour water effluent cooler 174, such as an air cooler, to the suction of a sour water reflux pump 176. Reflux pump 176 discharges reflux water back to stripper column 166 or to a gas plant oily water sewer system, such as an evaporation pond 178.

Referring to FIG. 2, a high pressure gas treating section 200 of the gas processing plant includes a gas treating area 202 and a dehydration unit 204. High pressure gas treating section 200 treats high pressure sour gas 130 received from inlet section (FIG. 1) of the gas processing plant. Gas treating area 202 treats sour gas 130, for example, with di-glycolamine (DGA), to remove contaminants, such as hydrogen sulfide (H2S) and carbon dioxide (CO2), to generate wet sweet sales gas 250. Sweet gas is a gas that is cleaned of H2S. Sweet gas can include a small amount of H2S, such as less than about 10 PPM (part per million) of H2S in the gas stream.

Sour feed gas 130 can be cooled by one or more heat exchangers or chillers 206. For instance, chiller 206 can be an intermittent load chiller that cools sour feed gas 130. From chiller 206, sour feed gas 130 flows to a feed gas filter separator 208. Disposal filters in filter separator 208 remove solid particles, such as dirt or iron sulfide, from sour gas 130. Vane demisters in filter separator 208 separate entrained liquid in sour gas 130.

Filtered sour gas 131 leaves filter separator 208 and enters the bottom of a di-glycolamine (DGA) contactor 210. The sour gas rises in DGA contactor and contacts liquid, lean DGA from a lean DGA stream 232 (discussed in the following paragraphs) flowing down the column of DGA contactor 210. Lean DGA in DGA contactor 210 absorbs H2S and CO2 from the sour gas. Wet sweet sales gas 250 exits from the top of DGA contactor and enters dehydration unit 204, discussed in the following paragraphs. Rich DGA 214, which is liquid DGA rich with H2S and CO2, exits the bottom of DGA contactor 210 and flows into a rich DGA flash drum 216. Sales gas is gas that is mainly methane and with a small amount of heavier gases such as ethane and a very small amount of propane. Sales gas exhibits heating value for industrial and non-industrial applications between about 900 and 1080 BTU/SCF (British thermal units per standard cubic foot).

In rich DGA flash drum 216, gas is separated from liquid rich DGA. Gas is released from the top of flash drum 216 as flash gas 218 which joins a fuel gas header 214, for example, for use in boilers.

Liquid rich DGA 220 exits the bottom of flash drum 216 and flows via a lean/rich DGA cooler 219 to a DGA stripper 222. The liquid rich DGA flows down the column of DGA stripper 222 and contacts acid gas and steam traveling upwards through the column from a stripper bottom reboiler stream 224. Stripper bottom reboiler stream 224 is heated in an exchanger 226 by exchange with low pressure steam (LPS) 228. H2S and CO2 are released with a mixture of DGA and water and stripper bottom reboiler stream 224 returns to DGA stripper 222 as a two-phase flow.

Acid gas travels upward through the column of DGA stripper 222 and leaves the top of DGA stripper 222 as an acid gas stream 230, which can include condensed sour water. Acid gas stream 230 flows to a DGA stripper overhead condenser 238 and then to a DGA stripper reflux drum 240, which separates acid gas and sour water. Acid gas 242 rises and exits from the top of reflux drum 240, from where acid gas 242 is directed to, for example, sulfur recovery unit 162 or to acid flare. Sour water (not shown) exits through the bottom of reflux drum 240 and is transferred by a stripper reflux pump (not shown) to the top tray of DGA stripper 222 to act as a top reflux stream.

Lean DGA solution 232 flows from the bottom of DGA stripper 222 and is pumped by one or more DGA circulation pumps 234 through lean/rich DGA cooler 219, heat exchanger 2, and lean DGA solution cooler 236. Heat exchanger 2 recovers waste heat by exchange with a heating fluid 294. For instance, heat exchanger 2 can recover between about 200 MM Btu/h and about 300 MM Btu/h of waste heat, such as about 200 MM Btu/h, about 250 MM Btu/h, about 300 MM Btu/h, or another amount of waste heat. Heat exchanger 2 cools down lean DGA stream 232 while raising the temperature of heating fluid 294, for example, from the inlet temperature to a temperature of, for instance, between about 210° F. and about 230° F., such as about 210° F., about 220° F., about 230° F., or another temperature. Heating fluid 294 leaving heat exchanger 2 is routed to a heating fluid system header that takes the heated heating fluid, for example, to a power generation unit or to a combined cooling and power generation plant.

The presence of heat exchanger 2 allows the thermal duty of lean DGA cooler 236 to be reduced. For example, the thermal duty of lean DGA cooler 236 can be reduced to, for example, between about 30 MM Btu/h and about 50 MM Btu/h, such as about 30 MM Btu/h, about 40 MM Btu/h, or about 50 MM Btu/h, or another thermal duty, from a previous value of between about 250 MM Btu/h and about 300 MM Btu/h.

In the gas sweetening process, complex products can be formed by the side reaction of lean DGA with contaminants. These side reactions can reduce the absorption process efficiency of lean DGA. In some cases, a reclaimer (not shown) can be used to convert these complex products back to DGA. A flow of lean DGA containing complex products can be routed from DGA stripper 222 to the reclaimer, which uses steam, for example, 250 psig steam, to heat the flow of lean DGA in order to convert the complex products to DGA. Lean DGA vapor leaves the top of the reclaimer and returns to DGA stripper 222. Reclaimed DGA flows from the bottom of the reclaimer to a DGA reclaimer sump. A side stream of reflux water can be used to control the reclamation temperature in the reclaimer.

In dehydration area 204, wet sweet sales gas 250, which is overhead from DGA contactor 210, is treated to remove water vapor from the gas stream. Wet sweet sales gas 250 enters the bottom of a tri-ethylene glycol (TEG) contactor 252. The wet sweet sales gas 250 rises in TEG contactor 252 and contacts liquid, lean from a lean TEG stream 280 (discussed in the following paragraphs) flowing down the column of TEG contactor 252. In some cases, a hydroscopic liquid other than TEG can be used. Lean TEG in TEG contactor 252 removes water vapor from the sweet sales gas. Dry sweet sales gas 254 flows from the top of TEG contactor 252 to a sales gas knockout (KO) drum 256. Overhead 258 from sales gas KO drum 256 is sent to a gas grid 261.

Rich TEG 259 flows from the bottom of TEG contactor 252 to a rich TEG flash drum 260. Bottoms 263 from sales gas KO drum 256 also flows to rich TEG flash drum 260. Gas is released from the top of flash drum 260 as flash gas 262 and joins fuel gas header 214, for example, for use in boilers.

Liquid rich TEG 264 exits the bottom of flash drum 260 and flows via a lean/rich TEG exchanger 266 to a TEG stripper 268. In TEG stripper 268, water vapor is stripped from the liquid rich TEG by warm vapors generated by a TEG stripper reboiler (not shown). Overhead off-gas 270 flows from the top of TEG stripper 268 through an overhead condenser 272 to a TEG stripper off-gas reflux drum 274. Reflux drum 274 separates off-gas from condensate. Off-gas 276 exits the top of reflux drum 274 and joins fuel gas header 214, for example, for use in boilers. TEG stripper reflux pumps (not shown) pump condensate 278 from the bottom of reflux drum 274 to crude injection header 148 and water (not shown) to a waste water stripper.

Lean TEG 280 from the bottom of TEG stripper 268 is pumped by one or more lean TEG circulation pumps 282 to lean/rich TEG exchanger 266 and then through a lean TEG cooler 284 before being returned to the top of TEG contactor 252.

Referring to FIG. 3, a low pressure gas treating and feed gas compression section 300 of the gas processing plant includes a gas treating area 302 and a feed gas compression area 304. Gas treating and compression section 300 treats sour gas 150, 152 received from inlet section 100 (FIG. 1) of the gas processing plant.

Gas treating area 302 treats sour gas 150, 152 (referred to collectively as a sour gas feed stream 306) to remove contaminants, such as H2S and CO2, to generate sweet gas 350. Sour gas feed stream 306 feeds into a feed gas filter separator 308. Disposal filters in filter separator 308 remove solid particles, such as dirt or iron sulfide, from sour gas feed stream 306. Vane demisters in filter separator 308 separate entrained liquid in sour gas feed stream 306.

A filtered sour gas feed stream 307 leaves filter separator 308 and enters the bottom of a DGA contactor 310. The sour gas rises in DGA contactor 310 and contacts lean DGA from a lean DGA stream 332 (discussed in the following paragraphs) flowing down the column of DGA contactor. Lean DGA in DGA contactor 310 absorbs H2S and CO2 from the sour gas. Sweet gas 350 exits from the top of DGA contactor 310 and enters feed gas compression area 304, discussed in the following paragraphs. Rich DGA 314 exits the bottom of DGA contactor 310 and flows into a rich DGA flash drum 316.

Rich DGA flash drum 316 lowers the pressure of rich DGA 314, causing gas to be separated from liquid rich DGA. Gas is released from the top of flash drum 316 as flash gas 318 and joins fuel gas header 214 (FIG. 2), for example, for use in boilers.

Liquid rich DGA 320 exits the bottom of flash drum 316 and flows via a cooler (not shown) to a DGA stripper 322. The liquid rich DGA flows down the column of DGA stripper 322 and contacts acid gas and steam traveling upwards through the column from a stripper bottom reboiler stream 324. Stripper bottom reboiler stream 324 is heated in an exchanger 326 by exchange with low pressure steam (LPS) 328. H2S and CO2 are released with a mixture of DGA and water and stripper bottom reboiler stream 324 returns to DGA stripper 322 as a two-phase flow.

Acid gas travels upward through the column of DGA stripper 322 and leaves the top of DGA stripper 322 as an acid gas stream 330. Acid gas stream 330 can include condensed sour water. A third waste heat recovery exchanger 5 cools acid gas stream 330 from DGA stripper 322. Heat exchanger 5 recovers waste heat by exchange with a heating fluid 384. For instance, heat exchanger 5 can recover between about 300 MM Btu/h and about 400 MM Btu/h of waste heat, such as about 300 MM Btu/h, about 350 MM Btu/h, about 400 MM Btu/h, or another amount of waste heat. Heat exchanger 5 cools down acid gas stream 330 while raising the temperature of heating fluid 384, for example, from the inlet temperature to a temperature of, for instance, between about 190° F. and about 210° F., such as about 190° F., about 200° F., about 210° F., or another temperature. Heated heating fluid 384 is routed to a heating fluid system header that takes the heated heating fluid, for example, to a power generation unit or to a combined cooling and power generation plant.

The presence of heat exchanger 5 allows a DGA stripper overhead condenser 338 to be bypassed. In the absence of heat exchanger 5, DGA stripper overhead condenser 338 reduces the temperature of acid gas stream 330, causing water to condense. DGA stripper overhead condenser 338 can have a thermal duty of between about 300 MM Btu/h and about 400 MM Btu/h, such as about 300 MM Btu/h, about 350 MM Btu/h, about 400 MM Btu/h, or another thermal duty. However, DGA stripper overhead condenser 338 is not used (for instance, the thermal duty of DGA stripper overhead condenser 338 is reduced to zero) when acid gas stream 330 is cooled by heat exchanger 5, thus conserving the entire thermal duty of DGA stripper overhead condenser 338.

Cooled acid gas stream 330 enters a DGA stripper reflux drum 340, which acts as a separator. Acid gas 342 rises and exits from the top of reflux drum 340, from where acid gas 342 is directed to, for example, sulfur recovery unit 162 or to acid flare. Sour water 344 exits through the bottom of reflux drum 340 and is transferred by a stripper reflux pump 346 to the top tray of DGA stripper 322 to act as a top reflux stream.

Lean DGA solution 332 flows from the bottom of DGA stripper 322 and is pumped by one or more DGA circulation pumps 334 through a waste heat recovery exchanger 4, which cools lean DGA stream 332 from DGA stripper 322. Heat exchanger 4 recovers waste heat by exchange with a heating fluid 398. For instance, heat exchanger 4 can recover between about 1200 MM Btu/h and about 1300 MM Btu/h of waste heat, such as about 1200 MM Btu/h, about 1250 MM Btu/h, about 1300 MM Btu/h, or another amount of waste heat. Heat exchanger 4 cools down lean DGA stream 332 while raising the temperature of heating fluid 398, for example, from the inlet temperature to a temperature of, for instance, between about 260° F. and about 280° F., such as about 260° F., about 270° F., about 280° F., or another temperature. Heated heating fluids 398 is routed to a heating fluid system header that takes the heated heating fluid, for example, to a power generation unit or to a combined cooling and power generation plant. Cooled lean DGA solution 332 is fed into the top of DGA contactor 310.

The presence of heat exchanger 4 allows one or more lean DGA solution coolers 336 to be bypassed. In the absence of heat exchanger 4, lean DGA solution 332 is cooled by lean DGA solution coolers 336, which can have a thermal duty of between about 1200 MM Btu/h and about 1300 MM Btu/h, such as about 1200 MM Btu/h, about 1250 MM Btu/h, about 1300 MM Btu/h, or another thermal duty. However, lean DGA solution coolers 336 are not used (for instance, the thermal duty of lean DGA solution coolers 336 is reduced to zero) when lean DGA solution 332 is cooled by heat exchanger 4, thus conserving the entire thermal duty of lean DGA solution coolers 336.

In the gas sweetening process, complex products can be formed by the side reaction of lean DGA with contaminants. These side reactions can reduce the absorption process efficiency of lean DGA. In some cases, a reclaimer (not shown) can be used to convert these complex products back to DGA. A flow of lean DGA containing complex products can be routed from DGA stripper 322 to the reclaimer, which uses steam to heat the flow of lean DGA in order to convert the complex products to DGA. Lean DGA vapor leaves the top of the reclaimer and returns to DGA stripper 322. Reclaimed DGA flows from the bottom of the reclaimer to a DGA reclaimer sump. A side stream of reflux water can be used to control the reclamation temperature in the reclaimer.

In feed gas compression area 304, sweet gas 350, which is overhead from DGA contactor 310, is compressed and cooled. Sweet gas 350 flows from DGA contactor 310 into a feed compressor suction scrubber 352 that removes any water that condenses in the pipework between gas treating area 302 and suction scrubber 352. For instance, suction scrubber 352 can have a wire mesh demister pad for water removal. Liquids 356 that collect in suction scrubber 354 are returned to a DGA flash drum (not shown). Dry gas 358 leaves the top of suction scrubber 354 and flows to the suction side of a feed compressor 360, which can be, for example, a four-stage centrifugal compressor. In some cases, feed compressor 360 can have multiple feed gas compression trains. Discharge from each of the feed gas compression trains of feed compressor 360 are joined into a single header 362.

After feed compressor 360, header 362 is cooled by a waste heat recovery exchanger 3 and subsequently by a cooler 364. Heat exchanger 3 recovers waste heat by exchange with a heating fluid 394. For instance, heat exchanger 3 can recover between about 250 MM Btu/h and about 350 MM Btu/h of waste heat, such as about 250 MM Btu/h, about 300 MM Btu/h, about 350 MM Btu/h, or another amount of waste heat. Heat exchanger 3 cools down discharge gas of header 362 while raising the temperature of heating fluid 394, for example, from the inlet temperature to a temperature of, for instance, between about 260° F. and about 280° F., such as about 260° F., about 270° F., about 280° F., or another temperature. Heated heating fluids 394 is routed to a heating fluid system header that takes the heated heating fluid, for example, to a power generation unit or to a combined cooling and power generation plant. Cooled header 362 flows to chilldown sections in a liquid recovery unit 400 (FIG. 4).

The presence of heat exchanger 3 allows the thermal duty of compressor after cooler 364 to be reduced. For example, the thermal duty of compressor after cooler 364 can be reduced to, for example, between about 20 MM Btu/h and about 40 MM Btu/h, such as about 20 MM Btu/h, about 30 MM Btu/h, about 40 MM Btu/h, or another thermal duty, from a previous value of between about 300 MM Btu/h and about 400 MM Btu/h.

FIG. 4 shows a liquid recovery and sales gas compression unit 400 of the gas processing plant that cools and compresses header 362 (sometimes referred to as feed gas 362) received from low pressure gas treating and feed gas compression section 300. Liquid recovery and sales gas compression unit 400 includes a first chilldown train 402, a second chilldown train 404, a third chilldown train 406, and a de-methanizer section 408. Liquid recovery and sales gas compression unit 400 also includes a propane refrigerant section 500 (FIG. 5) and an ethane refrigerant section (not shown).

Liquid recovery and sales gas compression unit 400 includes a chilled water network including water chillers 10, 12. Water chillers 10, 12 use chilled water produced in a combined cooling and power generation plant (for example, as shown in FIGS. 13A-13B and 14A-14C), to cool feed gas in modified liquid recovery unit 490. Chilled water fed into water chillers 10, 12 can be at a temperature of, for instance, between about 35° F. and about 45° F., such as about 35° F., about 40° F., about 45° F., or another temperature, sometimes referred to as the initial chilled water temperature. Water chillers 10, 12 replace propane or mechanical refrigeration using in liquid recovery unit 400 (FIG. 4).

Feed gas 362 from low pressure gas treating and feed gas compression section 300 enters first chilldown train 402, which cools feed gas 362. Feed gas 362 flows through a first residue/feed exchanger 410 that cools feed gas 362 by exchange with a high-pressure residue gas 454, discussed in the following paragraphs. Feed gas 362 is further cooled in water chiller 10. Water chiller 10 has a cooling duty of, for example, between about 50 MM Btu/h and about 150 MM Btu/h, such as about 50 MM Btu/h, about 100 MM Btu/h, about 150 MM Btu/h, or another cooling duty. Water chiller 10 cools feed gas 362 while raising the temperature of chilled water 482, for example, from the initial chilled water temperature to a temperature of between about 90° F. and about 110° F., such as about 90° F., about 100° F., about 110° F., or another temperature.

In the absence of water chiller 10, feed gas 362 can be further cooled in a first propane feed chiller that further cools feed gas 362 by vaporizing propane refrigerant in the shell side of the first propane feed chiller. The first propane feed chiller can have a thermal duty of, for instance, between about 50 MM Btu/h and about 150 MM Btu/h, such as about 50 MM Btu/h, about 100 MM Btu/h, about 150 MM Btu/h, or another thermal duty. However, the first propane feed chiller is not used when feed gas 362 is cooled by water chiller 10, thus conserving the entire thermal duty of the first propane feed chiller.

Feed gas 362 from water chiller 10 flows through a first chilldown separator 414 that separates feed gas 362 into three phases: hydrocarbon feed gas 416, condensed hydrocarbons 418, and water 420. Water 420 flows into a separator boot and is routed to a process water recovery drum, from where the water can be used, for example, as make-up in a gas treating unit.

Condensed hydrocarbons 418, sometimes referred to as first chilldown liquid 418, is pumped from first chilldown separator 414 by one or more liquid dehydrator feed pumps 424. First chilldown liquid 418 is pumped through a de-methanizer feed coalescer 426 to remove any free water entrained in first chilldown liquid 418, for example, to avoid damage to downstream dehydrators. Removed water 428 flows to a condensate surge drum (not shown). Remaining first chilldown liquid 419 is pumped to one or more liquid dehydrators 430, for example, a pair of liquid dehydrators. Drying in liquid dehydrators 430 can be achieved by passing first chilldown liquid 419 through a bed of activated alumina in a first one of the liquid dehydrators while a second one of the liquid dehydrators is in regeneration. Alumina has a strong affinity for water at the conditions of first chilldown liquid 419. Once the alumina in the first liquid dehydrator is saturated, the first liquid dehydrator is taken off-line and regenerated while first chilldown liquid 419 is passes through the second liquid dehydrator. Dehydrated first chilldown liquid 421 exits liquid dehydrators 430 and is passed to a de-methanizer column 432.

Hydrocarbon feed gas 416 from first chilldown separator 414 flows through a demister (not shown) to one or more feed gas dehydrators 434 for drying, for example, three feed gas dehydrators. Two of the three gas dehydrators can be on-stream at any given time while the third gas dehydrator is on regeneration or standby. Drying in gas dehydrators 434 can be achieved by passing hydrocarbon feed gas 416 through a molecular sieve bed. The sieve has a strong affinity for water at the conditions of feed gas 416. Once the sieve in one of the gas dehydrators is saturated, that gas dehydrator is taken off-stream for regeneration while the previously off-stream gas dehydrator is placed on-stream.

Dehydrated feed gas 417 exits feed gas dehydrators 434 and enters second chilldown train 404, which cools feed gas. In second chilldown train 404, dehydrated feed gas 417 is cooled in water chiller 12. Water chiller 12 has a cooling duty of, for example, between about 50 MM Btu/h and about 150 MM Btu/h, such as about 50 MM Btu/h, about 100 MM Btu/h, about 150 MM Btu/h, or another cooling duty. Water chiller 12 cools feed gas 416 while raising the temperature of chilled water 484, for example, from the initial chilled water temperature to a temperature of between about 55° F. and about 75° F., such as about 55° F., about 65° F., about 75° F., or another temperature. Heated chilled water 482, 484 from water chillers 10, 12 returns to a combined cooling and power generation plant.

After water chiller 12, cooled dehydrated feed gas 417 enters the tube side of a de-methanizer reboiler 436. Liquid 438 trapped on a first tray of de-methanizer column 432 is pumped by a de-methanizer reboiler pump 441 to the shell side of de-methanizer reboiler 436. Dehydrated feed gas 417 heats liquid 438 in de-methanizer reboiler 436 and vaporizes at least a portion of liquid 438. Heated liquid 438 returns to de-methanizer column 432 via a trim reboiler 443. Dehydrated feed gas 417 is cooled by exchange with liquid 438.

In the absence of water chiller 12, dehydrated feed gas 417 is further cooled in a second propane feed chiller by exchange with chilled propane. The second propane feed chiller can have a thermal duty of, for instance, between about 50 MM Btu/h and about 150 MM Btu/h, such as about 50 MM Btu/h, about 100 MM Btu/h, about 150 MM Btu/h, or another thermal duty. However, the second propane feed chiller is not used when dehydrated feed gas 417 is cooled by water chiller 12, thus conserving the entire thermal duty of the second propane feed chiller.

Chilled dehydrated feed gas 417 then passes into a second residue/feed gas exchanger 442, which cools chilled dehydrated feed gas 417 by exchange with high-pressure residue gas 454. Cooling medium 444 (for example, uncondensed gas) from a third residue/feed gas exchanger 446, discussed in the following paragraphs, flows through the shell side of second residue/feed gas exchanger 442 to drop the temperature of dehydrated feed gas 417. Dehydrated feed gas 417 then passes through a third propane feed chiller 448 that further cools dehydrated feed gas 417 by exchange with chilled propane.

Dehydrated feed gas 417 and condensed hydrocarbon liquid from third feed chiller 448 enter a second chilldown separator 450. In second chilldown separator 450, hydrocarbon liquid 452 (sometimes referred to as second chilldown liquid 452) is separated from feed gas 423. Second chilldown liquid 452 is throttled to de-methanizer column 432, for example, to tray 10 of de-methanizer column 432. Feed gas 423 flows to third residue/feed gas exchanger 446 in third chilldown train 406.

Third chilldown train 406 cools feed gas 423 in two stages. In the first stage, feed gas 423 from second chilldown separator 450 enters the tube side of third residue/feed gas exchanger 446. Third residue/feed gas exchanger 446 cools feed gas 423 by exchange with high-pressure residue gas 454 on the shell side of third residue/feed gas exchanger.

In the second stage of third chilldown train 406, feed gas 423 passes through a final feed chiller 456, which drops the temperature of feed gas 23 using ethane refrigerant. Feed gas 423 condensed hydrocarbon liquid from final feed chiller 456 enters a third chilldown separator 458. Third chilldown separator 458 separates hydrocarbon liquid 460 (sometimes referred to as third chilldown liquid 460) from feed gas 454. Third chilldown liquid 460 is fed into de-methanizer column 432.

Feed gas 454 from third chilldown separator 458 sometimes also referred to as high-pressure residue gas 454, is used to cool incoming dehydrated feed gas 417 in third residue/feed gas exchanger while itself being heated. High-pressure residue gas 454 flows through second residue/feed gas exchanger 442, where dehydrated feed gas 417 is cooled and high-pressure residue gas 454 is heated. High-pressure residue gas 454 then flows through first residue/feed gas exchanger 410, where feed gas 362 is cooled and high-pressure residue gas 454 is heated.

De-methanizer section 408 removes methane from the hydrocarbons condensed out of the feed gas in chilldown trains 402, 404, 406. De-methanizer 432 receives four main feed streams. The first feed stream into de-methanizer 432, for example, into tray 4 of de-methanizer 432, includes first chilldown liquid 418 from first chilldown separator 414. The first feed stream can also include a minimum flow circulation from one or more de-methanizer reboiler pumps. The second feed stream into de-methanizer 432, for example, into tray 10 of de-methanizer 432, includes second chilldown liquid 452 from second chilldown separator 452. The third feed stream into de-methanizer 432, for example, into tray 19 of de-methanizer 432, includes third chilldown liquid 460 from third chilldown separator 458. The fourth feed stream (not shown) into de-methanizer 432 can include streams from vents from a propane surge drum 526 (FIG. 5), vents from propane condensers, vents and minimum flow lines from a de-methanizer bottom pump 462, and surge vent lines from natural gas liquid (NGL) surge spheres. De-methanizer bottoms 468 are pumped by de-methanizer bottoms pump 462 to NGL surge spheres 470.

Overhead low-pressure (LP) residue gas 464 from de-methanizer 432 flows from the top of de-methanizer 432 to the tube side of an ethane sub-cooler 466. Condensed ethane leaving an ethane surge drum (not shown) flows through the shell side of ethane sub-cooler 466. In ethane sub-cooler 466, LP residue gas 464 recovers heat from the condensed ethane and heats up while cooling the condensed ethane. LP residue gas 464 exiting ethane sub-cooler 466 flows to the tube side of a propane sub-cooler (not shown). Condensed propane leaving propane surge drum 526 (FIG. 5) flows through the shell side of the propane sub-cooler. In the propane sub-cooler, LP residue gas 464 recovers heat from the condensed propane and heats by exchange with condensed propane. Heated LP residue gas 464 is compressed in a fuel gas compressor 472 and cooled by a fuel gas compressor after-cooler 474, then compressed in a sales gas compressor 476.

A waste heat recovery exchanger 6 cools LP residue gas 464 after compression in sales gas compressor 476. Heat exchanger 6 recovers waste heat by exchange with a heating fluid 494. For instance, heat exchanger 6 can recover between about 100 MM Btu/h and about 200 MM Btu/h of waste heat, such as about 100 MM Btu/h, about 150 MM Btu/h, about 200 MM Btu/h, or another amount of waste heat. Heat exchanger 6 cools LP residue gas 464 while raising the temperature of heating fluid 494, for example, from the inlet temperature to a temperature of, for instance, between about 260° F. and about 280° F., such as about 260° F., about 270° F., about 280° F., or another temperature. Heated heating fluid 494 is routed to a heating fluid system header that takes the heated heating fluid, for example, to a power generation unit or to a combined cooling and power generation plant. The compressed and cooled LP residue gas 464 flows to a sales gas pipeline 480. The presence of heat exchanger 6 allows a sales gas compressor after cooler 478 to be bypassed, thus conserving the entire thermal duty of sales gas compressor after cooler 478.

Figure 5:
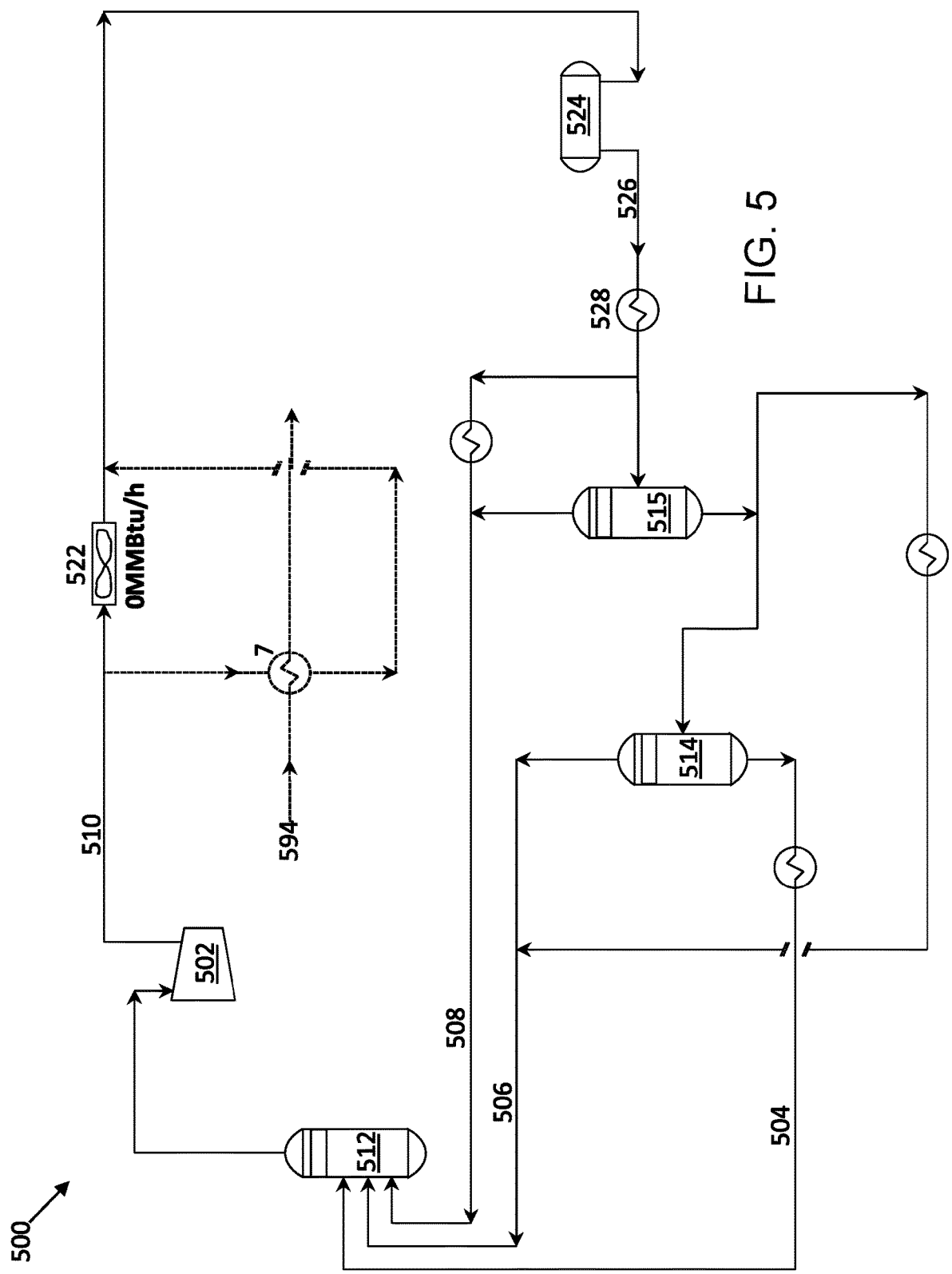
FIG. 5 is a diagram of a propane refrigerant section of a crude oil associated gas processing plant.

Referring to FIG. 5, propane refrigerant section 500 is a three-stage, closed-loop system that supplies propane refrigerant to chilldown trains 402, 404, 406 (FIG. 4). In propane refrigerant system 500, a compressor 502 compresses gas from three propane streams 504, 506, 508 into a common propane gas header 510. Liquids are removed from propane streams 504, 506, 508 by a suction scrubber 512 prior to compression by compressor 502. Propane streams 504, 506, 508 receive propane vapors from an LP economizer 514, a high-pressure (HP) economizer 515, and propane chillers 206, 440, 448.

A waste heat recovery exchanger 7 cools propane gas header 510. Heat exchanger 7 recovers waste heat by exchange with a heating fluid 594. For instance, heat exchanger 7 can recover between about 700 MM Btu/h and about 800 MM Btu/h of waste heat, such as about 700 MM Btu/h, about 750 MM Btu/h, about 800 MM Btu/h, or another amount of waste heat. Heat exchanger 7 cools propane gas header 510 while raising the temperature of heating fluid 594, for example, from the inlet temperature to a temperature of, for instance, between about 180° F. and about 200° F., such as about 180° F., about 190° F., about 200° F., or another temperature. Heated heating fluid 594 is routed to a heating fluid system header that takes the heated heating fluid, for example, to a power generation unit or to a combined cooling and power generation plant.

In the absence of heat exchanger 7, propane gas header 510 is cooled in a propane condenser 522, which can have a thermal duty of, for instance, between about 750 MM Btu/h and about 850 MM Btu/h, such as about 750 MM Btu/h, about 800 MM Btu/h, about 850 MM Btu/h, or another thermal duty. However, propane condenser 522 is not used when propane gas header 510 is cooled in heat exchanger 7, thus conserving the entire thermal duty of propane condenser 522.

Following heat exchanger 7, cooled propane gas header 510 flows to one or more propane surge drums 524. Liquid propane 526 leaving propane surge drums 524 passes through the shell side of a first propane sub-cooler and a second propane sub-cooler (shown collectively as a propane sub-cooler 528). The first propane sub-cooler, which is shown as first feed chiller 412 in FIG. 4, lowers the temperature of liquid propane 526 by heat exchange with LP residue gas 464 leaving ethane sub-cooler 466 (FIG. 4). The second propane sub-cooler further lowers the temperature of liquid propane 526 by heat exchange with NGL product, for example, from NGL surge spheres 470. Second propane sub-cooler includes a regeneration gas air cooler and a wet regeneration gas chiller (not shown).

Cooled liquid propane 526 leaving propane sub-coolers 528 is flashed into the shell side of chiller 206 (FIG. 2) in HP DGA unit and HP economizer 515. HP economizer 515 stores propane received from propane sub-coolers 528. Overhead vapors from HP economizer vent into third propane gas stream 508, which returns to suction scrubber 512. HP economizer 515 also sends propane to LP economizer 514, second feed chiller 440, and de-methanizer overhead condenser. LP economizer 514 stores liquid propane from HP economizer 515. Overhead vapors from LP economizer vent into second propane gas stream 506, which returns to suction scrubber 512. Propane liquid in LP economizer 512 is used in third propane feed chiller 448 to ethane condenser downstream of an ethane compressor, discussed below (not shown).

Liquid recovery unit 400 includes an ethane refrigerant system (not shown), which is a single-stage, closed-loop system that supplies ethane refrigerant to final feed chiller 456 (FIG. 4). The ethane refrigerant system includes a suction scrubber that removes ethane liquid from ethane vapor that is received from final feed chiller 456. Ethane vapors flow from the suction scrubber to an ethane compressor. The compressed ethane vapors leaving the ethane compressor pass through the tube side of an ethane condenser, in which the vapors are condensed by propane refrigerant flowing through the shell side of the ethane condenser.

The flow of condensed ethane from the tube side of the ethane condenser accumulates in an ethane surge drum. Condensed ethane from the ethane surge drum passes through the shell side of ethane sub-cooler 466 (FIG. 4), which lowers the temperature of the condensed ethane using LP residue gas 464 on the tube side of ethane sub-cooler 466 as the cooling medium. Ethane liquid leaving ethane sub-cooler 466 flows into the shell side of final feed chiller 456, where the ethane liquid is cooled.

The load on one or more of heat exchangers 1-7 can vary, for instance, on a seasonal basis, because the load on the gas processing plant changes seasonally due to variations in demand. The heat exchangers 1-7 can operate in a partial load operations mode in which the duty of the heat exchangers 1-7 is less than the full load at which the heat exchangers can be operated.

A heating fluid circuit to flow heating fluid through the heat exchangers 1-7 can include multiple valves that can be operated manually or automatically. For example, the gas processing plant can be fitted with the heating fluid flow pipes and valves. An operator can manually open each valve in the circuit to cause the heating fluid to flow through the circuit. To cease waste heat recovery, for example, to perform repair or maintenance or for other reasons, the operator can manually close each valve in the circuit. Alternatively, a control system, for example, a computer-controlled control system, can be connected to each valve in the circuit. The control system can automatically control the valves based, for example, on feedback from sensors (for example, temperature, pressure or other sensors), installed at different locations in the circuit. The control system can also be operated by an operator.

The waste heat recovered from the crude oil associated gas processing plant by the network of heat exchangers 1-7 discussed supra can be used for power generation, for in-plant sub-ambient cooling, or for ambient air conditioning or cooling. Power and chilled water for cooling can be generated by an energy conversion system, such as an energy conversion system based on an Organic Rankine cycle, a Kalina cycle, or a modified Goswami cycle.

Figure 6:
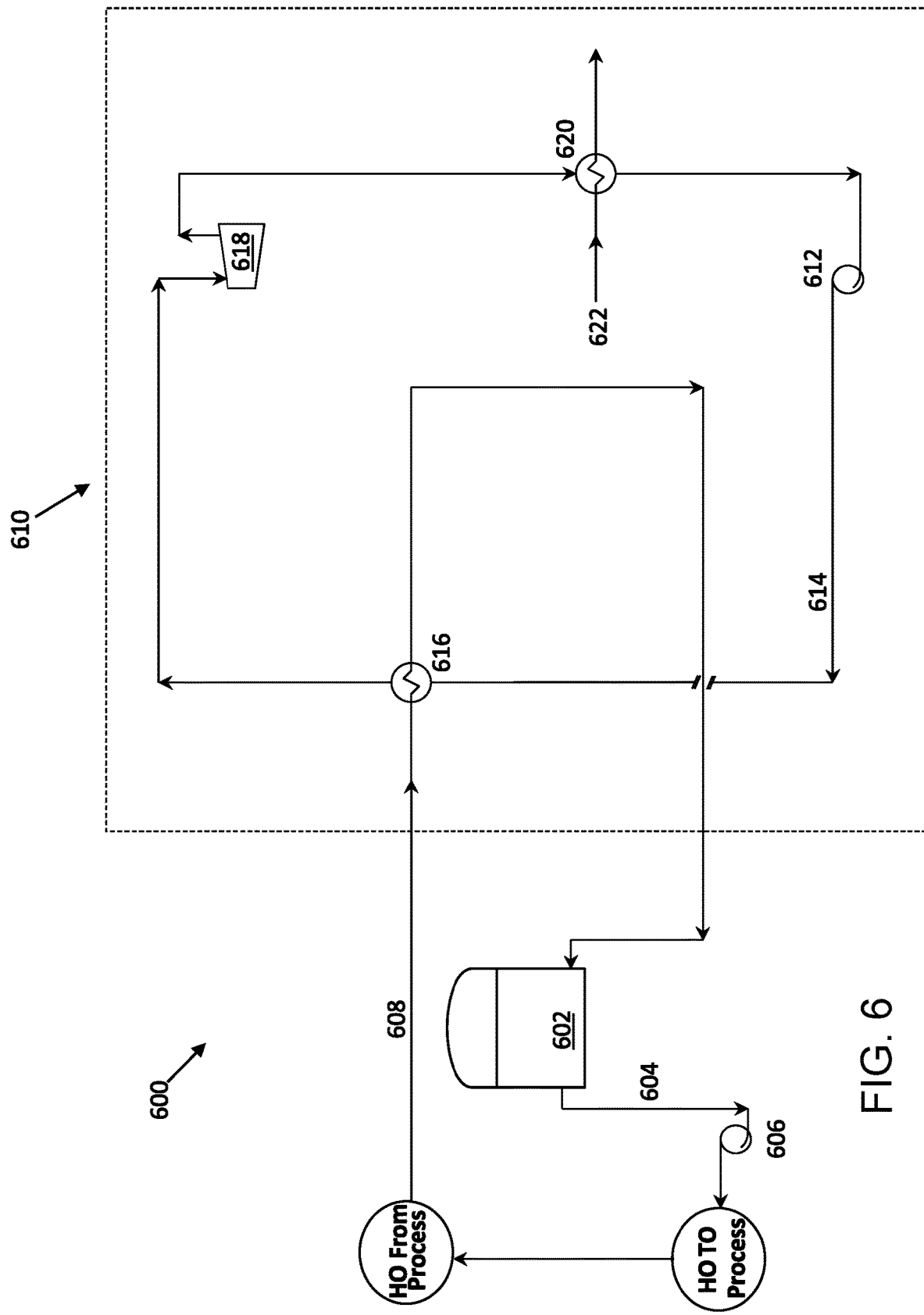
FIG. 6 is a diagram of an Organic Rankine cycle based waste heat to power conversion plant.

Referring to FIG. 6, waste heat from the crude oil associated gas processing plant that is recovered through the network of heat exchangers 1-7 shown in FIGS. 1-5 can be used to power an Organic Rankine cycle based waste heat to power conversion plant 600. An Organic Rankine cycle (ORC) is an energy conversion system that uses an organic fluid, such as iso-butane, in a closed loop arrangement. Waste heat to power conversion plant 600 includes an accumulation tank 602 that stores heating fluid, such as oil, water, an organic fluid, or another heating fluid. Heating fluid 604 is pumped from accumulation tank 602 to heat exchangers 1-7 (FIGS. 1-5) by a heating fluid circulation pump 606. For instance, heating fluid 604 can be at a temperature of between about 130° F. and about 150° F., such as about 130° F., about 140° F., about 150° F., or another temperature.

Heated heating fluid from each of heat exchangers 1-7 (for example, heating fluid that has been heated by recovery of waste heat at each of heat exchangers 1-7) is joined into a common hot fluid header 608. Hot fluid header 608 can be at a temperature of, for example, between about 210° F. and about 230° F., such as about 210° F., about 220° F., about 230° F., or another temperature. The volume of fluid in hot fluid header 608 can be, for instance, between about 0.6

MMT/D (million tons per day) and about 0.8 MMT/D, such as about 0.6 MMT/D, about 0.7 MMT/D, about 0.8 MMT/D, or another volume.

Heat from the heated heating fluid heats the working fluid of the ORC thereby increasing the working fluid pressure and temperature and decreasing the temperature of the heating fluid. The heating fluid is then collected in an accumulation tank 602 and can be pumped back through heat exchangers 1-7 to restart the waste heat recovery cycle. Waste heat to power conversion plant 600 can generate more power in the winter than in the summer. For instance, waste heat to power conversion plant 600 can generate, for example, between about 70 MW and about 90 MW of power in winter, such as about 70 MW, about 80 MW, about 90 MW, or another amount of power; and between about 60 and about 80 MW of power in summer, such as about 60 MW, about 70 MW, about 80 MW, or another amount of power.

ORC system 610 includes a pump 612, such as an iso-butane pump. Pump 612 can consume, for instance, between about 4 MW and about 5 MW of power, such as about 4 MW, about 4.5 MW, about 5 MW, or another amount of power. Pump 612 can pump iso-butane liquid 614 from a starting pressure of, for instance, between about 4 Bar and about 5 Bar, such as about 4 Bar, about 4.5 Bar, about 5 Bar, or another starting pressure; to a higher exit pressure of, for instance, between about 11 Bar and about 12 Bar, such as about 11 Bar, about 11.5 Bar, about 12 Bar, or another exit pressure. Pump 612 can be sized to pump, for instance, between about 0.15 MMT/D and about 0.25 MMT/D of iso-butane liquid 614, such as about 0.15 MMT/D, about 0.2 MMT/D, about 0.25 MMT/D, or another amount of iso-butane liquid.

Iso-butane liquid 614 is pumped through an evaporator 616 with a thermal duty of, for example, between 3000 MM Btu/h and about 3500 MM Btu/h, such as about 3000 MM Btu/h, about 3100 MM Btu/h, about 3200 MM Btu/h, about 3300 MM Btu/h, about 3400 MM Btu/h, about 3500 MM Btu/h, or another thermal duty. In evaporator 616, iso-butane 614 is heated and evaporated by exchange with hot fluid header 608. For instance, evaporator 616 can heat iso-butane 614, for example, from a temperature of, for instance, between about 80° F. and about 90° F., such as about 80° F., about 85° F., about 90° F., or another temperature; to a temperature of, for instance, between about 150° F. and about 160° F., such as about 150° F., about 155° F., about 160° F., or another temperature. The pressure of iso-butane 614 is reduced to, for instance, between about 10 Bar and about 11 Bar, such as about 10 Bar, about 10.5 Bar, about 11 Bar, or another exit pressure. Exchange with iso-butane in evaporator 616 causes hot fluid header 608 to be cooled, for example, to a temperature of between about 130° F. and about 150° F., such as about 130° F., about 140° F., about 150° F., or another temperature. Cooled hot fluid header 608 returns to accumulation tank 602.

Heated iso-butane 614 powers a power turbine 618, such as a gas turbine. Turbine 618, in combination with a generator (not shown), can generate more power in winter than in summer. For instance, turbine 618 can generate at least about 70 MW, such as between about 70 MW and about 90 MW of power in winter, such as about 70 MW, about 80 MW, about 90 MW, or another amount of power; and at least about 60 MW, such as between about 60 MW and about 80 MW of power in summer, such as about 60 MW, about 70 MW, about 80 MW, or another amount of power. Iso-butane 614 exits turbine 618 at a lower temperature than the temperature at which the iso-butane 614 entered turbine 618. For instance, iso-butane 614 can exit turbine 618 at a temperature of between about 110° F. and about 120° F., such as about 110° F., about 115° F., about 120° F., or another temperature.

Iso-butane 614 exiting turbine 618 is further cooled in a cooler 620, such as an air cooler or a cooling water condenser, by exchange with cooling water 622. Cooler 620 can have a thermal duty of, for example, between about 2500 MM Btu/h and about 3000 MM Btu/h, such as about 2500 MM Btu/h, about 2600 MM Btu/h, about 2700 MM Btu/h, about 2800 MM Btu/h, about 2900 MM Btu/h, about 3000 MM Btu/h, or another thermal duty. Cooler 620 cools iso-butane 614 to a different temperature depending on the season of the year, for example, cooling iso-butane 614 to a cooler temperature in winter than in summer. In winter, cooler 620 cools iso-butane 614 to a temperature of, for example, between about 60° F. and about 80° F., such as about 60° F., about 70° F., about 80° F., or another temperature. In summer, cooler 620 cools iso-butane 614 to a temperature of, for example, between about 80° F. and about 100° F., such as about 80° F., about 90° F., about 100° F., or to another temperature.

Cooling water 622 flowing into cooler 620 can have a different temperature depending on the season of the year. For example, in winter, cooling water 622 can have a temperature of between about 55 and about 65° F., such as about 55° F., about 60° F., about 65° F., or another temperature. In summer, cooling water 622 can have a temperature of, for example, between about 70° F. and about 80° F., such as about 70° F., about 75° F., about 80° F., or another temperature. The temperature of cooling water 622 can rise by, for example, about 5° F., about 10° F., about 15° F., or by another amount by exchange at cooler 620. The volume of cooling water 622 flowing through cooler 620 can be between, for instance, about 2.5 MMT/D and about 3.5 MMT/D, such as about 2.5 MMT/D, about 3 MMT/D, about 3.5 MMT/D, or another volume.

Figure 7A:
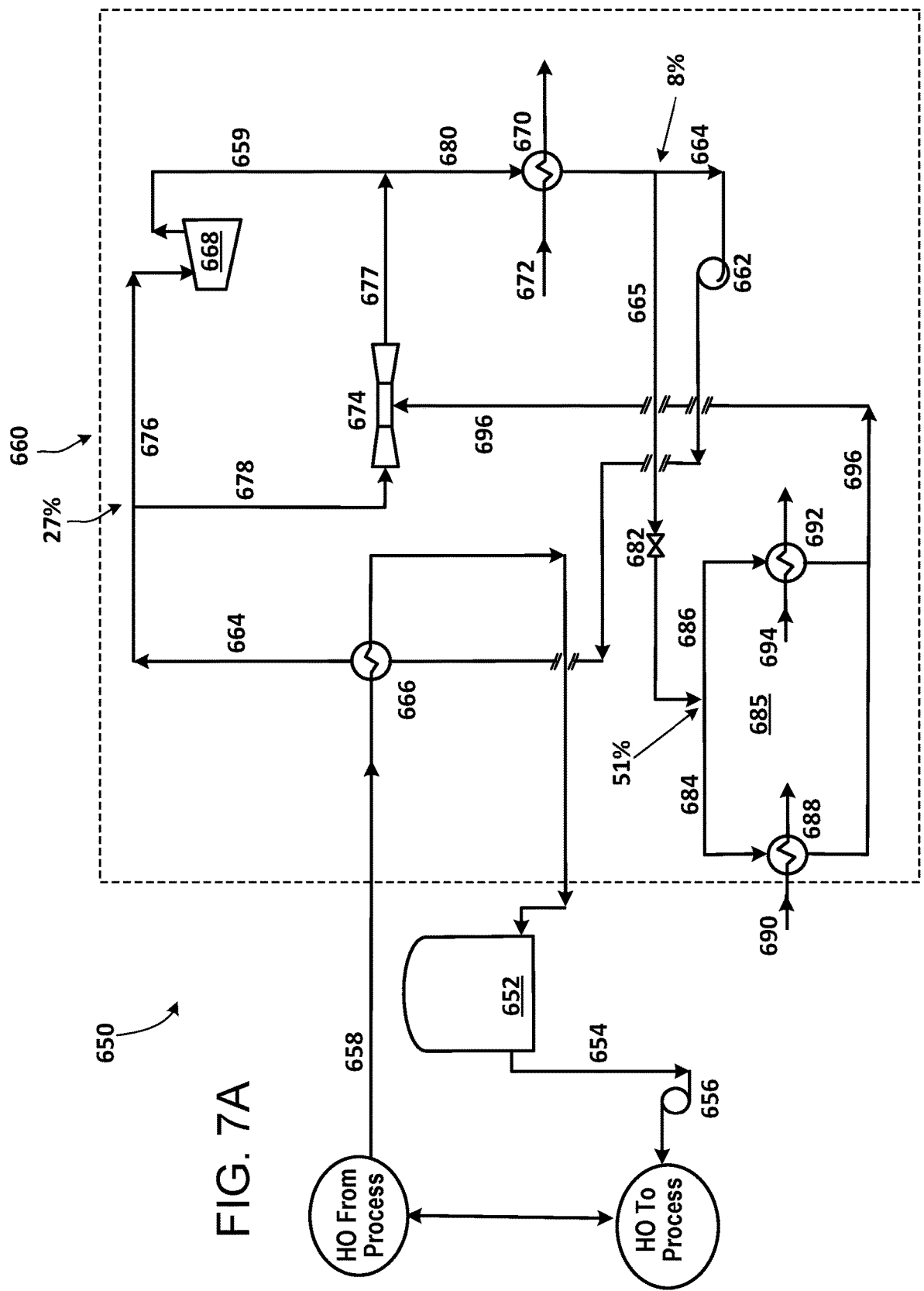
FIGS. 7A and 7B are diagrams of Organic Rankine cycle based waste heat to combined cooling and power conversion plants.
Figure 7B:
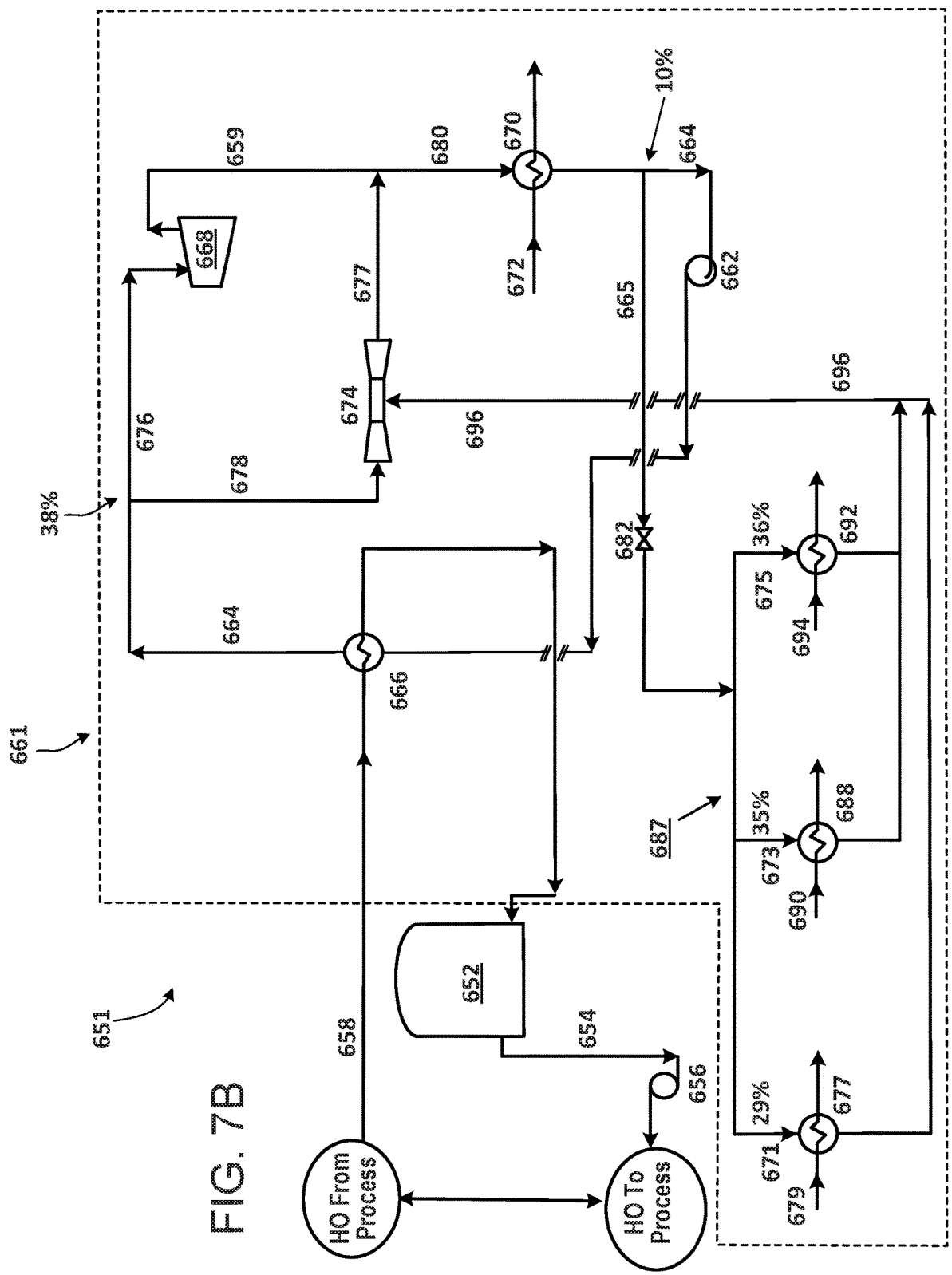

Referring to FIGS. 7A and 7B, waste heat from the crude oil associated gas processing plant that is recovered through the network of heat exchangers 1-7 shown in FIGS. 1-5 can be used to power Organic Rankine cycle based waste heat to combined cooling and power conversion plants 650, 651, respectively. Waste heat to combined cooling and power conversion plants 650, 651 include an accumulation tank 652 that stores heating fluid, such as oil, water, an organic fluid, or another heating fluid. Heating fluid 654 is pumped from accumulation tank 652 to heat exchangers 1-7 (FIGS. 1-5) by a heating fluid circulation pump 656. For instance, heating fluid 654 can be at a temperature of between about 130° F. and about 150° F., such as about 130° F., about 140° F., about 150° F., or another temperature.

Heated heating fluid from each of heat exchangers 1-7 (for example, heating fluid that has been heated by recovery of waste heat at each of heat exchangers 1-7) is joined into a common hot fluid header 658. Hot fluid header 658 can be at a temperature of, for example, between about 210° F. and about 230° F., such as about 210° F., about 220° F., about 230° F., or another temperature. The volume of fluid in hot fluid header 658 can be, for instance, between about 0.9 MMT/D and about 1.1 MMT/D, such as about 0.9 MMT/D, about 1.0 MMT/D, about 1.1 MMT/D, or another volume.

Heat from the heated heating fluid heats the working fluid of the ORC (for instance, iso-butane) thereby increasing the working fluid pressure and temperature and decreasing the temperature of the heating fluid. The heating fluid is then collected in accumulation tank 652 and can be pumped back through heat exchangers 1-7 to restart the waste heat recovery cycle. The heated working fluid is used to power a turbine, thus generating power from the waste heat recovered from the gas processing plant. In some examples, the working fluid is also used to cool gas streams in the gas processing plant, thus providing in-plant processing cooling and enabling cooling water utilities to be conserved. In some examples, the working fluid is also used to cool a stream of cooling water that is used for ambient air condition or cooling in the gas processing plant or for a nearby industrial community.

In some examples, waste heat to combined cooling and power conversion system 650 can generate, for example, between about 40 MW and about 60 MW of power, such as about 40 MW, about 50 MW, about 60 MW, or another amount of power. Waste heat to combined cooling and power conversion system 650 can also provide in-plant cooling of gas streams to replace mechanical or propane refrigeration, cooling of cooling water to provide ambient air conditioning or cooling, or both. For instance, cooling capability can be provided to replace between about 60 MW and about 85 MW of refrigeration or air conditioning load, such as about 60 MW, about 70 MW, about 80 MW, 85 MW, or another amount of cooling capability.

Referring specifically to FIG. 7A, an Organic Rankine cycle 660 includes a pump 662, such as an iso-butane pump. Pump 662 can consume, for instance, between about 4 MW and about 5 MW of power, such as about 4 MW, about 4.5 MW, about 5 MW, or another amount of power. Pump 662 can pump iso-butane liquid 664 from a starting pressure of, for instance, between about 4 Bar and about 5 Bar, such as about 4 Bar, about 4.5 Bar, about 5 Bar, or another starting pressure; to a higher exit pressure of, for instance, between about 11 Bar and about 12 Bar, such as about 11 Bar, about 11.5 Bar, about 12 Bar, or another exit pressure. Pump 612 can be sized to pump, for instance, between about 0.15 MMT/D and about 0.25 MMT/D of iso-butane liquid 614, such as about 0.15 MMT/D, about 0.2 MMT/D, about 0.25 MMT/D, or another amount of iso-butane liquid.

Iso-butane liquid 664 is pumped through an evaporator 666 with a thermal duty of, for example, between 3000 MM Btu/h and about 3500 MM Btu/h, such as about 3000 MM Btu/h, about 3100 MM Btu/h, about 3200 MM Btu/h, about 3300 MM Btu/h, about 3400 MM Btu/h, about 3500 MM Btu/h, or another thermal duty. In evaporator 666, iso-butane 664 is heated and evaporated by exchange with hot fluid header 658. For instance, evaporator 666 can heat iso-butane 664, for example, from a temperature of, for instance, between about 80° F. and about 90° F., such as about 80° F., about 85° F., about 90° F., or another temperature; to a temperature of, for instance, between about 150° F. and about 160° F., such as about 150° F., about 155° F., about 160° F., or another temperature. The pressure of iso-butane 664 is reduced to, for instance, between about 10 Bar and about 11 Bar, such as about 10 Bar, about 10.5 Bar, about 11 Bar, or another exit pressure. Exchange with iso-butane in evaporator 666 causes hot fluid header 658 to be cooled, for example, to a temperature of between about 130° F. and about 150° F., such as about 130° F., about 140° F., about 150° F., or another temperature. Cooled hot fluid header 658 returns to accumulation tank 652.

Heated iso-butane 664 is split into two portions, for instance, with a split ratio of between about 27% and about 38%. In the example of FIG. 7A, the split ratio is 27%. A first portion 676 (for example, about 73%) of heated iso-butane 664 powers a power turbine 668, such as a gas turbine. Turbine 668, in combination with a generator (not shown), can generate at least about 50 MW of power, such as between 50 MW and about 70 MW, such as about 50 MW, about 60 MW, about 70 MW, or another amount of power. An iso-butane stream 659 exits turbine 668 at a lower temperature and pressure than the temperature at which the iso-butane 676 entered turbine 668. For instance, iso-butane stream 659 can exit turbine 668 at a temperature of between about 110° F. and about 120° F., such as about 110° F., about 115° F., about 120° F., or another temperature; and at a pressure of between about 4 Bar and about 5 Bar, such as about 4 Bar, about 4.5 Bar, about 5 Bar, or another pressure.

A second portion 678 (for instance, about 27%) of heated iso-butane 664 flows into an ejector 674 as a primary flow stream. A stream of iso-butane vapor 696 from a cooling subsystem 685 (discussed in the following paragraphs) flows into ejector 674 as a secondary flow stream. A stream of iso-butane 677 exits ejector 674 and joins the iso-butane stream 659 exiting turbine 668 to form an iso-butane stream 680.

Referring also to FIG. 8, ejector 674 includes a suction chamber section 80 through which heated iso-butane 678 and iso-butane vapor 696 enter into the ejector. Heated iso-butane 678 enters through a nozzle 82 having a narrow throat 84 with a minimum cross-sectional area $A_t$. Low pressure iso-butane vapor 696 enters through a low-pressure opening 85 having a cross-sectional area $A_e$. The two streams of iso-butane undergo constant pressure mixing in a constant-area section 86 having a cross-sectional area $A_3$. The mixed iso-butane exits the ejector via a diffuser section 88 as iso-butane stream 677.

The geometry of ejector 674 is selected based on the iso-butane gas pressure in the iso-butane streams 678, 696 entering the ejector and the pressure of the iso-butane gas stream 677 exiting the ejector and flowing into condenser 670. In the example of FIG. 7, in which the split ratio prior to turbine 668 is between about 27% and about 38% and the split ratio prior to pump 662 is between about 8% and about 10%, ejector 674 can have an entrainment ratio of about 3.5. The ratio of the cross-sectional area $A_3$ of constant-area section 86 to the cross-sectional area ($A_t$) of the throat of nozzle 84 ($A_3:A_t$) is at most 6.4. The ratio of the cross-sectional area ($A_e$) of low-pressure opening 85 to the cross-sectional area ($A_t$) of the throat 84 of nozzle 82 ($A_e:A_t$) is at most 2.9.

The geometry of the ejector 674 can vary depending on the gas pressure of iso-butane in the system 650. For instance, in the example cooling and power generation system of FIG. 7 for the gas processing facility, the ratio $A_3:A_t$ can be between about 3.3 and about 6.4, such as about 3.3, about 4, about 4.5, about 5.0, about 5.5, about 6.0, about 6.4, or another value. In the specific example of FIG. 7A, the ratio $A_e:A_t$ can be between about 1.3 and about 2.9, such as about 1.3, about 1.5, about 2.0, about 2.5, about 2.9, or another value. The entrainment ratio can be between about 3 and about 5, such as about 3, about 3.5, about 4, about 4.5, about 5, or another ratio. In some examples, multiple ejectors can be used in parallel. The number of ejectors used in parallel can depend on the volumetric flow rate of iso-butane in the streams 678, 696.

Referring again to FIG. 7A, iso-butane stream 680 can have a temperature of between about 110° F. and about 120° F., such as about 110° F., about 115° F., about 120° F., or another temperature. Iso-butane stream 680 is further cooled in a cooler 670, such as an air cooler or a cooling water condenser, by exchange with cooling water 672. Cooler 670 can have a thermal duty of, for example, between about 3000 MM Btu/h and about 3500 MM Btu/h, such as about 3000 MM Btu/h, about 3100 MM Btu/h, about 3200 MM Btu/h, about 3300 MM Btu/h, about 3400 MM Btu/h, about 3500

MM Btu/h, or another thermal duty. Cooler 670 can cool iso-butane 680 to a different temperature depending on the season of the year, for example, cooling iso-butane 680 to a cooler temperature in winter than in summer. In winter, cooler 670 cools iso-butane 680 to a temperature of, for example, between about 60° F. and about 80° F., such as about 60° F., about 70° F., about 80° F., or another temperature. In summer, cooler 670 cools iso-butane 680 to a temperature of, for example, between about 80° F. and about 100° F., such as about 80° F., about 90° F., about 100° F., or to another temperature.

Cooling water 672 flowing into cooler 670 can have a different temperature depending on the season of the year. For example, in winter, cooling water 672 can have a temperature of between about 55 and about 65° F., such as about 55° F., about 60° F., about 65° F., or another temperature. In summer, cooling water 672 can have a temperature of, for example, between about 70° F. and about 80° F., such as about 70° F., about 75° F., about 80° F., or another temperature. The temperature of cooling water 672 can rise by, for example, about 5° F., about 10° F., about 15° F., or by another amount by exchange at cooler 670. The volume of cooling water 672 flowing through cooler 670 can be between, for instance, about 2.5 MMT/D and about 3.5 MMT/D, such as about 2.5 MMT/D, about 3 MMT/D, about 3.5 MMT/D, or another volume.

Cooled iso-butane stream 680 is split into two portions, for instance, with a split ratio of between about 8% and about 10%. In the example shown, the split ratio is about 8%. Iso-butane liquid 664 to be pumped by pump 662 is the first portion, and includes, for instance, about 92% of the volume of cooled iso-butane stream. A second portion 665 (for instance, about 8%) of cooled iso-butane stream 680 is directed to cooling subsystem 685. Second portion 665 of iso-butane passes through a letdown valve 682 which further cools the iso-butane. Letdown valve 682 can cool the iso-butane to a temperature of, for example, between about 45° F. and about 55° F., such as about 45° F., about 50° F., about 55° F., or another temperature; and to a pressure of, for example, between about 2 Bar and about 3 Bar, such as about 2 Bar, about 2.5 Bar, about 3 Bar, or another pressure.

Cooled iso-butane released from letdown valve 682 is split into a first portion 684 and a second portion 686, both of which are used in-plant process cooling. The volume of the first portion 684 and the second portion 686 can be relatively equal. For instance, the split ratio between the first portion 684 and the second portion 686 can be about 50%.

First portion 684 of cooled iso-butane passes through chiller 688. Chiller 688 can have a thermal duty of, for example, between about 50 MM Btu/h and about 150 MM Btu/h, such as about 50 MM Btu/h, about 60 MM Btu/h, about 70 MM Btu/h, about 80 MM Btu/h, about 90 MM Btu/h, about 100 MM Btu/h, about 110 MM Btu/h, about 120 MM Btu/h, about 130 MM Btu/h, about 140 MM Btu/h, about 150 MM Btu/h, or another thermal duty. Chiller 688 chills a gas stream 690 in the gas processing plant while heating first portion 684 of iso-butane. In some examples, the gas stream 690 cooled by chiller 688 can be feed gas 362, described supra. For instance, chiller 688 can chill gas stream 690 from a temperature of between about 110° F. and about 120° F., such as about 110° F., about 115° F., about 120° F., or another temperature; to a temperature of between about 75° F. and about 85° F., such as a temperature of about 75° F., about 80° F., about 85° F., or another temperature. Chiller 688 can heat first portion 684 of iso-butane to a temperature of, for instance, between about 85° F. and about 95° F., such as about 85° F., about 90° F., about 95° F., or another temperature.

Second portion 686 of cooled iso-butane passes through a chiller 692. Chiller 692 can have a thermal duty of, for example, between about 50 MM Btu/h and about 150 MM Btu/h, such as about 50 MM Btu/h, about 60 MM Btu/h, about 70 MM Btu/h, about 80 MM Btu/h, about 90 MM Btu/h, about 100 MM Btu/h, about 110 MM Btu/h, about 120 MM Btu/h, about 130 MM Btu/h, about 140 MM Btu/h, about 150 MM Btu/h, or another thermal duty. Chiller 692 can chill a gas stream 694 in the gas processing plant from a temperature of, for example, between about 75° F. and about 85° F., such as about 75° F., about 80° F., about 85° F., or another temperature; to a temperature of between about 60° F. and about 70° F., such as a temperature of about 60° F., about 65° F., about 70° F., or another temperature. In some examples, the gas stream 694 cooled by chiller 692 can be dehydrated feed gas 417, described supra. Chiller 692 can heat second portion 684 of iso-butane to a temperature of, for instance, between about 65° F. and about 75° F., such as about 65° F., about 70° F., about 75° F., or another temperature.

The use of chillers 688, 692 to partially cool gas streams in the gas processing plant reduces the cooling load in the gas processing plant, thus enabling power savings. For instance, when the gas stream 690 cooled by chiller 688 is feed gas 362, the cooling load on the components in first chilldown train 402 (FIG. 4) can be reduced. Similarly, when the gas stream 694 cooled by chiller 692 is dehydrated feed gas 417, the cooling load on the components in second chilldown train 404 (FIG. 4) can be reduced.

Heated first and second portions 684, 686 are recombined into iso-butane stream 696, which flows into ejector 674, as discussed supra. Iso-butane stream 696 can be a stream of iso-butane vapor having a temperature of, for instance, between about 75° F. and about 85° F., such as about 75° F., about 80° F., about 85° F., or another temperature; and a pressure of, for instance, between about 1.5 Bar and about 2.5 Bar, such as about 1.5 Bar, about 2 Bar, about 2.5 Bar, or another pressure.

The use of ejector 674 to contribute to the generation of in-plant cooling capacity can have advantages. For instance, an ejector has lower capital costs than refrigeration components. The use of an ejector reduces the load on such refrigeration components in the gas processing plant, and thus smaller and less expensive refrigeration components can be utilized in the gas processing plant. In addition, the power that would have been used to run the refrigeration components in the gas processing plant can be conserved or used elsewhere.

In some examples, waste heat to combined cooling and power conversion plant 650 can be adjusted to provide different amounts of cooling capacity. For instance, the split ratio prior to pump 662, the split ratio prior to turbine 668, or both can be increased such that a greater amount of iso-butane is provided to cooling subsystem 685, thus enabling a greater amount of cooling at the expense of power generation. The split ratios can be increased, for instance, responsive to a need for greater cooling in the gas processing plant. For example, the cooling need of the gas processing plant may vary by season, with the cooling load being higher in the summer than in the winter.

When the split ratio is adjusted, the geometry of ejector 674 can be changed to accommodate the change in volume of iso-butane flowing into ejector 674. For instance, the cross-sectional area ($A_t$) of the throat 84 of nozzle 82, the cross-sectional area ($A_e$) of low-pressure opening 85, or the cross-sectional area ($A_3$) of constant-area section 86 can be adjusted. In some examples, a variable ejector can be used and the geometry of the variable ejector can be adjusted based on the split ratio of the system. In some examples, multiple ejectors can be connected in parallel and the flow of iso-butane streams 678, 696 can be switched to the ejector having the appropriate geometry based on the split ratio of the system.

Referring to FIG. 7B, an Organic Rankine cycle 661 provides for power generation in-plant sub-ambient cooling in the gas processing plant and for ambient air cooling or air conditioning, for instance, for personnel working in the gas processing plant (sometimes referred to as the industrial community of the gas processing plant), for a nearby non-industrial community, or both.

Heated iso-butane 664 is split into two portions prior to turbine 668, for instance, with a split ratio of between about 27% and about 38%. In the example of FIG. 7B, the split ratio is 38%. Power is generated via turbine 668 and a generator (not shown), as described supra for FIG. 7A. Turbine 668 and generator can generate at least about 30 MW of power, such as between about 30 MW and about 50 MW, such as about 30 MW, about 40 MW, about 50 MW, or another amount of power.

Cooling capacity is provided by a cooling subsystem 687 that receives second portion 665 of iso-butane from cooler 670. The split ratio between second and first portions 665, 664, respectively, of cooled iso-butane 680 can be between about 8% and about 10%. In the example of FIG. 7B, the split ratio is about 10%. Second portion 665 of iso-butane passes through a letdown valve 682 that cools the iso-butane to a temperature of, for example, between about 45° F. and about 55° F., such as about 45° F., about 50° F., about 55° F., or another temperature; and to a pressure of, for example, between about 2 Bar and about 3 Bar, such as about 2 Bar, about 2.5 Bar, about 3 Bar, or another pressure.

In cooling subsystem 687, cooled iso-butane released from letdown valve 682 is split into a first portion 673, a second portion 675, and a third portion 671. First portion 673 and second portion 675 of iso-butane pass through chillers 688, 692, respectively to chill gas streams 690, 694 in the gas processing plant, as described supra. Third portion 671 of iso-butane passes through a chiller 677. Chiller 677 can have a thermal duty of, for example, between about 50 MM Btu/h and about 100 MM Btu/h, such as about 50 MM Btu/h, about 60 MM Btu/h, about 70 MM Btu/h, about 80 MM Btu/h, about 90 MM Btu/h, about 100 MM Btu/h, or another thermal duty. Chiller 677 can chill a chilled water stream 679 that can be used to provide ambient air cooling or conditioning in the industrial community of the gas processing plant or in a nearby non-industrial community. Chiller 677 can chill chilled water stream 679 from a temperature of, for example, between about 55° F. and about 65° F., such as about 55° F., about 60° F., about 65° F., or another temperature; to a temperature of between about 50° F. and about 60° F., such as a temperature of about 50° F., about 55° F., about 60° F., or another temperature.

In the example of FIG. 7B, first portion 673 receives 35% of the volume from the iso-butane 665 released from letdown valve 682, second portion 675 receives 36% of the volume, and third portion 671 receives 29%. These volume ratios can be adjusted to adjust the relative amounts of industrial cooling capacity and ambient air cooling or conditioning capacity provided by cooling subsystem 687. For instance, in summer, when the demand for ambient air cooling or conditioning is higher, third portion 671 can receive a larger volume of iso-butane, thus increasing the ambient air cooling or conditioning capacity and decreasing the industrial cooling capacity. In some examples, third portion 671 can receive 100% of the volume of iso-butane released from letdown valve 682 such that cooling subsystem 687 provides only ambient air cooling or conditioning capacity. In some examples, third portion 671 can receive no flow such that cooling subsystem 687 provides only industrial cooling capacity.

Upon exiting cooling subsystem 687, first portion 673, second portion 675, and third portion 671 of iso-butane are joined into stream 696 of low-pressure iso-butane vapor that flows into ejector 674 as described supra. Stream 696 can have a temperature of, for instance, between about 70° F. and about 80° F., such as about 70° F., about 75° F., about 80° F., or another temperature; and a pressure of, for instance, between about 1.5 Bar and about 2.5 Bar, such as about 1.5 Bar, about 2 Bar, about 2.5 Bar, or another pressure.

Figure 9A:
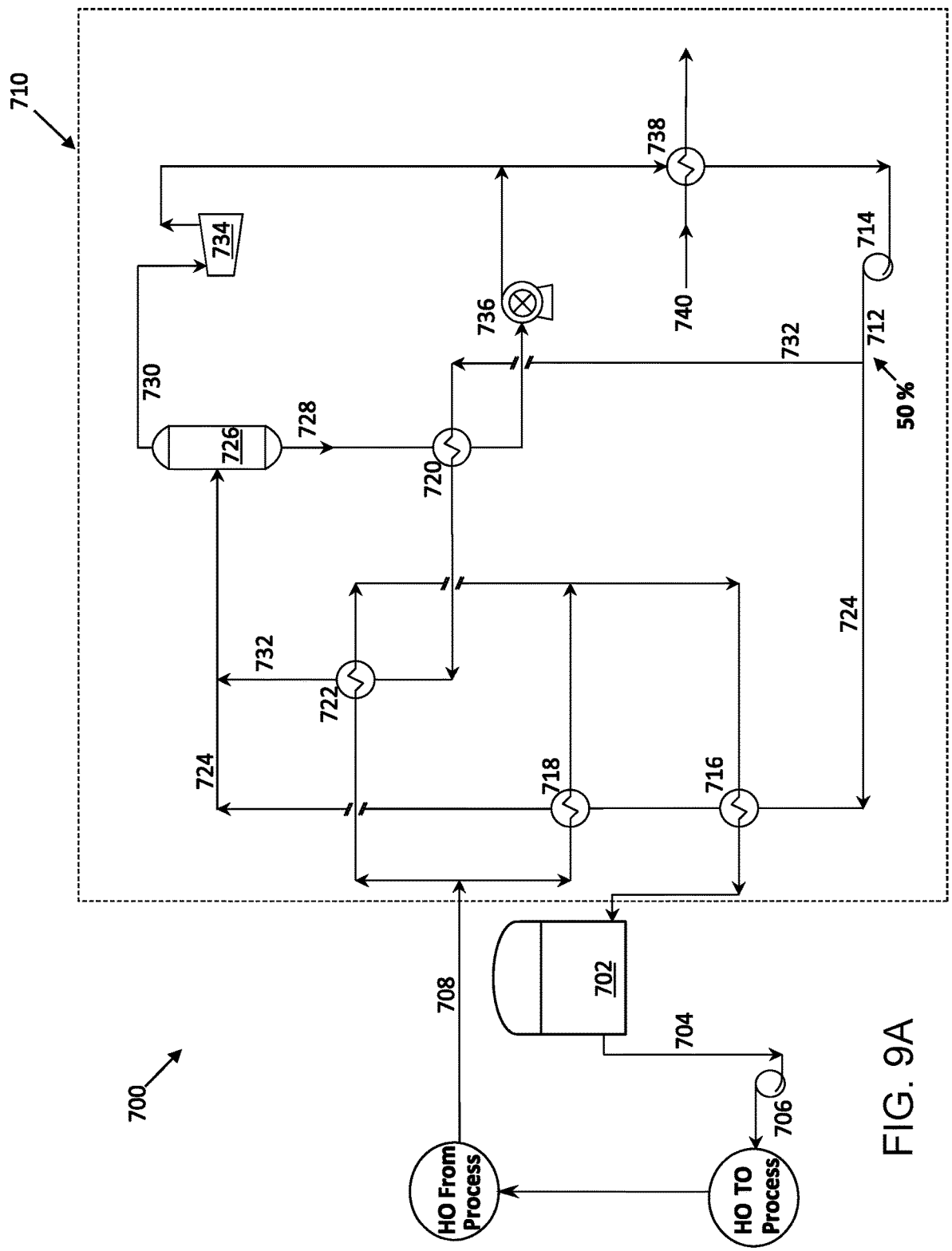
FIGS. 9A and 9B are diagrams of modified Kalina cycle based waste heat to power conversion plants.
Figure 9B:
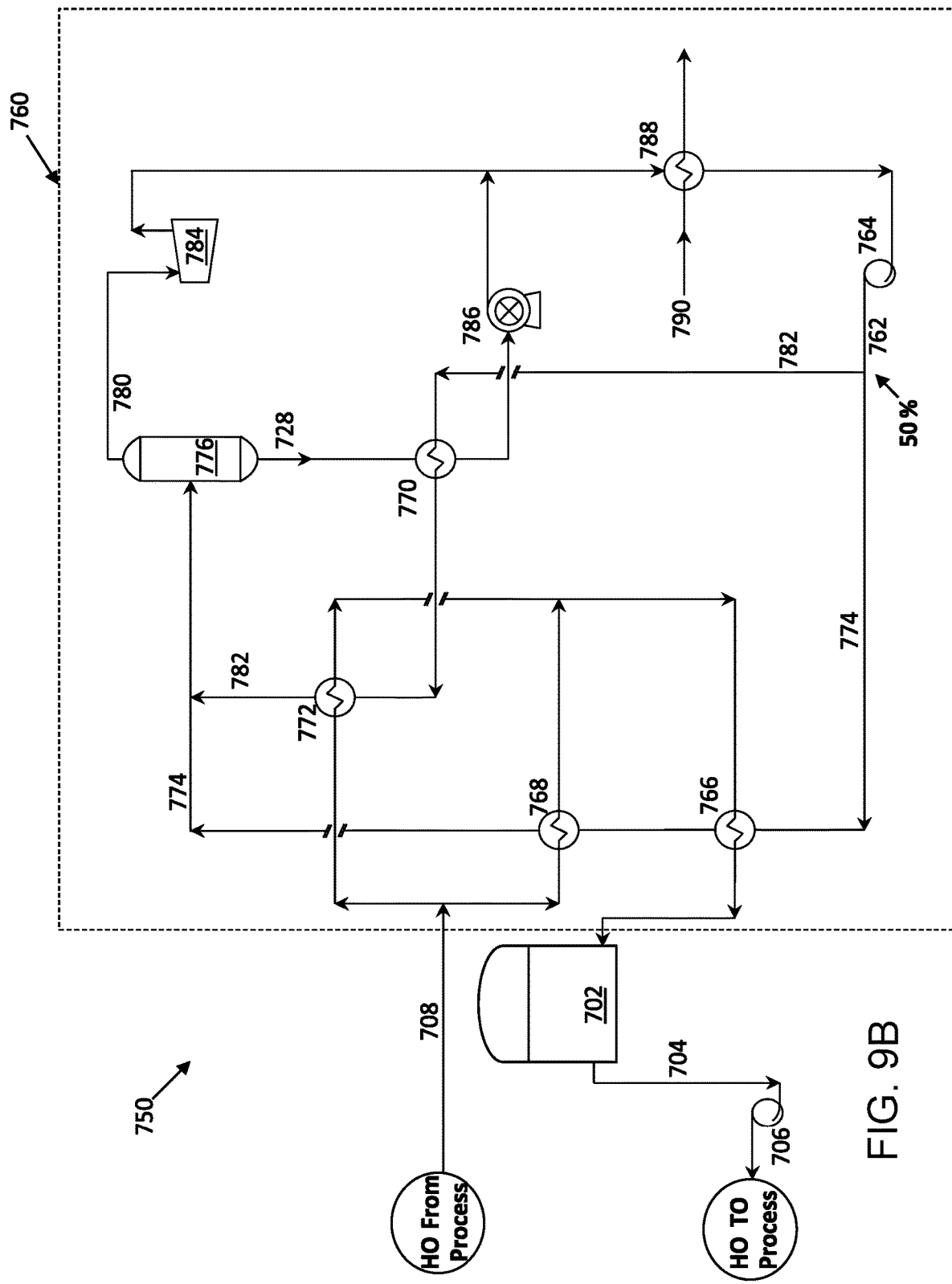

Referring to FIGS. 9A and 9B, waste heat from the crude oil associated gas processing plant that is recovered through the network of heat exchangers 1-7 (FIGS. 1-5) can be used to power a modified Kalina cycle based waste heat to power conversion plant 700, 750. A Kalina cycle is an energy conversion system that uses a mixture of ammonia and water in a closed loop arrangement. In plant 700 of FIG. 9A, the Kalina cycle is operated at about 20 Bar, and in the plant 750 of FIG. 9B, the Kalina cycle is operated at about 25 Bar.

Waste heat to power conversion plants 700, 750 each includes an accumulation tank 702 that stores heating fluid, such as oil, water, an organic fluid, or another heating fluid. Heating fluid 704 is pumped from accumulation tank 702 to heat exchangers 1-7 (FIGS. 1-5) by a heating fluid circulation pump 706. For instance, heating fluid 704 can be at a temperature of between about 130° F. and about 150° F., such as about 130° F., about 140° F., about 150° F., or another temperature.

Heated heating fluid from each of heat exchangers 1-7 (for example, heating fluid that has been heated by recovery of waste heat at each of heat exchangers 1-7) is joined into a common hot fluid header 708. Hot fluid header 708 can be at a temperature of, for example, between about 210° F. and about 230° F., such as about 210° F., about 220° F., about 230° F., or another temperature. The volume of fluid in hot fluid header 708 can be, for instance, between about 0.6 MMT/D and about 0.8 MMT/D, such as about 0.6 MMT/D, about 0.7 MMT/D, about 0.8 MMT/D, or another volume.

The heat from hot fluid header 708 is used to heat an ammonia-water mixture in a Kalina cycle, which in turn is used to power turbines, thus generating power from the waste heat recovered from the gas processing plant. In plant 750, a higher operational pressure (for instance, 25 Bar for plant 750 versus 20 Bar for plant 700) increases power generation in the turbines, but at higher heat exchanger cost. For instance, power generation in plant 750 can be between about 2 MW and about 3 MW higher than in plant 700, such as about 2 MW higher, about 2.5 MW higher, about 3 MW higher, or another amount.

Referring specifically to FIG. 9A, waste heat to power conversion plant 700 can produce power via a Kalina cycle 710 using an ammonia-water mixture 712 of about 70% ammonia and 30% water at about 20 Bar. For instance, plant 700 can produce between about 80 MW and about 90 MW of power, such as about 80 MW, about 85 MW, about 90 MW, or another amount of power.

Kalina cycle 710 includes a pump 714. Pump 714 can consume, for instance, between about 3.5 MW and about 4.5 MW of power, such as about 3.5 MW, about 4 MW, about 4.5 MW, or another amount of power. Pump 714 can pump ammonia-water mixture 712 from a starting pressure of, for instance, between about 7 Bar and about 8 Bar, such as about 7 Bar, about 7.5 Bar, or about 8 Bar; to a higher exit pressure of, for instance, between about 20 Bar and about 22 Bar, such as about 20 Bar, about 21 Bar, about 22 Bar, or another exit pressure. Pump 714 can be sized to pump, for instance, between about 0.10 MMT/D and about 0.20 MMT/D of ammonia-water mixture 712, such as about 0.10 MMT/D, about 0.15 MMT/D, about 0.20 MMT/D, or another amount.

Ammonia-water mixture 712 is pumped by pump 714 into a network of heat exchangers 716, 718, 720, 722 that together achieve partial evaporation of ammonia-water mixture 712 using heat from heating fluid 704. Heat exchangers 716 and 720 can have a thermal duty of, for instance, between about 1000 MM Btu/h and about 1200 MM Btu/h, such as about 1000 MM Btu/h, about 1100 MM Btu/h, about 1200 MM Btu/h, or another thermal duty. Heat exchangers 718 and 722 can have a thermal duty of, for instance, between about 800 MM Btu/h and about 1000 MM Btu/h, such as about 800 MM Btu/h, about 900 MM Btu/h, about 1000 MM Btu/h, or another thermal duty.

Ammonia-water mixture 712 exiting pump 714 can have a temperature of, for instance, between about 80° F. and about 90° F., such as about 80° F., about 85° F., about 90° F., or another temperature. Ammonia-water mixture 712 from pump 714 is split into two portions, for instance, with a split ratio of about 50%. A first portion 724 of ammonia-water mixture 712 from pump 714 is pre-heated and partially vaporized by exchange with heating fluid 708 in heat exchangers 716, 718. For instance, first portion 724 of ammonia-water mixture is heated to a temperature of between about 185° F. and about 195° F., such as about 185° F., about 190° F., about 195° F., or another temperature. A second portion 732 of ammonia-water mixture 712 from pump 714 is pre-heated and partially vaporized by exchange with liquid ammonia and water 728 (from a liquid-vapor separator 726, described in the following paragraphs) in heat exchanger 720. For instance, second portion 732 of ammonia-water mixture is heated to a temperature of between about 155° F. and about 165° F., such as about 155° F., about 160° F., about 165° F., or another temperature.

Heated second portion 732 is further heated and partially vaporized by exchange with heating fluid 708 in heat exchanger 722. For instance, second portion 732 is further heated to a temperature of between about 185° F. and about 195° F., such as about 185° F., about 190° F., about 195° F., or another temperature.

Heating fluid 708 flowing through the network of heat exchangers 716, 718, 722 cools and returns to accumulation tank 702. For instance, heating fluid 708 flowing into the network of heat exchangers 716, 718, 722 can have a temperature of between about 210° F. and about 230° F., such as about 210° F., about 220° F., about 230° F., or another temperature. Heating fluid 708 exits the network of heat exchangers at a temperature of between about 130° F. and about 150° F., such as about 130° F., about 140° F., about 150° F., or another temperature.

First and second portions 724, 732, which are heated and partially vaporized, flow into a liquid-vapor separator 726 that separates liquid ammonia and water from ammonia-water vapor. The pressure of first and second portions 724, 732 upon entry into separator 724 can be, for instance, between about 19 Bar and about 21 Bar, such as about 19 Bar, about 20 Bar, about 21 Bar, or another pressure. Liquid ammonia and water 728, which is a low purity lean stream, exit the bottom of separator 726 and ammonia-water vapor 730 exits the top of separator 726.

Ammonia-water vapor 730, which is a high purity rich stream, flows to a turbine 734 that (in combination with a generator, not shown) can generate power, and in some cases can generate a different amount of power in summer than in winter. For instance, turbine 734 can generate at least about 60 MW of power in the summer, such as between about 60 MW and about 70 MW of power in summer, such as about 60 MW, about 65 MW, about 70 MW, or another amount of power; and at least about 80 MW of power in the winter, such as between about 80 MW and about 90 MW of power in winter, such as about 80 MW, about 85 MW, about 90 MW, or another amount of power. Power is generated by turbine 734 using a volume of ammonia-water vapor 730 of, for instance, between about 0.04 MMT/D and about 0.06 MMT/D, such as 0.04 MMT/D, about 0.05 MMT/D, about 0.06 MMT/D, or another volume. Turbine 734 reduces the pressure of ammonia-water vapor 730 to, for instance, between about 7 Bar and about 8 Bar, such as about 7 Bar, about 7.5 Bar, about 8 Bar, or another pressure; and reduces the temperature of ammonia-water vapor 730 to, for instance, between about 100° F. and about 110° F., such as about 100° F., about 105° F., about 110° F., or another temperature.

Liquid ammonia and water 728 flow via heat exchanger 720 to a high pressure recovery turbine (HPRT) 736, for example, a hydraulic liquid turbine, for additional power generation. HPRT 736 can generate, for example, between about 1 MW and about 2 MW of power, such as about 1 MW, about 1.5 MW, about 2 MW, or another amount of power. Power is generated by HPRT 736 using a volume of liquid ammonia and water 728 of, for instance, between about 0.05 MMT/D and about 0.15 MMT/D, such as about 0.05 MMT/D, about 0.1 MMT/D, about 0.15 MMT/D, or another volume. HPRT 736 reduces the pressure of liquid ammonia and water 728 to, for instance, between about 7 Bar and about 9 Bar, such as about 7 Bar, about 7.5 Bar, about 8 Bar, about 8.5 Bar, about 9 Bar, or another pressure. After exchange at heat exchanger 720, the temperature of liquid ammonia and water 728 is, for instance, between about 100° F. and about 110° F., such as about 100° F., about 105° F., about 110° F., or another temperature.

Ammonia-water vapor 730 and liquid ammonia and water 728 combine into ammonia-water mixture 712 after exiting turbines 734, 736. Ammonia-water mixture 712 is cooled in a cooler 738, such as a cooling water condenser or an air cooler, by exchange with cooling water 740. Cooler 738 can have a thermal duty of, for example, between about 2800 MM Btu/h and about 3200 MM Btu/h, such as about 2800 MM Btu/h, about 2900 MM Btu/h, about 3000 MM Btu/h, about 3100 MM Btu/h, about 3200 MM Btu/h, or another thermal duty. Cooler 738 cools ammonia-water mixture 712 to a different temperature depending on the season of the year, for example, cooling ammonia-water mixture 712 to a cooler temperature in winter than in summer. In winter, cooler 738 cools ammonia-water mixture 712 to a temperature of, for example, between about 60° F. and about 70° F., such as about 60° F., about 62° F., about 64° F., about 66° F., about 68° F., about 70° F., or another temperature. In summer, cooler 620 cools iso-butane 614 to a temperature of, for example, between about 80° F. and about 90° F., such as about 80° F., about 82° F., about 84° F., about 86° F., about 88° F., about 90° F., or to another temperature.

Cooling water 740 flowing into cooler 738 can have a different temperature depending on the season of the year. For example, in winter, cooling water 740 can have a temperature of between about 55 and about 65° F., such as about 55° F., about 60° F., about 65° F., or another temperature. In summer, cooling water 740 can have a temperature of, for example, between about 70° F. and about 80° F., such as about 70° F., about 75° F., about 80° F., or another temperature. The temperature of cooling water 740 can rise by, for example, about 15° F., about 18° F., about 20° F., or by another amount by exchange at cooler 738. The volume of cooling water 740 flowing through cooler 738 can be between, for instance, about 1.5 MMT/D and about 2.5 MMT/D, such as about 1.5 MMT/D, about 2 MMT/D, about 2.5 MMT/D, or another volume.

Referring specifically to FIG. 9B, waste heat to power conversion plant 750 can produce power via a Kalina cycle 760 using an ammonia-water mixture 762 of about 78% ammonia and 22% water at about 25 Bar. For instance, plant 750 can produce between about 75 MW and about 95 MW of power, such as about 75 MW, about 80 MW, about 85 MW, about 90 MW, or another amount of power.

Kalina cycle 760 includes a pump 764. Pump 764 can consume, for instance, between about 4.5 MW and about 5.5 MW of power, such as about 4.5 MW, about 5 MW, about 5.5 MW, or another amount of power. Pump 764 can pump ammonia-water mixture 712 from a starting pressure of, for instance, between about 8.5 Bar and about 9.5 Bar, such as about 8.5 Bar, about 9 Bar, or about 9.5 Bar; to a higher exit pressure of, for instance, between about 24 Bar and about 26 Bar, such as about 24 Bar, about 24.5 Bar, about 25 Bar, about 25.5 Bar, about 26 Bar, or another exit pressure. Pump 764 can be sized to pump, for instance, between about 0.10 MMT/D and about 0.2 MMT/D of ammonia-water mixture 712, such as about 0.10 MMT/D, about 0.15 MMT/D, about 0.2 MMT/D, or another amount.

Ammonia-water mixture 762 is pumped by pump 764 into a network of heat exchangers 766, 768, 770, 772 that together achieve partial evaporation of ammonia-water mixture 762 using heat from heating fluid 704. Heat exchangers 766 and 770 can have a thermal duty of, for instance, between about 1000 MM Btu/h and about 1200 MM Btu/h, such as about 1000 MM Btu/h, about 1100 MM Btu/h, about 1200 MM Btu/h, or another thermal duty. Heat exchangers 768 and 772 can have a thermal duty of, for instance, between about 800 MM Btu/h and about 1000 MM Btu/h, such as about 800 MM Btu/h, about 900 MM Btu/h, about 1000 MM Btu/h, or another thermal duty.

Ammonia-water mixture 762 exiting pump 764 has a temperature of, for instance, between about 80° F. and about 90° F., such as about 80° F., about 85° F., about 90° F., or another temperature. Ammonia-water mixture 762 from pump 764 is split into two portions, for instance, with a split ratio of about 50%. A first portion 774 (for example, 50%) of ammonia-water mixture 762 from pump 764 is pre-heated and partially vaporized by exchange with heating fluid 704 in heat exchangers 766, 768. For instance, first portion 772 of ammonia-water mixture is heated to a temperature of between about 170° F. and about 180° F., such as about 170° F., about 175° F., about 180° F., or another temperature. A second portion 782 (for example, 50%) of ammonia-water mixture 762 from pump 764 is pre-heated and partially vaporized by exchange with liquid ammonia and water 728 (from a liquid-vapor separator 726, described in the following paragraphs) in heat exchanger 720. For instance, second portion 782 of ammonia-water mixture is heated to a temperature of between about 155° F. and about 165° F., such as about 155° F., about 160° F., about 165° F., or another temperature.

Heated second portion 782 is further heated and partially vaporized by exchange with heating fluid 708 in heat exchanger 722. For instance, second portion 782 is further heated to a temperature of between about 170° F. and about 180° F., such as about 170° F., about 175° F., about 180° F., or another temperature. Heating fluid 708 flowing through the network of heat exchangers cools and returns to accumulation tank 702. For instance, heating fluid 708 flowing into the network of heat exchangers 716, 718, 722 can have a temperature of between about 210° F. and about 230° F., such as about 210° F., about 220° F., about 230° F., or another temperature. Heating fluid 708 exits the network of heat exchangers at a temperature of between about 130° F. and about 150° F., such as about 130° F., about 140° F., about 150° F., or another temperature.

First and second portions 774, 782, which are heated and partially vaporized, flows into a liquid-vapor separator 776 that separates liquid ammonia and water from ammonia-water vapor. The pressure of first and second portions 774, 782 upon entry into separator 776 can be, for instance, between about 23 Bar and about 25 Bar, such as about 23 Bar, about 24 Bar, about 25 Bar, or another pressure. Liquid ammonia and water 778, which is a low purity lean stream, exit the bottom of separator 776 and ammonia-water vapor 780 exits the top of separator 776.

Ammonia-water vapor 780, which is a high purity rich stream, flows to a turbine 784 that (in combination with a generator, not shown) can generate power, and in some cases can generate a different amount of power in summer than in winter. For instance, turbine 734 can generate between about 65 MW and about 75 MW of power in summer, such as about 65 MW, about 70 MW, about 75 MW, or another amount of power; and between about 85 MW and about 95 MW of power in winter, such as about 85 MW, about 90 MW, about 95 MW, or another amount of power. Power is generated by turbine 784 using a volume of ammonia-water vapor 780 of, for instance, between about 0.05 MMT/D and about 0.06 MMT/D, such as 0.05 MMT/D, about 0.06 MMT/D, about 0.07 MMT/D, or another volume. Turbine 784 reduces the pressure of ammonia-water vapor 780 to, for instance, between about 8 Bar and about 9 Bar, such as about 8 Bar, about 8.5 Bar, about 9 Bar, or another pressure; and reduces the temperature of ammonia-water vapor 780 to, for instance, between about 80° F. and about 90° F., such as about 80° F., about 85° F., about 90° F., or another temperature.

Liquid ammonia and water 778 flow via heat exchanger 770 to a high pressure recovery turbine (HPRT) 786, for example, a hydraulic liquid turbine, for additional power generation. HPRT 782 can generate, for example, between about 1.5 MW and about 2.5 MW of power, such as about 1.5 MW, about 2 MW, about 2.5 MW, or another amount of power. Power is generated by HPRT 786 using a volume of liquid ammonia and water 778 of, for instance, between about 0.05 MMT/D and about 0.15 MMT/D, such as about 0.05 MMT/D, about 0.1 MMT/D, about 0.15 MMT/D, or another volume. HPRT 786 reduces the pressure of liquid ammonia and water 782 to, for instance, between about 8 Bar and about 9 Bar, such as about 8 Bar, about 8.5 Bar, about 9 Bar, or another pressure. After exchange at heat exchanger 770, the temperature of liquid ammonia and water 778 is, for instance, between about 95° F. and about 105° F., such as about 95° F., about 100° F., about 105° F., or another temperature.

Ammonia-water vapor 780 and liquid ammonia and water 778 combine into ammonia-water mixture 762 after exiting turbines 784, 786. Ammonia-water mixture 762 is cooled in a cooler 788, such as a cooling water condenser or air cooler, by exchange with cooling water 790. Cooler 788 can have a thermal duty of, for example, between about 2500 MM Btu/h and about 3000 MM Btu/h, such as about 2500 MM Btu/h, about 2600 MM Btu/h, about 2700 MM Btu/h, about 2800 MM Btu/h, about 2900 MM Btu/h, about 3000 MM Btu/h, or another thermal duty. Cooler 788 cools ammonia-water mixture 762 to a different temperature depending on the season of the year, for example, cooling ammonia-water mixture 762 to a cooler temperature in winter than in summer. In winter, cooler 788 cools ammonia-water mixture 762 to a temperature of, for example, between about 60° F. and about 70° F., such as about 60° F., about 62° F., about 64° F., about 66° F., about 68° F., about 70° F., or another temperature. In summer, cooler 620 cools iso-butane 614 to a temperature of, for example, between about 80° F. and about 90° F., such as about 80° F., about 82° F., about 84° F., about 86° F., about 88° F., about 90° F., or to another temperature.

Cooling water 790 flowing into cooler 788 can have a different temperature depending on the season of the year. For example, in winter, cooling water 790 can have a temperature of between about 55 and about 65° F., such as about 55° F., about 60° F., about 65° F., or another temperature. In summer, cooling water 790 can have a temperature of, for example, between about 70° F. and about 80° F., such as about 70° F., about 75° F., about 80° F., or another temperature. The temperature of cooling water 740 can rise by, for example, about 15° F., about 18° F., about 20° F., or by another amount by exchange at cooler 738. The volume of cooling water 740 flowing through cooler 738 can be between, for instance, about 1.5 MMT/D and about 2.5 MMT/D, such as about 1.5 MMT/D, about 2 MMT/D, about 2.5 MMT/D, or another volume.

A Kalina cycle can offer advantages. A Kalina cycle offers one more degree of freedom than an ORC cycle in that the composition of the ammonia-water mixture can be adjusted. This additional degree of freedom allows a Kalina cycle to be adapted to particular operating conditions, for example, to a particular heat source or a particular cooling fluid, in order to improve or optimize energy conversion and heat transfer. Furthermore, because ammonia has a similar molecular weight as water, ammonia-water vapor behaves similarly to steam, thus permitting the use of standard steam turbine components. At the same time, the use of a binary fluid allows the composition of the fluid to be varied throughout the cycle, for example, to provide a richer composition at the evaporator and a leaner composition at the condenser. In addition, ammonia is an environmentally friendly compound that is less hazardous than compounds, such as iso-butane, that are often used in ORC cycles.

Figure 10A:
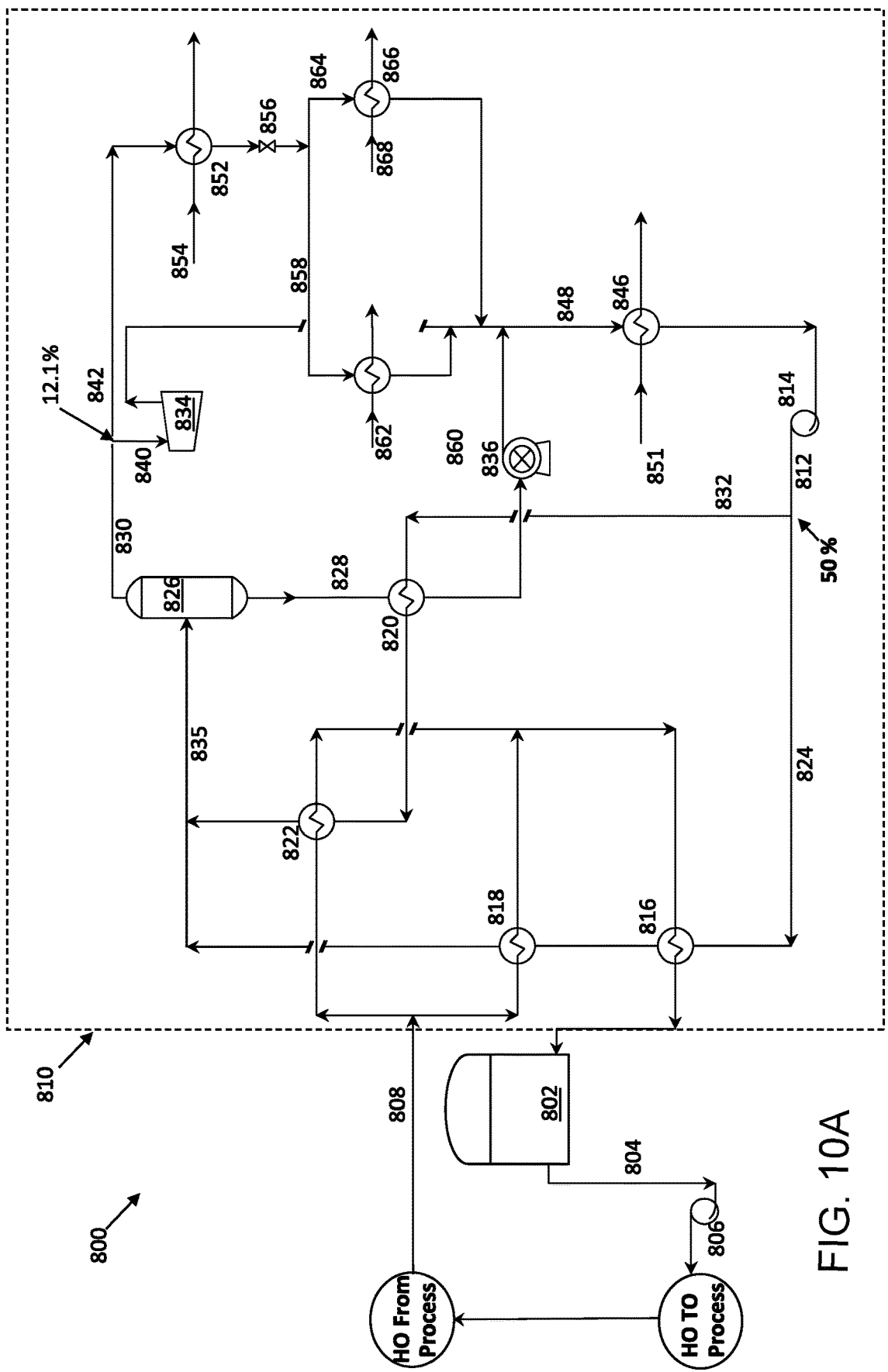
FIGS. 10A and 10B are diagrams of modified Goswami cycle based waste heat to combined cooling and power conversion plants.
Figure 10B:
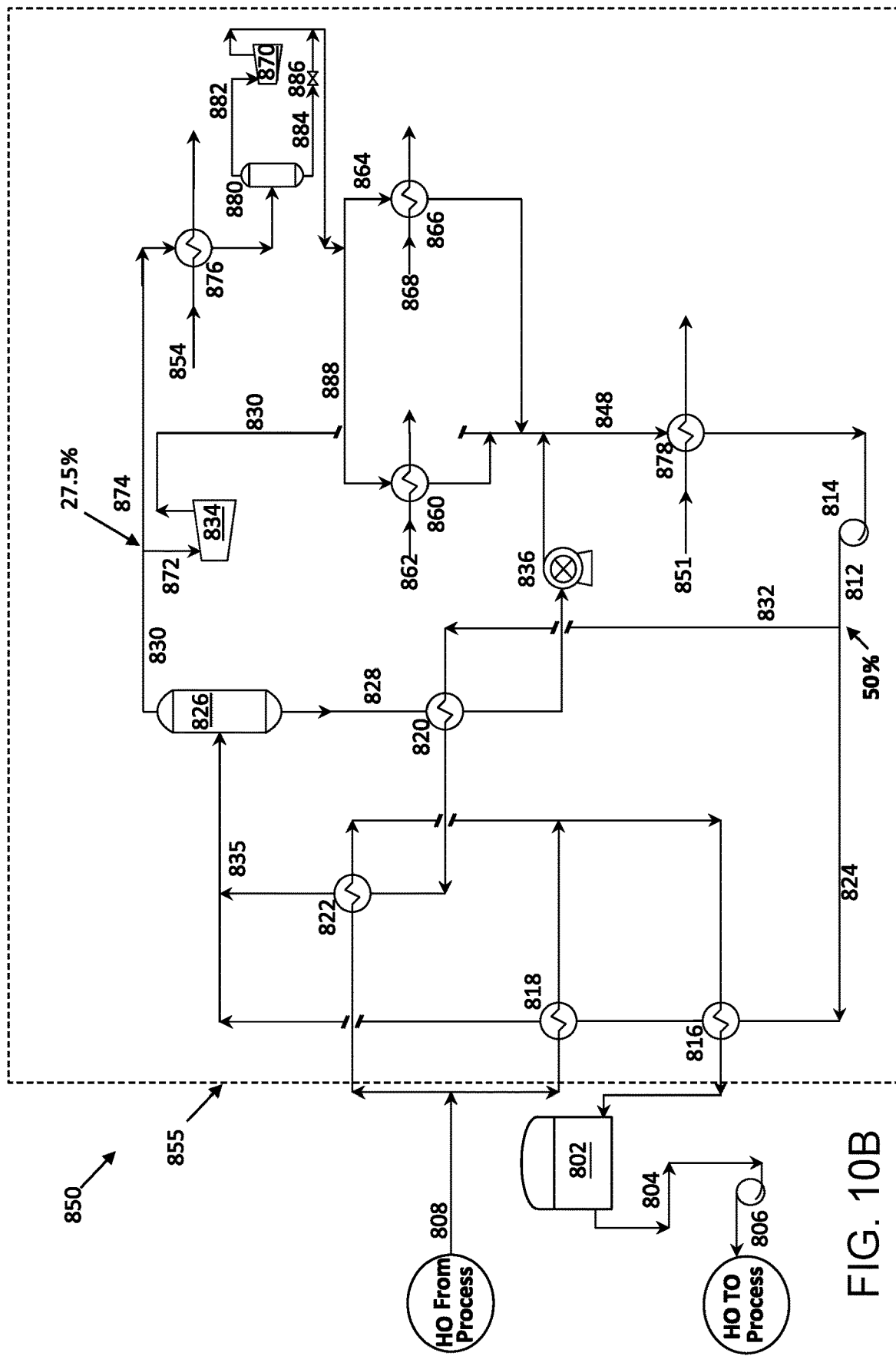

Referring to FIGS. 10A and 10B, waste heat from the crude oil associated gas processing plant that is recovered through the network of heat exchangers 1-7 (FIGS. 1-5) can be used to power a modified Goswami cycle based waste heat to combined cooling and power conversion plant 800, 850. A Goswami cycle is an energy conversion cycle that uses a mixture of ammonia and water in a closed loop arrangement, for example, 50% ammonia and 50% water. In the examples of FIGS. 10A and 10B, modified Goswami cycles 810, 855, respectively, are both operated at about 12 Bar. A Goswami cycle is able to utilize low heat source temperatures, for example, below about 200° C. to drive power generation. A Goswami cycle combines a Rankine cycle and an absorption refrigeration cycle to provide combined cooling and power generation. High concentration ammonia vapor is used in a turbine of the Goswami cycle. The high concentration ammonia can be expanded to a very low temperature without condensation. This very low temperature ammonia can then be used to provide refrigeration output. In the modified Goswami cycles 810, 855, high quantity cooling is enabled by providing both power generation and cooling functionality.

Waste heat to combined cooling and power conversion plants 800, 850 each includes an accumulation tank 802 that stores heating fluid, such as oil, water, an organic fluid, or another heating fluid. Heating fluid 804 is pumped from accumulation tank 802 to heat exchangers 1-7 (FIGS. 1-5) by a heating fluid circulation pump 806. For instance, heating fluid 804 can be at a temperature of between about 130° F. and about 150° F., such as about 130° F., about 140° F., about 150° F., or another temperature.

Heated heating fluid from each of heat exchangers 1-7 (for example, heating fluid that has been heated by recovery of waste heat at each of heat exchangers 1-7) is joined into a common hot fluid header 808. Hot fluid header 808 can be at a temperature of, for example, between about 210° F. and about 230° F., such as about 210° F., about 220° F., about 230° F., or another temperature. The volume of fluid in hot fluid header 808 can be, for instance, between about 0.6 MMT/D and about 0.8 MMT/D, such as about 0.6 MMT/D, about 0.7 MMT/D, about 0.8 MMT/D, or another volume.

The heat from hot fluid header 808 is used to heat an ammonia-water mixture in modified Goswami cycles 810, 855. Heated ammonia-water mixture is used to power turbines, thus generating power from the waste heat recovered from the gas processing plant. Ammonia-water mixture is also used to cool chilled water that is used for in-plant sub-ambient cooling in the gas processing plant, thus saving cooling water utilities. For instance, waste heat to combined cooling and power conversion plants 800, 850 can satisfy, for example, about 42% of the base load for sub-ambient cooling in the gas processing plant.

Referring specifically to FIG. 10A, waste heat to combined cooling and power conversion plant 800 can produce power and chilled water in-plant sub-ambient cooling capacity via a modified Goswami cycle 810 using an ammonia-water mixture 812 of about 50% ammonia and about 50% water. For instance, plant 800 can produce between about 50 MW and about 60 MW of power, such as about 50 MW, about 55 MW, about 60 MW, or another amount of power.

Modified Goswami cycle 810 in waste heat to combined cooling and power conversion plant 800 includes a pump 814. Pump 814 can consume, for instance, between about 2.5 MW and about 3.5 MW of power, such as about 2.5 MW, about 3 MW, about 3.5 MW, or another amount of power. Pump 814 can pump ammonia-water mixture 812 from a starting pressure of, for instance, between about 3 Bar and about 4 Bar, such as about 3 Bar, about 3.5 Bar, or about 4 Bar; to a higher exit pressure of, for instance, between about 11.5 Bar and about 12.5 Bar, such as about 11.5 Bar, about 12 Bar, about 12.5 Bar, or another exit pressure. Pump 814 can be sized to pump, for instance, between about 0.15 MMT/D and about 0.25 MMT/D of ammonia-water mixture 812, such as about 0.15 MMT/D, about 0.2 MMT/D, about 0.25 MMT/D, or another amount.

Ammonia-water mixture 812 is pumped by pump 814 into a network of heat exchangers 816, 818, 820, 822 that together achieve partial evaporation of ammonia-water mixture 812 using heat from heating fluid 804. Heat exchangers 816 and 820 can have a thermal duty of, for instance, between about 1300 MM Btu/h and about 1400 MM Btu/h, such as about 1300 MM Btu/h, about 1350 MM Btu/h, about 1500 MM Btu/h, or another thermal duty. Heat exchangers

818 and 822 can have a thermal duty of, for instance, between about 850 MM Btu/h and about 950 MM Btu/h, such as about 850 MM Btu/h, about 900 MM Btu/h, about 950 MM Btu/h, or another thermal duty.

Ammonia-water mixture 812 exiting pump 814 has a temperature of, for instance, between about 80° F. and about 90° F., such as about 80° F., about 85° F., about 90° F., or another temperature. Ammonia-water mixture 812 is split into two portions, for instance, with a split ratio of about 50%. A first portion 824 (for example, 50%) of ammonia-water mixture 812 from pump 814 is pre-heated and partially vaporized by exchange with heating fluid 808 in heat exchangers 816, 818. For instance, first portion 824 of ammonia-water mixture is heated to a temperature of between about 190° F. and about 200° F., such as about 190° F., about 195° F., about 200° F., or another temperature. A second portion 832 (for example, 50%) of ammonia-water mixture 812 from pump 814 is pre-heated and partially vaporized by exchange with liquid ammonia and water 828 (from a liquid-vapor separator 826, described in the following paragraphs) in heat exchanger 820. For instance, second portion 832 of ammonia-water mixture is heated to a temperature of between about 165° F. and about 175° F., such as about 165° F., about 170° F., about 175° F., or another temperature.

Heated second portion 832 is further heated and partially vaporized, for example by exchange with heating fluid 804 in heat exchanger 822. For instance, second portion 832 is further heated to a temperature of between about 190° F. and about 200° F., such as about 190° F., about 195° F., about 200° F., or another temperature.

Heating fluid 808 flowing through the network of heat exchangers 816, 818, 822 cools and returns to accumulation tank 802. For instance, heating fluid 808 flowing into the network of heat exchangers 816, 818, 822 can have a temperature of between about 210° F. and about 230° F., such as about 210° F., about 220° F., about 230° F., or another temperature. Heating fluid 808 exits the network of heat exchangers at a temperature of between about 130° F. and about 150° F., such as about 130° F., about 140° F., about 150° F., or another temperature.

First and second portions 824, 832, which are heated and partially vaporized, flow into a liquid-vapor separator 826 that separates liquid ammonia and water from ammonia-water vapor. The pressure of first and second portions 824, 832 upon entry into separator 826 can be, for instance, between about 10.5 Bar and about 11.5 Bar, such as about 10.5 Bar, about 11 Bar, about 11.5 Bar, or another pressure. Liquid ammonia and water 828, which is a low purity lean stream, exit the bottom of separator 826 and ammonia-water vapor 830, which is a high purity rich stream, exits the top of separator 826.

Liquid ammonia and water 828 flow to a high pressure recovery turbine (HPRT) 836, for example, a hydraulic liquid turbine. HPRT 836 can generate, for example, between about 1 MW and about 2 MW of power, such as about 1 MW, about 1.5 MW, about 2 MW, or another amount of power. Power is generated by HPRT 836 using a volume of liquid ammonia and water 828 of, for instance, between about 0.15 MMT/D and about 0.2 MMT/D, such as about 0.15 MMT/D, about 0.2 MMT/D, or another volume. HPRT 836 reduces the pressure of liquid ammonia and water 828 to, for instance, between about 3 Bar and about 4 Bar, such as about 3 Bar, about 3.5 Bar, about 4 Bar, or another pressure. After exchange at heat exchanger 820, the temperature of liquid ammonia and water 828 is, for instance, between about 110° F. and about 120° F., such as about 110° F., about 115° F., about 120° F., or another temperature.

Ammonia-water vapor 830 is split into a first portion 840 and a second portion 842. The split ratio, which is the percentage of vapor 830 split into second portion 842, can be, for instance, between about 10% and about 20%, such as about 10%, about 15%, about 20%, or another amount. First portion 840 flows to a turbine 834 and second portion 842 of ammonia-water vapor 830 flows to a water cooler 854, discussed in the following paragraphs. Turbine 834 (in combination with a generator, not shown) can generate, for instance, at least about 50 MW of power, such as between about 50 MW and about 60 MW of power, such as about 50 MW, about 55 MW, about 60 MW, or another amount of power. Power is generated by turbine 834 using a volume of ammonia-water vapor 830 of, for instance, between about 0.03 MMT/D and about 0.05 MMT/D, such as 0.03 MMT/D, about 0.04 MMT/D, about 0.05 MMT/D, or another volume. Turbine 834 reduces the pressure of ammonia-water vapor 830 to, for instance, between about 3 Bar and about 4 Bar, such as about 3 Bar, about 3.5 Bar, about 4 Bar, or another pressure; and reduces the temperature of ammonia-water vapor 830 to, for instance, between about 115° F. and about 125° F., such as about 115° F., about 120° F., about 125° F., or another temperature.

The streams from turbines 834, 836 (first portion 840 of ammonia-water vapor and liquid ammonia and water 828) combine into a turbine output stream 848 that is cooled in a cooler 846, such as a cooling water condenser or an air cooler by exchange with cooling water 850. Cooler 846 can have a thermal duty of, for example, between about 2800 MM Btu/h and about 3200 MM Btu/h, such as about 2800 MM Btu/h, about 2900 MM Btu/h, about 3000 MM Btu/h, about 3100 MM Btu/h, about 3200 MM Btu/h, or another thermal duty. Cooler 846 cools turbine output stream 848 to a temperature of, for example, between about 80° F. and about 90° F., such as about 80° F., about 85° F., about 90° F., or another temperature.

Cooling water 851 flowing into cooler 846 can have a temperature of between about 70 and about 80° F., such as about 70° F., about 75° F., about 80° F., or another temperature. Cooling water 851 can be heated by exchange at cooler 846 to a temperature of, for example, between about 95° F. and about 110° F., such as about 95° F., about 100° F., about 105° F., or another temperature. The volume of cooling water 851 flowing through cooler 846 can be between, for instance, about 1 MMT/D and about 2 MMT/D, such as about 1 MMT/D, about 1.5 MMT/D, about 2 MMT/D, or another volume.

Second portion 842 (sometimes referred to as rich ammonia stream 842) is cooled in cooler 852, such as a cooling water condenser or an air cooler. Cooler 852 can have a thermal duty of, for example, between about 200 MM Btu/h and about 300 MM Btu/h, such as about 200 MM Btu/h, about 250 MM Btu/h, about 300 MM Btu/h, or another thermal duty. Cooler 852 cools rich ammonia stream 842 to a temperature of, for example, between about 80° F. and about 90° F., such as about 80° F., about 85° F., about 90° F., or another temperature. The cooled rich ammonia stream 842 passes through a letdown valve 856 which further cools rich ammonia stream 842. For example, letdown valve 856 can cool rich ammonia stream 842 to a temperature of between about 25° F. and about 35° F., such as about 25° F., about 30° F., about 35° F., or another temperature.

Cooling water 854 flowing into cooler 852 can have a temperature of between about 70 and about 80° F., such as about 70° F., about 75° F., about 80° F., or another temperature. Cooling water 854 can be heated by exchange at cooler 852 to a temperature of, for example, between about 80° F. and about 90° F., such as about 80° F., about 85° F., about 90° F., or another temperature. The volume of cooling water 854 flowing through cooler 852 can be between, for instance, about 0.2 MMT/D and about 0.4 MMT/D, such as about 0.2 MMT/D, about 0.3 MMT/D, about 0.4 MMT/D, or another volume.

Rich ammonia stream 842 released from letdown valve 856 is used to generate chilled water for use in in-plant sub-ambient cooling. A first portion 858 of rich ammonia stream 842 passes through water chiller 860. Water chiller 860 can have a thermal duty of, for example, between about 50 MM Btu/h and about 150 MM Btu/h, such as about 50 MM Btu/h, about 60 MM Btu/h, about 70 MM Btu/h, about 80 MM Btu/h, about 90 MM Btu/h, about 100 MM Btu/h, about 110 MM Btu/h, about 120 MM Btu/h, about 130 MM Btu/h, about 140 MM Btu/h, about 150 MM Btu/h, or another thermal duty. Water chiller 860 chills a stream 862 of chilled water while heating first portion 858 of rich ammonia. For instance, water chiller 860 can chill stream 862 of chilled water from a temperature of between about 95° F. and about 105° F., such as about 95° F., about 100° F., about 105° F., or another temperature; to a temperature of between about 35° F. and about 45° F., such as a temperature of about 35° F., about 40° F., about 45° F., or another temperature. Water chiller 860 can heat first portion 858 of rich ammonia to a temperature of, for instance, between about 85° F. and about 95° F., such as about 85° F., about 90° F., about 95° F., or another temperature.

A second portion 864 of rich ammonia stream 842 passes through a water chiller 866. Water chiller 866 can have a thermal duty of, for example, between about 50 MM Btu/h and about 150 MM Btu/h, such as about 50 MM Btu/h, about 60 MM Btu/h, about 70 MM Btu/h, about 80 MM Btu/h, about 90 MM Btu/h, about 100 MM Btu/h, about 110 MM Btu/h, about 120 MM Btu/h, about 130 MM Btu/h, about 140 MM Btu/h, about 150 MM Btu/h, or another thermal duty. Water chiller 866 can chill a stream 868 of chilled water from a temperature of, for example, between about 60° F. and about 70° F., such as about 60° F., about 65° F., about 70° F., or another temperature; to a temperature of between about 35° F. and about 45° F., such as a temperature of about 35° F., about 40° F., about 45° F., or another temperature.

Chilled water streams 862, 868 can be used for in-plant cooling within the gas processing plant of FIGS. 1-5. In some cases, chilled water streams 862, 868 can produce, for example, between about 200 MM Btu/h and about 250 MM Btu/h of chilled water sub-ambient cooling capacity, such as about 200 MM Btu/h, about 210 MM Btu/h, about 220 MM Btu/h, about 230 MM Btu/h, about 250 MM Btu/h, about 250 MM Btu/h, or another amount of chilled water sub-ambient cooling capacity. In some cases, rich ammonia stream 842 released from letdown valve 856 can be used directly for in-plant sub-ambient cooling without using chilled water streams 862, 868 as a buffer.

Referring specifically to FIG. 10B, heated ammonia-water mixture in waste heat to combined cooling and power conversion plant 850 is used to power turbines 834, 836 as described in the preceding paragraphs, and also to power an additional turbine 870. Ammonia-water mixture is also used to cool chilled water that is used for in-plant sub-ambient cooling in the gas processing plant, thus saving cooling water utilities. Waste heat to combined cooling and power conversion plant 850 can produce power and chilled water in-plant sub-ambient cooling capacity via a modified Goswami cycle 855 using an ammonia-water mixture 812 of about 50% ammonia and about 50% water. For instance, plant 850 can produce between about 45 MW and about 55 MW of power, such as about 45 MW, about 50 MW, about 55 MW, or another amount of power. Plant 850 can also produce between about 200 MM Btu/h and about 250 MM Btu/h of chilled water in-plant sub-ambient cooling capacity, such as about 200 MM Btu/h, about 210 MM Btu/h, about 220 MM Btu/h, about 230 MM Btu/h, about 240 MM Btu/h, about 250 MM Btu/h, or another amount.

Ammonia-water vapor 830 is split into a first portion 872 and a second portion 874. The split ratio, which is the percentage of vapor 830 split into second portion 874, can be, for instance, between about 20% and about 30%, such as about 20%, about 25%, about 30%, or another amount. First portion 872 flows to turbine 834 and second portion 874 flows to a water cooler 876. Turbine 834 (in combination with a generator, not shown) can generate, for example, at least about 40 MW of power using ammonia-water vapor 872, such as about 40 MW, about 42 MW, about 44 MW, about 46 MW, or another amount of power. Power is generated by turbine 834 using a volume of ammonia-water vapor 872 of, for instance, between about 0.025 MMT/D and about 0.035 MMT/D, such as 0.025 MMT/D, about 0.03 MMT/D, about 0.035 MMT/D, or another volume. Turbine 834 reduces the pressure of ammonia-water vapor 872 to, for instance, between about 3 Bar and about 4 Bar, such as about 3 Bar, about 3.5 Bar, about 4 Bar, or another pressure; and reduces the temperature of ammonia-water vapor 872 to, for instance, between about 115° F. and about 125° F., such as about 115° F., about 120° F., about 125° F., or another temperature.

First portion 872 of ammonia-water vapor from turbine 834 joins with liquid ammonia and water 828 into turbine output stream 848, which is cooled in a cooler 878, such as a cooling water condenser or an air cooler. Cooler 878 can have a thermal duty of, for example, between about 2500 MM Btu/h and about 3000 MM Btu/h, such as about 2500 MM Btu/h, about 2600 MM Btu/h, about 2700 MM Btu/h, about 2800 MM Btu/h, about 2900 MM Btu/h, about 3000 MM Btu/h, or another thermal duty. Cooler 878 cools turbine output stream 848 to a temperature of, for example, between about 80° F. and about 90° F., such as about 80° F., about 85° F., about 90° F., or another temperature.

Cooling water 851 flowing into cooler 878 can have a temperature of between about 70 and about 80° F., such as about 70° F., about 75° F., about 80° F., or another temperature. Cooling water 851 can be heated by exchange at cooler 846 to a temperature of, for example, between about 95° F. and about 105° F., such as about 95° F., about 100° F., about 105° F., or another temperature. The volume of cooling water 851 flowing through cooler 846 can be between, for instance, about 1 MMT/D and about 2 MMT/D, such as about 1 MMT/D, about 1.5 MMT/D, about 2 MMT/D, or another volume.

Second portion 874 (sometimes referred to as rich ammonia stream 874) is cooled in a cooler 876. Cooler 876 can have a thermal duty of, for example, between about 250 MM Btu/h and about 350 MM Btu/h, such as about 250 MM Btu/h, about 300 MM Btu/h, about 350 MM Btu/h, or another thermal duty. Cooler 876 cools rich ammonia stream 874 to a temperature of, for example, between about 80° F. and about 90° F., such as about 80° F., about 85° F., about 90° F., or another temperature. The cooled rich ammonia stream 874 flows into an ammonia/water separator 880 that separates vapor 882 from liquid 884 in rich ammonia stream 874. Vapor 882 flows through turbine 870, that (in combination with a generator, not shown) generates, for example, between about 6 MW and about 7 MW of power, such as about 6 MW, about 6.5 MW, about 7 MW, or another amount of power. Liquid 884 flows through a letdown valve 886 which further cools liquid 884 a temperature of between about 25 and about 35° F., such as about 25° F., about 30° F., about 35° F., or another temperature. The use of turbine 870 in addition to turbine 843 helps cooling and power conversion plant 850 to handle fluctuations in the temperature of the cooling water. For instance, turbine 870 can help to offset the reduction in power generation that would otherwise have occurred if the temperature of the cooling medium increased (for example, in summer).

Cooling water 854 flowing into cooler 876 can have a temperature of between about 70 and about 80° F., such as about 70° F., about 75° F., about 80° F., or another temperature. Cooling water 854 can be heated by exchange at cooler 876 to a temperature of, for example, between about 80° F. and about 90° F., such as about 80° F., about 85° F., about 90° F., or another temperature. The volume of cooling water 854 flowing through cooler 852 can be between, for instance, about 0.2 MMT/D and about 0.4 MMT/D, such as about 0.2 MMT/D, about 0.3 MMT/D, about 0.4 MMT/D, or another volume.

Vapor 882 and liquid 884 streams join to form a rich ammonia stream 888. A first portion 890 of rich ammonia stream 888 passes through water chiller 860 and a second portion 892 of rich ammonia stream 888 passes through water chiller 866, which operate as described in the preceding paragraphs in order to provide for in-plant sub-ambient cooling. In some cases, rich ammonia stream 888 can be used directly for in-plant sub-ambient cooling without using chilled water streams 862, 868 as a buffer.

In some cases, parameters described in the preceding paragraphs for waste heat to combined cooling and power conversion plants 800, 850, such as split ratio for splitting ammonia-water vapor 830 into first and second portions 840, 842; operating pressure; ammonia-water concentration in ammonia-water stream 812; temperatures; or other parameters, can be varied, for example, based on site-specific or environment-specific characteristics, such as change of cooling water availability or constraints on supply or return temperature of cooling water. There is also a trade-off between heat exchanger surface area and power generation or power savings achieved using chilled water for in-plant cooling.

Figure 11A:
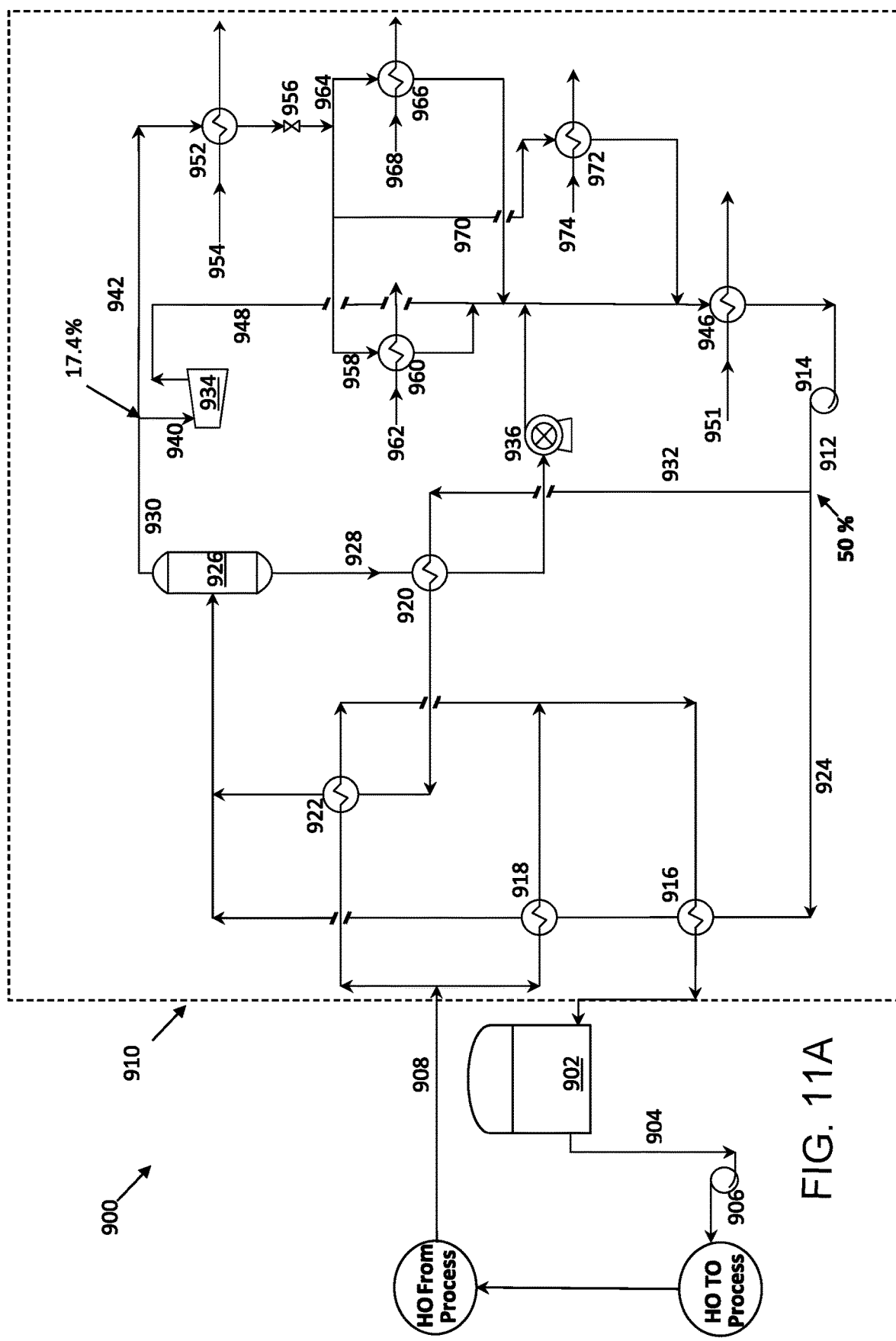
FIGS. 11A and 11B are diagrams of modified Goswami cycle based waste heat to combined cooling and power conversion plants.
Figure 11B:
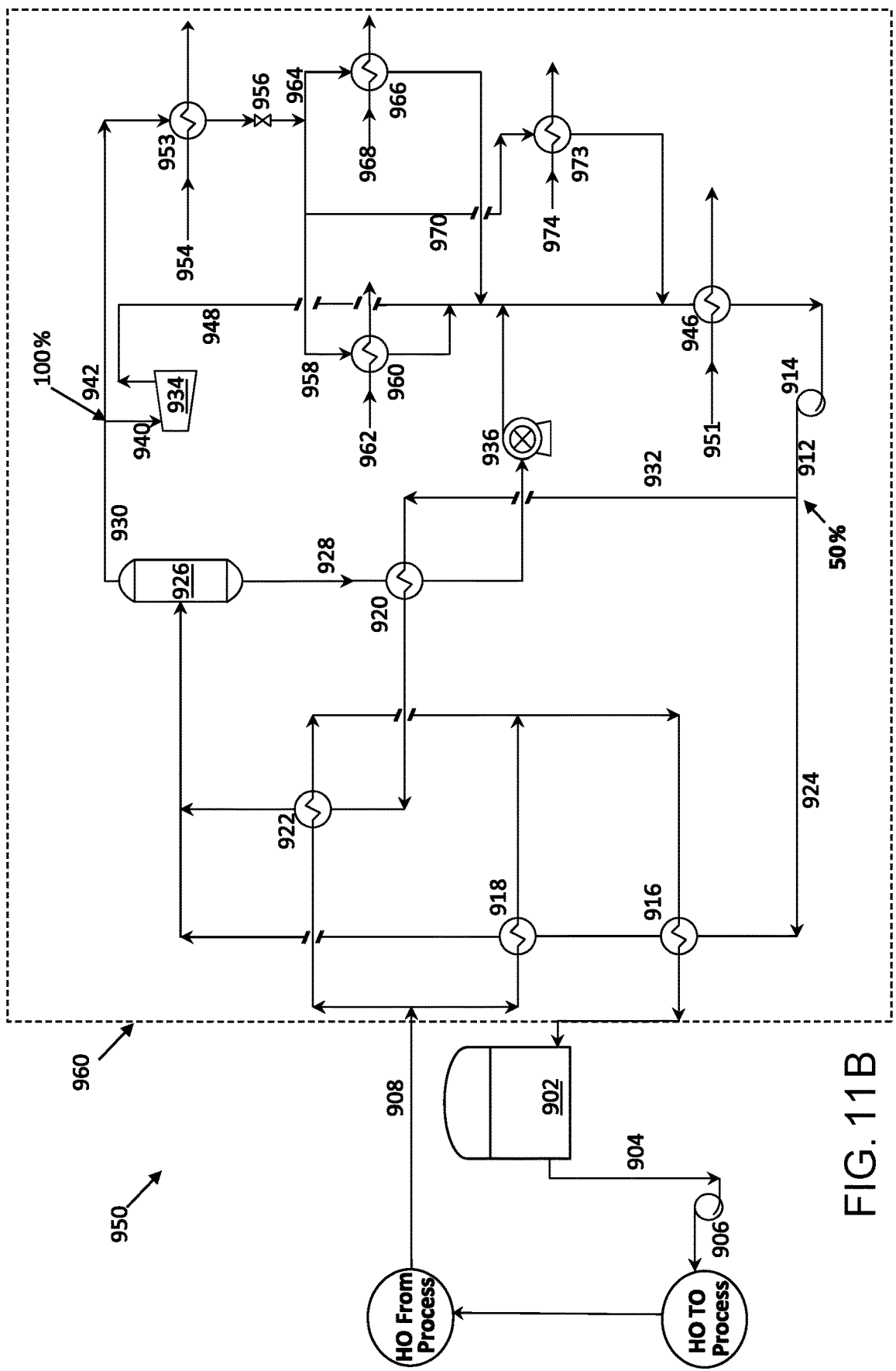

Referring to FIGS. 11A and 11B, waste heat from the crude oil associated gas processing plant that is recovered through the network of heat exchangers 1-7 (FIGS. 1-5) can be used to power a modified Goswami cycle based waste heat to combined cooling and power conversion plant 900, 950. In the examples of FIGS. 11A and 11B, modified Goswami cycles 910, 960 are operated at 12 Bar using a mixture of 50% ammonia and 50% water.

Waste heat to combined cooling and power conversion plants 900, 950 each includes an accumulation tank 902 that stores heating fluid, such as oil, water, an organic fluid, or another heating fluid. Heating fluid 904 is pumped from accumulation tank 902 to heat exchangers 1-7 (FIGS. 1-5) by a heating fluid circulation pump 906. For instance, heating fluid 904 can be at a temperature of between about 130° F. and about 150° F., such as about 130° F., about 140° F., about 150° F., or another temperature.

Heated heating fluid from each of heat exchangers 1-7 (for example, heating fluid that has been heated by recovery of waste heat at each of heat exchangers 1-7) is joined into a common hot fluid header 908. Hot fluid header 908 can be at a temperature of, for example, between about 210° F. and about 230° F., such as about 210° F., about 220° F., about 230° F., or another temperature. The volume of fluid in hot fluid header 908 can be, for instance, between about 0.6 MMT/D and about 0.8 MMT/D, such as about 0.6 MMT/D, about 0.7 MMT/D, about 0.8 MMT/D, or another volume.

The heat from hot fluid header 908 is used to heat an ammonia-water mixture in modified Goswami cycles 910, 960. Heated ammonia-water mixture is used to power turbines, thus generating power from the waste heat recovered from the gas processing plant. Ammonia-water mixture is also used to cool chilled water that is used for in-plant sub-ambient cooling in the gas processing plant, thus saving cooling water utilities. In addition, ammonia-water mixture is used air conditioning or air cooling for personnel working in the gas processing plant (sometimes referred to as the industrial community of the gas processing plant), for a nearby non-industrial community, or both.

Waste heat to combined cooling and power conversion plants 900, 950 can satisfy a portion of the base load for sub-ambient cooling in the gas processing plant, such as between about 40% and about 50%, such as about 40%, about 42%, about 44%, about 46%, about 48%, about 50%, or another portion. Waste heat to combined cooling and power conversion plants 900, 950 can provide ambient air cooling for about 2000 people in the industrial community of the gas processing plant. In some cases, waste heat to combined cooling and power conversion plants 900, 950 can provide ambient air cooling for up to about 40,000 people in a nearby non-industrial community, such as up to about 35,000, up to about 36,000, up to about 37,000, up to about 38,000, up to about 39,000, up to about 40,000, or another number of people. In some cases, real time adjustments can be made to the configuration of waste heat to combined cooling and power conversion plants 900, 950, for example, in order to meet more or larger ambient cooling loads (for example, on hot summer days) at the expense of power generation.

Referring specifically to FIG. 11A, in the configuration shown for waste heat to combined cooling and power conversion plant 900 can produce power and chilled water for in-plant sub-ambient cooling via modified Goswami cycle 910 using an ammonia-water mixture 912 of about 50% ammonia and about 50% water. For instance, plant 900 can produce between about 45 MW and about 55 MW of power, such as about 45 MW, about 50 MW, about 55 MW, or another amount of power. Plant 900 can also produce between about 200 MM Btu/h and about 250 MM Btu/h of chilled water in-plant sub-ambient cooling capacity, such as about 200 MM Btu/h, about 210 MM Btu/h, about 220 MM Btu/h, about 230 MM Btu/h, about 240 MM Btu/h, about 250 MM Btu/h, or another amount. Waste heat to combined cooling and power conversion plant 900 can also produce between about 75 MM Btu/h and about 85 MM Btu/h of chilled water for ambient air conditioning or air cooling, such as about 75 MM Btu/h, about 80 MM Btu/h, about 85 MM Btu/h, or another amount of chilled water for ambient air conditioning or air cooling. This amount of chilled water can serve, for example, up to about 2000 people working in the gas processing plant. However, various parameters of waste heat to combined cooling and power conversion plant 900 can be adjusted, for example, to satisfy additional or larger ambient air cooling loads at the expense of producing less power.

Modified Goswami cycle 910 in waste heat to combined cooling and power conversion plant 900 includes a pump 914. Pump 914 can consume, for instance, between about 2.5 MW and about 3.5 MW of power, such as about 2.5 MW, about 3 MW, about 3.5 MW, or another amount of power. Pump 914 can pump ammonia-water mixture 912 from a starting pressure of, for instance, between about 3 Bar and about 4 Bar, such as about 3 Bar, about 3.5 Bar, or about 4 Bar; to a higher exit pressure of, for instance, between about 11 Bar and about 13 Bar, such as about 11 Bar, about 12 Bar, about 13 Bar, or another exit pressure. Pump 914 can be sized to pump, for instance, between about 0.15 MMT/D and about 0.25 MMT/D of ammonia-water mixture 812, such as about 0.15 MMT/D, about 0.2 MMT/D, about 0.25 MMT/D, or another amount.

Ammonia-water mixture 912 is pumped by pump 14 into a network of heat exchangers 916, 918, 920, 922 that together achieve partial evaporation of ammonia-water mixture 912 using heat from heating fluid 904. Heat exchangers 916 and 920 can have a thermal duty of, for instance, between about 1300 MM Btu/h and about 1400 MM Btu/h, such as about 1300 MM Btu/h, about 1350 MM Btu/h, about 1500 MM Btu/h, or another thermal duty. Heat exchangers 918 and 922 can have a thermal duty of, for instance, between about 850 MM Btu/h and about 950 MM Btu/h, such as about 850 MM Btu/h, about 900 MM Btu/h, about 950 MM Btu/h, or another thermal duty.

Ammonia-water mixture 912 exiting pump 914 has a temperature of, for instance, between about 80° F. and about 90° F., such as about 80° F., about 85° F., about 90° F., or another temperature. Ammonia-water mixture 912 is split into two portions, for instance, with a split ratio of about 50%. A first portion 924 of ammonia-water mixture 912 from pump 914 is pre-heated and partially vaporized by exchange with heating fluid 908 in heat exchangers 916, 918. For instance, first portion 924 of ammonia-water mixture is heated to a temperature of between about 190° F. and about 200° F., such as about 190° F., about 195° F., about 200° F., or another temperature. A second portion 932 of ammonia-water mixture 912 from pump 914 is pre-heated and partially vaporized by exchange with liquid ammonia and water 928 (from a liquid-vapor separator 926, described in the following paragraphs) in heat exchanger 920. For instance, second portion 932 of ammonia-water mixture is heated to a temperature of between about 165° F. and about 175° F., such as about 165° F., about 170° F., about 175° F., or another temperature.

Heated second portion 932 is further heated and partially vaporized by exchange with heating fluid 908 in heat exchanger 922. For instance, second portion 932 is further heated to a temperature of between about 190° F. and about 200° F., such as about 190° F., about 195° F., about 200° F., or another temperature.

Heating fluid 908 flowing through the network of heat exchangers 916, 918, 922 cools and returns to accumulation tank 902. For instance, heating fluid 908 flowing into the network of heat exchangers 916, 918, 922 can have a temperature of between about 210° F. and about 230° F., such as about 210° F., about 220° F., about 230° F., or another temperature. Heating fluid 908 exits the network of heat exchangers at a temperature of between about 130° F. and about 150° F., such as about 130° F., about 140° F., about 150° F., or another temperature.

First and second portions 924, 932, which are heated and partially vaporized, flow into a liquid-vapor separator 926 that separates liquid ammonia and water from ammonia-water vapor. The pressure of first and second portions 924, 932 upon entry into separator 926 can be, for instance, between about 10.5 Bar and about 11.5 Bar, such as about 10.5 Bar, about 11 Bar, about 11.5 Bar, or another pressure.

Liquid ammonia and water 928, which is a low purity lean stream, exit the bottom of separator 926 and ammonia-water vapor 930, which is a high purity rich stream, exits the top of separator 926.

Liquid ammonia and water 928 flow to a high pressure recovery turbine (HPRT) 936, for example, a hydraulic liquid turbine. HPRT 936 can generate, for example, between about 1 MW and about 2 MW of power, such as about 1 MW, about 1.5 MW, about 2 MW, or another amount. Power is generated by HPRT 936 using a volume of liquid ammonia and water 928 of, for instance, between about 0.15 MMT/D and about 0.2 MMT/D, such as about 0.15 MMT/D, about 0.2 MMT/D, or another volume. HPRT 936 reduces the pressure of liquid ammonia and water 928 to, for instance, between about 3 Bar and about 4 Bar, such as about 3 Bar, about 3.5 Bar, about 4 Bar, or another pressure. After exchange at heat exchanger 920, the temperature of liquid ammonia and water 928 is, for instance, between about 110° F. and about 120° F., such as about 110° F., about 115° F., about 120° F., or another temperature Ammonia-water vapor 930 is split into a first portion 940 and a second portion 942. The split ratio, which is the percentage of vapor 930 split into second portion 942, can be, for instance, between about 10% and about 20%, such as about 10%, about 15%, about 20%, or another amount. First portion 940 flows to a turbine 934 and second portion 942 flows to a cooler 952, discussed in the following paragraphs. First portion 940 is used for power generation. Turbine 934 (in combination with a generator, not shown) can generate, for example, between about 45 MW and about 55 MW of power, such as about 45 MW, about 50 MW, about 55 MW, or another amount of power. Power is generated by turbine 934 using a volume of ammonia-water vapor 930 of, for instance, between about 0.03 MMT/D and about 0.04 MMT/D, such as 0.03 MMT/D, about 0.035 MMT/D, about 0.04 MMT/D, or another volume. Turbine 934 reduces the pressure of ammonia-water vapor 930 to, for instance, between about 3 Bar and about 4 Bar, such as about 3 Bar, about 3.5 Bar, about 4 Bar, or another pressure; and reduces the temperature of ammonia-water vapor 930 to, for instance, between about 105° F. and about 115° F., such as about 105° F., about 110° F., about 115° F., or another temperature.

The streams from turbines 934, 936 (first portion 940 of ammonia-water vapor and liquid ammonia and water 928, respectively) combine into a turbine output stream 948 that is cooled in a cooler 946, such as a cooling water condenser or an air cooler by exchange with cooling water 951. Cooler 946 can have a thermal duty of, for example, between about 2500 MM Btu/h and about 3000 MM Btu/h, such as about 2500 MM Btu/h, about 2600 MM Btu/h, about 2700 MM Btu/h, about 2800 MM Btu/h, about 2900 MM Btu/h, about 3000 MM Btu/h, or another thermal duty. Cooler 946 cools turbine output stream 948 to a temperature of, for example, between about 80° F. and about 90° F., such as about 80° F., about 85° F., about 90° F., or another temperature.

Cooling water 951 flowing into cooler 946 can have a temperature of between about 70 and about 80° F., such as about 70° F., about 75° F., about 80° F., or another temperature. Cooling water 951 can be heated by exchange at cooler 946 to a temperature of, for example, between about 95° F. and about 105° F., such as about 95° F., about 100° F., about 105° F., or another temperature. The volume of cooling water 951 flowing through cooler 946 can be between, for instance, about 1 MMT/D and about 2 MMT/D, such as about 1 MMT/D, about 1.5 MMT/D, about 2 MMT/D, or another volume.

Second portion 942 (sometimes referred to as rich ammonia stream 942) is used for cooling. Rich ammonia stream 942 is cooled in cooler 952, such as a cooling water condenser or an air cooler. Cooler 952 can have a thermal duty of, for example, between about 300 MM Btu/h and about 400 MM Btu/h, such as about 300 MM Btu/h, about 350 MM Btu/h, about 400 MM Btu/h, or another thermal duty. Cooler 952 cools rich ammonia stream 942 to a temperature of, for example, between about 80° F. and about 90° F., such as about 80° F., about 85° F., about 90° F., or another temperature. The cooled rich ammonia stream 942 passes through a letdown valve 956 which further cools rich ammonia stream 942. For example, letdown valve 956 can cool rich ammonia stream 942 to a temperature of between about 25° F. and about 35° F., such as about 25° F., about 30° F., about 35° F., or another temperature.

Cooling water 954 flowing into cooler 952 can have a temperature of between about 70 and about 80° F., such as about 70° F., about 75° F., about 80° F., or another temperature. Cooling water 954 can be heated by exchange at cooler 952 to a temperature of, for example, between about 80° F. and about 90° F., such as about 80° F., about 85° F., about 90° F., or another temperature. The volume of cooling water 954 flowing through cooler 952 can be between, for instance, about 0.3 MMT/D and about 0.5 MMT/D, such as about 0.3 MMT/D, about 0.4 MMT/D, about 0.5 MMT/D, or another volume.

Rich ammonia stream 942 released from letdown valve 956 is used to generate chilled water for use in in-plant sub-ambient cooling and for use in air conditioning or cooling of air in the plant. A first portion 958 and a second portion 964 of rich ammonia stream 942 are used for in-plant sub-ambient cooling. First portion 958 of rich ammonia stream 942 passes through a water chiller 960. Water chiller 960 can have a thermal duty of, for example, between about 50 MM Btu/h and about 150 MM Btu/h, such as about 50 MM Btu/h, about 60 MM Btu/h, about 70 MM Btu/h, about 80 MM Btu/h, about 90 MM Btu/h, about 100 MM Btu/h, about 110 MM Btu/h, about 120 MM Btu/h, about 130 MM Btu/h, about 140 MM Btu/h, about 150 MM Btu/h, or another thermal duty. Water chiller 960 can chill a stream 962 of chilled water while heating first portion 958 of rich ammonia. For instance, water chiller 960 can chill stream 962 of chilled water from a temperature of between about 95° F. and about 105° F., such as about 95° F., about 100° F., about 105° F., or another temperature; to a temperature of between about 35° F. and about 45° F., such as a temperature of about 35° F., about 40° F., about 45° F., or another temperature. Water chiller 960 can heat first portion 958 of rich ammonia to a temperature of, for instance, between about 85° F. and about 95° F., such as about 85° F., about 90° F., about 95° F., or another temperature.

Second portion 964 of rich ammonia stream 942 passes through a water chiller 966. Water chiller 866 can have a thermal duty of, for example, between about 50 MM Btu/h and about 150 MM Btu/h, such as about 50 MM Btu/h, about 60 MM Btu/h, about 70 MM Btu/h, about 80 MM Btu/h, about 90 MM Btu/h, about 100 MM Btu/h, about 110 MM Btu/h, about 120 MM Btu/h, about 130 MM Btu/h, about 140 MM Btu/h, about 150 MM Btu/h, or another thermal duty. Water chiller 966 can chill a stream 968 of chilled water from a temperature of, for example, between about 60° F. and about 70° F., such as about 60° F., about 65° F., about 70° F., or another temperature; to a temperature of between about 35° F. and about 45° F., such as a temperature of about 35° F., about 40° F., about 45° F., or another temperature.

Chilled water streams 962, 968 can be used for in-plant cooling within the gas processing plant of FIGS. 1-5. In some cases, chilled water streams 962, 968 can produce, for example, between about 200 MM Btu/h and about 250 MM Btu/h of chilled water sub-ambient cooling capacity, such as about 200 MM Btu/h, about 210 MM Btu/h, about 220 MM Btu/h, about 230 MM Btu/h, about 250 MM Btu/h, about 250 MM Btu/h, or another amount of chilled water sub-ambient cooling capacity. In some cases, rich ammonia stream 942 released from letdown valve 956 can be used directly for in-plant sub-ambient cooling without using chilled water streams 962, 968 as a buffer.

A third portion 970 of rich ammonia stream 942 is used for in-plant air conditioning or air cooling. Third portion 970 of rich ammonia stream 942 passes through a water chiller 972. Water chiller 972 can have a thermal duty of, for example, between about 75 MM Btu/h and about 85 MM Btu/h, such as about 85 MM Btu/h, about 80 MM Btu/h, about 85 MM Btu/h, or another thermal duty. Water chiller can chill a stream 974 of chilled water while heating third portion 970 of rich ammonia. For instance, water chiller 972 can chill stream 974 of chilled water from a temperature of between about 40° F. and about 50° F., such as about 40° F., about 45° F., about 50° F., or another temperature; to a temperature of between about 35° F. and about 45° F., such as a temperature of about 35° F., about 40° F., about 45° F., or another temperature. Water chiller 972 can heat third portion 970 of rich ammonia to a temperature of, for instance, between about 30° F. and about 40° F., such as about 30° F., about 35° F., about 40° F., or another temperature. Chilled water stream 974 is used for air cooling or air conditioning of the industrial community of the gas processing plant. Chilled water stream 974 can produce, for example, between about 75 MM Btu/h and about 85 MM Btu/h of chilled water for air cooling or air conditioning, such as about 75 MM Btu/h, about 80 MM Btu/h, about 85 MM Btu/h, or another amount of chilled water.

In some cases, the split ratio between first portion 940 and second portion of ammonia-water vapor 930 can be varied, for example, to satisfy additional or larger cooling loads. For instance, the split ratio can be, for example, 10%, 15%, 20%, 30%, 40%, 50%, or another ratio. For instance, the split ratio can be larger in summer such that additional air cooling requirements due to higher ambient temperature can be satisfied, while the split ratio can be larger in winter when less ambient cooling is used.

Referring to FIG. 11B, waste heat to combined cooling and power conversion plant 950 can be configured for cooling only, with little or no power generation. Combined cooling and power conversion plant 950 operates generally similarly to the operation of combined cooling and power conversion plant 900. However, all of ammonia-water vapor 930 is directed into rich ammonia stream 942 for cooling purposes and no ammonia-water vapor is sent to turbine 934, that is, for a split ratio of 100%.

In the configuration shown, waste heat to combined cooling and power conversion plant 950 can produce chilled water for in-plant sub-ambient cooling and chilled water for ambient air conditioning or air cooling via modified Goswami cycle 960 using an ammonia-water mixture 912 of about 50% ammonia and about 50% water. For instance, plant 950 can produce between about 200 MM Btu/h and about 250 MM Btu/h of chilled water in-plant sub-ambient cooling capacity, such as about 200 MM Btu/h, about 210 MM Btu/h, about 220 MM Btu/h, about 230 MM Btu/h, about 240 MM Btu/h, about 250 MM Btu/h, or another amount. Plant 950 can also produce between about 1200

MM Btu/h and about 1400 MM Btu/h of chilled water for ambient air conditioning or air cooling, such as about 1200 MM Btu/h, about 1300 MM Btu/h, about 1400 MM Btu/h, or another amount of chilled water for ambient air conditioning or cooling capacity. This amount of chilled water can provide, for example, cooling capacity for up to about 2000 people in the industrial community of the gas processing plant and for about 31,000 people in a nearby non-industrial community.

Rich ammonia stream 942 is cooled in a cooler 953, such as a cooling water condenser or an air cooler. Cooler 953 can have a thermal duty of, for example, between about 2000 MM Btu/h and about 2500 MM Btu/h, such as about 2000 MM Btu/h, about 2100 MM Btu/h, about 2200 MM Btu/h, about 2300 MM Btu/h, about 2400 MM Btu/h, about 2500 MM Btu/h, or another thermal duty. Cooler 953 cools rich ammonia stream 942 to a temperature of, for example, between about 80° F. and about 90° F., such as about 80° F., about 85° F., about 90° F., or another temperature. The cooled rich ammonia stream 942 passes through letdown valve 956 which further cools rich ammonia stream 942. For example, letdown valve 956 can cool rich ammonia stream 942 to a temperature of between about 25° F. and about 35° F., such as about 25° F., about 30° F., about 35° F., or another temperature Cooling water 954 flowing into cooler 952 can have a temperature of between about 70 and about 80° F., such as about 70° F., about 75° F., about 80° F., or another temperature. Cooling water 954 can be heated by exchange at cooler 953 to a temperature of, for example, between about 80° F. and about 90° F., such as about 80° F., about 85° F., about 90° F., or another temperature. The volume of cooling water 954 flowing through cooler 953 can be between, for instance, about 2 MMT/D and about 3 MMT/D, such as about 2 MMT/D, about 2.5 MMT/D, about 3 MMT/D, or another volume Rich ammonia stream 942 released from letdown valve 956 is used to generate chilled water for use in in-plant sub-ambient cooling and for use in air conditioning or cooling of air in the plant. As described in the preceding paragraphs, first portion 958 and second portion 964 of rich ammonia stream 942 are used for in-plant sub-ambient cooling, for example, by exchange with chilled water streams 962, 968 in water chillers 960, 966. In some cases, chilled water streams 962, 968 can produce, for example, between about 200 MM Btu/h and about 250 MM Btu/h of chilled water sub-ambient cooling capacity, such as about 200 MM Btu/h, about 210 MM Btu/h, about 220 MM Btu/h, about 230 MM Btu/h, about 250 MM Btu/h, about 250 MM Btu/h, or another amount of chilled water sub-ambient cooling capacity. In some cases, rich ammonia stream 942 released from letdown valve 956 can be used directly for in-plant sub-ambient cooling without using chilled water streams 962, 968 as a buffer.

Third portion 970 of rich ammonia stream 942 is used for in-plant air conditioning or air cooling. Third portion 970 of rich ammonia stream 942 passes through a water chiller 973. Water chiller 973 can have a thermal duty of, for example, between about 1200 MM Btu/h and about 1400 MM Btu/h, such as about 1200 MM Btu/h, about 1300 MM Btu/h, about 1400 MM Btu/h, or another thermal duty. Water chiller 973 can chill chilled water stream 974 while heating third portion 970 of rich ammonia. For instance, water chiller 973 can chill stream 974 of chilled water from a temperature of between about 40° F. and about 50° F., such as about 40° F., about 45° F., about 50° F., or another temperature; to a temperature of between about 35° F. and about 45° F., such as a temperature of about 35° F., about 40° F., about 45° F., or another temperature. Water chiller 973 can heat third portion 970 of rich ammonia to a temperature of, for instance, between about 30° F. and about 40° F., such as about 30° F., about 35° F., about 40° F., or another temperature. Chilled water stream 974 is used for air cooling or air conditioning of the industrial community of the gas processing plant. Chilled water stream 974 can produce, for example, between about 1200 MM Btu/h and about 1400 MM Btu/h of chilled water for air cooling or air conditioning, such as about 1200 MM Btu/h, about 1300 MM Btu/h, about 1400 MM Btu/h, or another amount of chilled water. This amount of chilled water can provide, for example, cooling capacity for about 2000 personnel working in the gas processing plant and for about 31,000 personnel working in an adjacent non-industrial community.

Figure 12:
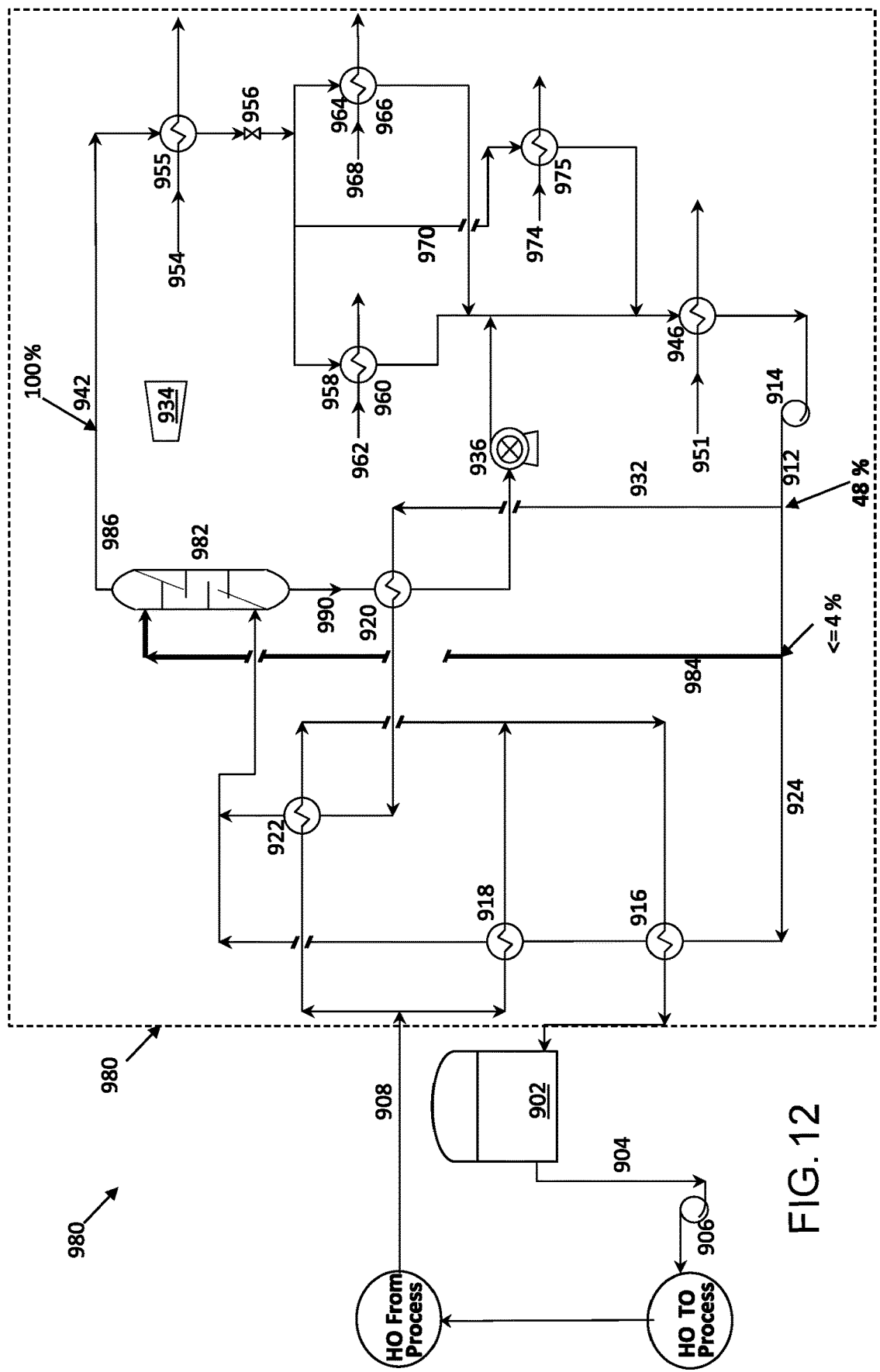
FIG. 12 is a diagram of a modified Goswami cycle based waste heat to combined cooling and power conversion plant.

Referring to FIG. 12, waste heat from the crude oil associated gas processing plant that is recovered through the network of heat exchangers 1-7 (FIGS. 1-5) can be used to power a modified Goswami cycle based waste heat to combined cooling and power conversion plant 980 that is configured for cooling only, with little or no power generation. Combined cooling and power conversion plant 980 operates generally similarly to the operation of combined cooling and power conversion plants 900, 950 described supra. The configuration of plant 980 can provide in-plant sub-ambient cooling and of chilled water for air conditioning or air cooling via a modified Goswami cycle 990 using an ammonia-water mixture 912 of about 50% ammonia and about 50% water. For instance, plant 980 can produce between about 200 MM Btu/h and about 250 MM Btu/h of chilled water in-plant sub-ambient cooling capacity, such as about 200 MM Btu/h, about 210 MM Btu/h, about 220 MM Btu/h, about 230 MM Btu/h, about 240 MM Btu/h, about 250 MM Btu/h, or another amount. Plant 980 can also produce between about 1400 MM Btu/h and about 1600 MM Btu/h of chilled water for ambient air conditioning or air cooling, such as about 1400 MM Btu/h, about 1500 MM Btu/h, about 1600 MM Btu/h, or another amount of chilled water for ambient air conditioning or cooling capacity. This amount of chilled water can provide, for example, cooling capacity for about 2000 people in the gas processing plant industrial community and for about 35,000 people in a nearby non-industrial community.

In plant 980, a rectifier 982, such as a four trays rectifier, is used in place of separator 926 (FIGS. 11A and 11B). Rectifier 982 receives a feed 984 of ammonia-water mixture. Feed 984 can have a temperature of, for instance, between about 80° F. and about 90° F., such as about 80° F., about 85° F., about 90° F., or another temperature; and can be at a pressure of between about 10 Bar and about 15 Bar, such as about 10 Bar, about 11 Bar, about 12 Bar, about 13 Bar, about 14 Bar, about 15 Bar, or another pressure. Feed 984 to rectifier 982 can be, for example, up to about 5% of ammonia-water mixture 912, such as about 1%, about 2%, about 3%, about 4%, about %, or another split ratio. The remaining ammonia-water mixture 912 is split approximately evenly between the first and second portions 924, 932. The split ratio among first and second portions 924, 932 and feed 994 determines the cooling load and can give, for example, up to about 13% flexibility in the cooling demand change.

An overhead discharge 986 from rectifier 982, which includes ammonia of enhanced purity, flows to water cooler 955 from which overhead discharge 986 provides cooling capacity to chillers 960, 966 and to a water chiller 975. Water chiller 975 can have a thermal duty of between about 1200 MM Btu/h and about 1600 MM Btu/h, such as about 1200 MM Btu/h, about 1300 MM Btu/h, about 1400 MM Btu/h, about 1500 MM Btu/h, about 1600 MM Btu/h, or another thermal duty. Water chiller 975 can chill chilled water stream 974 while heating third portion 970 of rich ammonia. For instance, water chiller 975 can chill stream 974 of chilled water from a temperature of between about 40° F. and about 50° F., such as about 40° F., about 45° F., about 50° F., or another temperature; to a temperature of between about 35° F. and about 45° F., such as a temperature of about 35° F., about 40° F., about 45° F., or another temperature. Water chiller 975 can heat third portion 970 of rich ammonia to a temperature of, for instance, between about 30° F. and about 40° F., such as about 30° F., about 35° F., about 40° F., or another temperature. A bottoms stream 990 from rectifier 982 flows via heat exchanger 920 to turbine 936.

In some cases, parameters described in the preceding paragraphs for waste heat to combined cooling and power conversion plants 900, 950, 980, such as split ratio for splitting ammonia-water vapor 930 into first and second portions 940, 942; operating pressure, ammonia-water concentration in ammonia-water stream 912, or other parameters, can be varied, for example, based on site-specific or environment-specific characteristics, such as change of cooling water availability or constraints on supply or return temperature of cooling water. There is also a trade-off between heat exchanger surface area and power generation or power savings achieved using chilled water for in-plant cooling.

In the waste heat to combined cooling and power conversion plants described supra, excess cooling capacity can sometimes be generated. The excess cooling capacity can be sent to a cooling grid to be used for other applications.

Other implementations are also within the scope of the following claims.

What is claimed is:

1. A system comprising:
   a waste heat recovery heat exchanger positioned in a crude oil associated gas processing plant, the waste heat recovery heat exchanger configured to heat a heating fluid stream by exchange with a heat source in the crude oil associated gas processing plant;
   an Organic Rankine cycle energy conversion system comprising:
      an energy conversion heat exchanger configured to heat a working fluid by exchange with the heated heating fluid stream;
      a turbine and a generator, wherein the turbine and generator are configured to generate power by expansion of the heated working fluid; and
      a cooling element configured to cool the expanded working fluid after power generation;
   wherein the crude oil associated gas processing plant is configured to process a hydrocarbon gas stream from a well to produce a sales gas comprising methane.

2. The system of claim 1, wherein the energy conversion heat exchanger has a thermal duty of between 3000 MM Btu/h and 3500 MM Btu/h.

3. The system of claim 1, wherein the energy conversion heat exchanger comprises an evaporator.

4. The system of claim 1, wherein the energy conversion heat exchanger is configured to heat the working fluid to a temperature of between 150° F. and 160° F.

5. The system of claim 1, wherein the energy conversion heat exchanger is configured to reduce the pressure of the working fluid to a pressure of between 10 Bar and 11 Bar.

6. The system of claim 1, wherein the working fluid enters the turbine in a vapor phase.

7. The system of claim 1, wherein the turbine and generator are configured to generate at least 60 MW of power.

8. The system of claim 1, wherein the cooling element has a thermal duty of between 2500 MM Btu/h and 3000 MM Btu/h.

9. The system of claim 1, wherein the cooling element is configured to cool the expanded working fluid by exchange with cooling fluid.

10. The system of claim 9, wherein the amount of power generated by the turbine and generator varies based on the temperature of the cooling fluid.

11. The system of claim 10, wherein when the temperature of the cooling fluid is less than 65° F., the turbine and generator generate between 70 MW and 90 MW of power.

12. The system of claim 10, wherein when the temperature of the cooling fluid is at least 70° F., the turbine and generator generate between 60 MW and 80 MW of power.

13. The system of claim 1, wherein the heat source comprises a vapor stream from a slug catcher of the gas processing plant.

14. The system of claim 1, wherein the heat source comprises an output stream from a DGA stripper of the gas processing plant.

15. The system of claim 1, wherein the heat source comprises one or more of a sweet gas stream and a sales gas stream of the gas processing plant.

16. The system of claim 1, wherein the heat source comprises a propane header of a propane refrigeration unit of the gas processing plant.

17. The system of claim 1, wherein the heat source comprises an output stream from a compressor of the gas processing plant.

18. A method comprising:
   heating a heating fluid stream by exchange with a heat source in a crude oil associated gas processing plant, wherein the crude oil associated gas processing plant is configured to process a hydrocarbon gas stream from a well to produce a sales gas comprising methane; and
   generating power in an Organic Rankine cycle energy conversion system, comprising:
      heating a working fluid by exchange with the heated heating fluid stream;
      generating power, by a turbine and generator, by expansion of the heated working fluid; and
      cooling the expanded working fluid after power generation.

19. The method of claim 18, comprising heating the working fluid to a temperature of between 150° F. and 160° F.

20. The method of claim 18, wherein heating the working fluid comprises reducing the pressure of the working fluid to a pressure of between 10 Bar and 11 Bar.

21. The method of claim 18, wherein generating power comprises generating at least 60 MW of power.

22. The method of claim 18, wherein cooling the expanded working fluid comprises cooling the working fluid by exchange with cooling fluid.

23. The method of claim 22, wherein the amount of power generated by the turbine and generator varies based on the temperature of the cooling fluid.

24. The method of claim 23, wherein when the temperature of the cooling fluid is less than 65° F., the turbine and generator generate between 70 MW and 90 MW of power.

25. The method of claim 23, wherein when the temperature of the cooling fluid is at least 70° F., the turbine and generator generate between 60 MW and 80 MW of power.

26. The method of claim 18, comprising heating the heating fluid stream by exchange with a vapor stream from a slug catcher of the gas processing plant.

27. The method of claim 18, comprising heating the heating fluid stream by exchange with an output stream from a DGA stripper of the gas processing plant.

28. The method of claim 18, comprising heating the heating fluid stream by exchange with one or more of a sweet gas stream and a sales gas stream of the gas processing plant.

29. The method of claim 18, comprising heating the heating fluid stream by exchange with a propane header of a propane refrigeration unit of the gas processing plant.

30. The method of claim 18, comprising heating the heating fluid stream by exchange with an output stream from a compressor of the gas processing plant.

* * * * *